(12) United States Patent  
Scomparim

(10) Patent No.: US 9,378,071 B2  
(45) Date of Patent: Jun. 28, 2016

(54) COMPUTING DEVICE FOR STATE TRANSITIONS OF RECURSIVE STATE MACHINES AND A COMPUTER-IMPLEMENTED METHOD FOR THE DEFINITION, DESIGN AND DEPLOYMENT OF DOMAIN RECURSIVE STATE MACHINES FOR COMPUTING DEVICES OF THAT TYPE

(71) Applicant: PMDA SERVICES PTY LTD, Ermington, NSW (AU)

(72) Inventor: Guilherme Scomparim, Ermington (AU)

(73) Assignee: PMDA SERVICES PTY LTD (AU)

( * ) Notice: Subject to any disclaimer, the term of this patent is extended or adjusted under 35 U.S.C. 154(b) by 0 days.

(21) Appl. No.: 14/407,927

(22) PCT Filed: Jun. 4, 2013

(86) PCT No.: PCT/IB2013/054591  
§ 371 (c)(1),  
(2) Date: Dec. 12, 2014

(87) PCT Pub. No.: WO2013/190416  
PCT Pub. Date: Dec. 27, 2013

(65) Prior Publication Data  
US 2015/0160988 A1    Jun. 11, 2015

(51) Int. Cl.  
*G06F 3/00* (2006.01)  
*G06F 9/44* (2006.01)  
*G06F 9/46* (2006.01)  
*G06F 13/00* (2006.01)  
*G06F 9/54* (2006.01)  
*G06F 7/00* (2006.01)  
*G06N 5/02* (2006.01)

(52) U.S. Cl.  
CPC *G06F 9/542* (2013.01); *G06F 7/00* (2013.01); *G06F 9/4428* (2013.01); *G06N 5/025* (2013.01)

(58) Field of Classification Search  
None  
See application file for complete search history.

(56) References Cited

U.S. PATENT DOCUMENTS

| | | | | |
|---|---|---|---|---|
| 6,052,722 A * | 4/2000 | Taghadoss | ............ | H04J 3/1611 709/223 |
| 2014/0033087 A1* | 1/2014 | Jaramillo | .................. | G06F 8/38 715/764 |

* cited by examiner

*Primary Examiner* — Craig Dorais  
(74) *Attorney, Agent, or Firm* — Hickman Palermo Becker Bingham LLP

(57) ABSTRACT

A computing device for state transitions of recursive state machines and a computer-implemented method for the definition, design and deployment of domain recursive state machines for computing devices of that type; such devices are intended for the simulation of large systems involving human and automated components, particularly the type generally called "Enterprise Applications"; such devices are also applicable to a much wider range of fields, such as cognitive modelling or robotics. The commonality between the computing device and the computer-implemented method is the Subject Predicate Object Protocol (SPOP) which is used to capture instructions by the computer-implemented method for the definition, design and deployment of recursive state machines and also is the protocol used by the computing device for state transitions of recursive state machines to communicate inbound and outbound events based on the captured instructions.

16 Claims, 53 Drawing Sheets

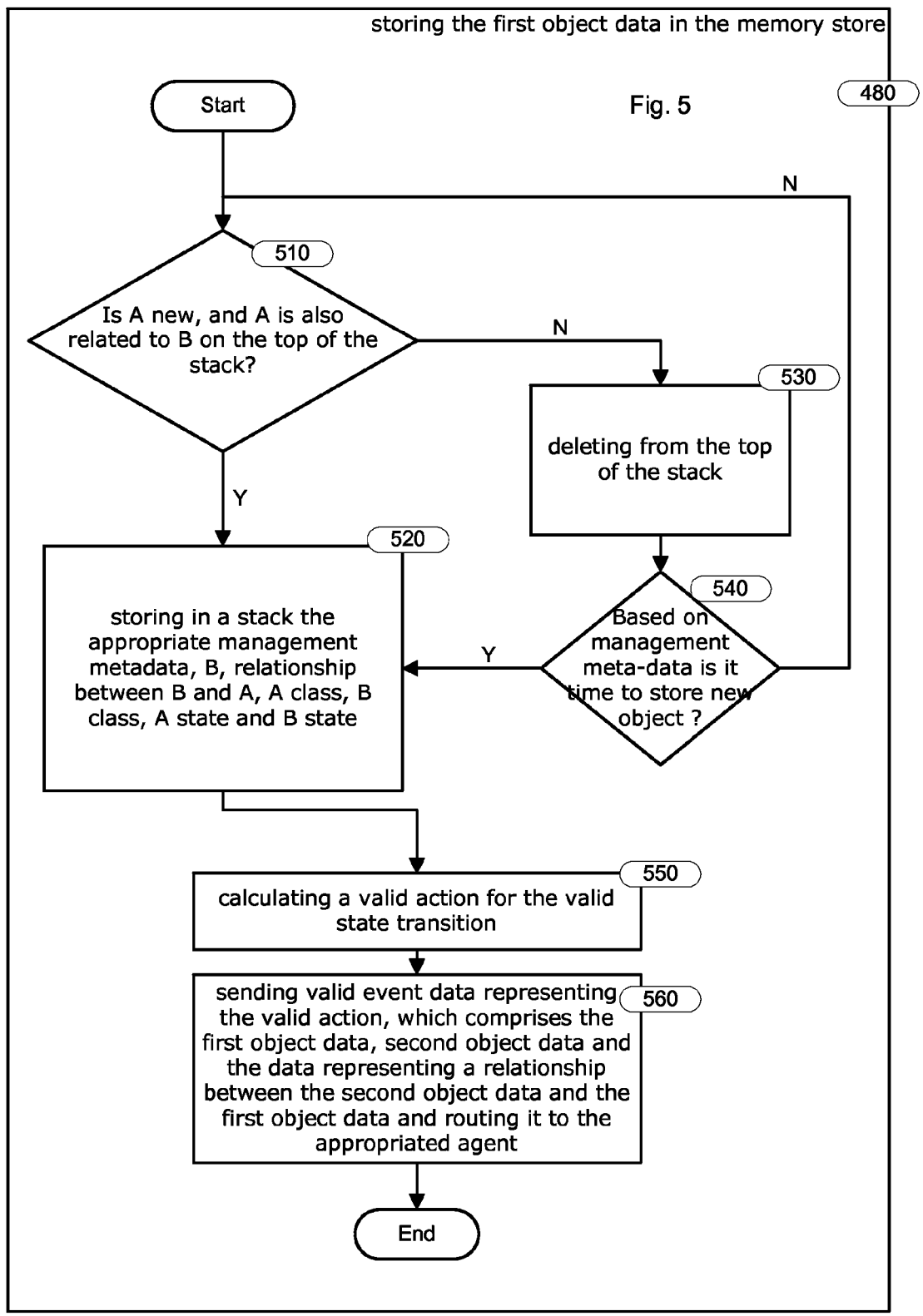

```
www.ABCjobapplication.com ( 605 )                    ( 604 )        ( 600 )      ( 601 )  o X
Menu              [Save]    [Submit]                                      Joe Blog - Logoff
- Profile         Job Application Detail
- Applications                          ( 602 )                    ( 603 )
- Job Search      Job Application Nr: 001234        Status: Ready To Submit Job Position: Senior Consultant Candidate Section
                                       ( 606 )
                  Candidate Name: Joe Blog         Candidate Telephone: 0400345432
                  Candidate Address: 14 Hermoyne Street, West Ryde, 2115, NSW [Edit]

Qualification Section

Resume: resume01.pdf [View] [Replace]
                  Cover Letter: CovLetSC.pdf [View] [Replace]
```

```
www.ABCjobapplication.com ( 605 )                          ( 630 )        ( 601 )  X
Menu                                                                      Joe Blog - Logoff
- Profile         Job Application Detail
- Applications                          ( 602 )
- Job Search      Job Application Nr: 001234        Status: Submitted ( 631 )

Job Position: Senior Consultant

Candidate Section

Candidate Name: Joe Blog          Candidate Telephone: 0400345432
                  Candidate Address: 14 Hermoyne Street, West Ryde, 2115, NSW Qualification Section Resume: resume01.pdf
                  Cover Letter: CovLetSC.pdf
```

```
www.ABCHumanResourcesManagement.com ( 661 )        ( 660 )        ( 662 )  o X
Menu              [Cancel]    [Book Interview]                            Mary Ann - Logoff
- Candidates      Job Application Detail
- Applications                          ( 602 )
- Interview Feedbacks
- Employees       Job Application Nr: 001234        Status: Submitted ( 631 )
- Job Positions
                  Job Position: Senior Consultant Candidate Section Candidate Name: Joe Blog          Candidate Telephone: 0400345432
                  Candidate Address: 14 Hermoyne Street, West Ryde, 2115, NSW Qualification Section                                        Fig. 6

Resume: resume01.pdf [View]
                  Cover Letter: CovLetSC.pdf [View]
```

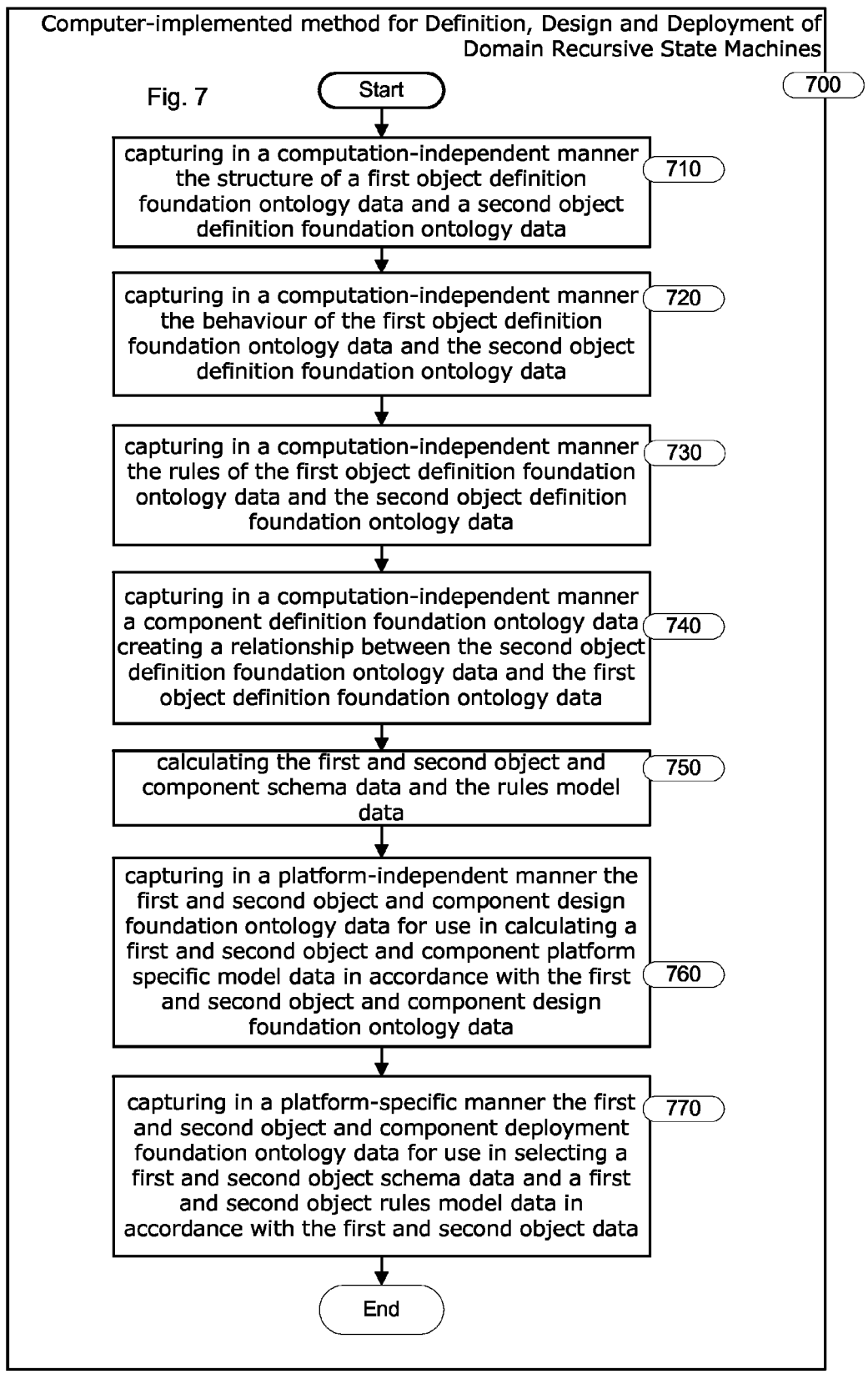

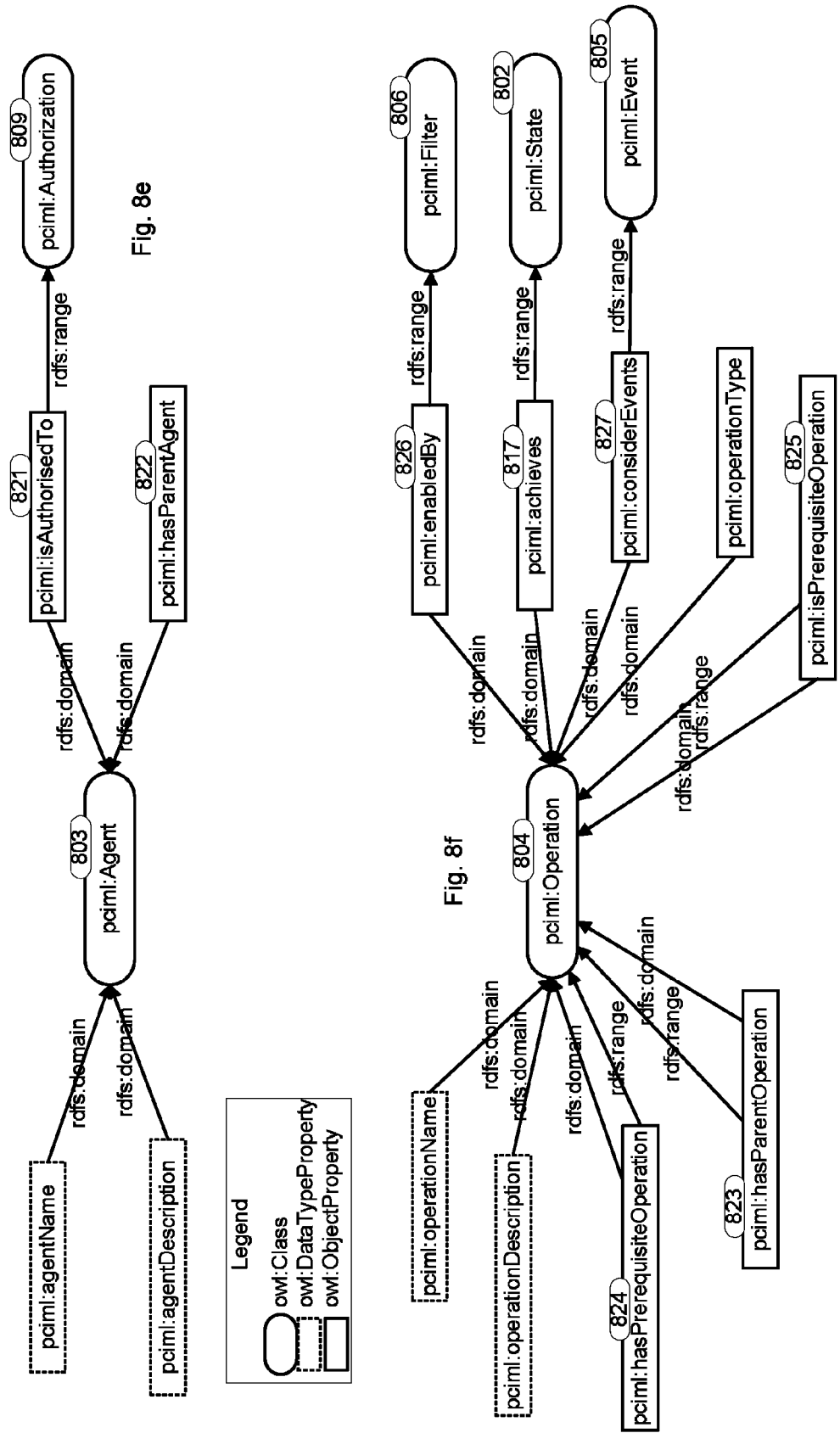

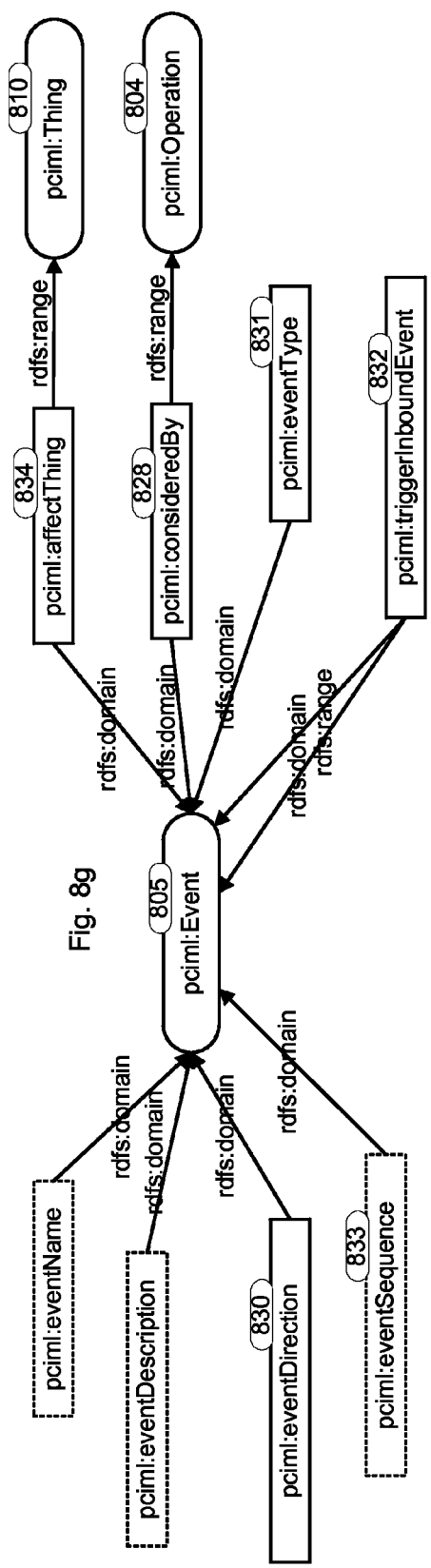
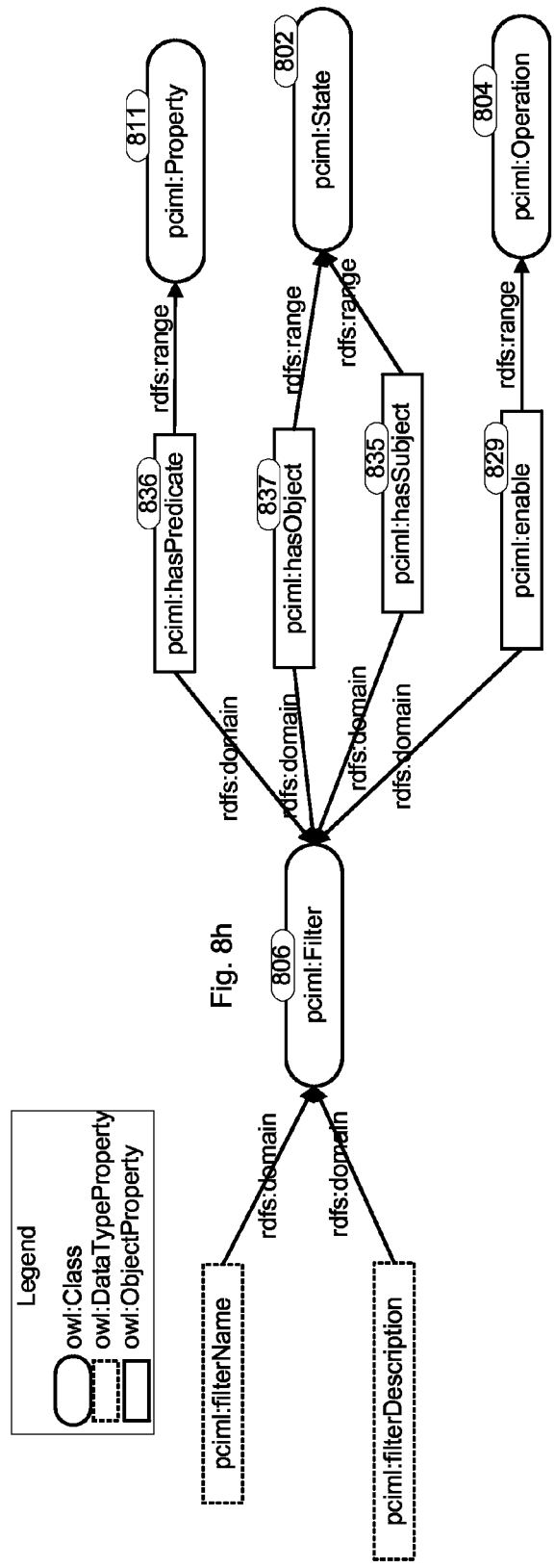
Fig. 8g
Fig. 8h

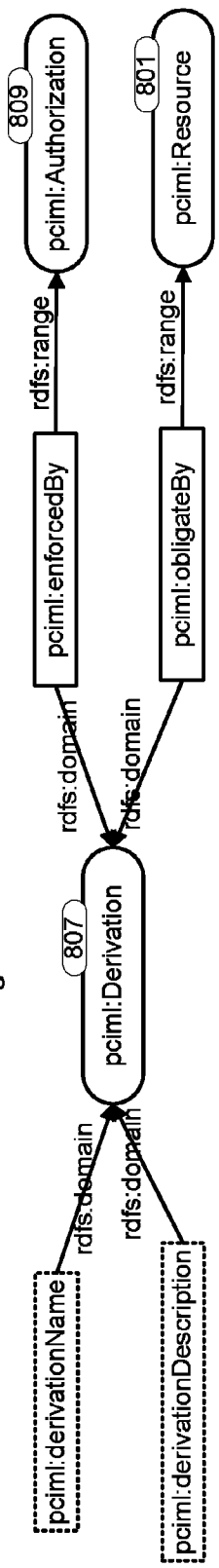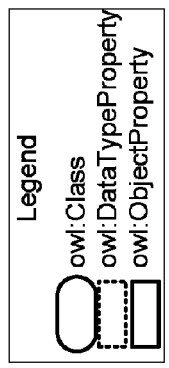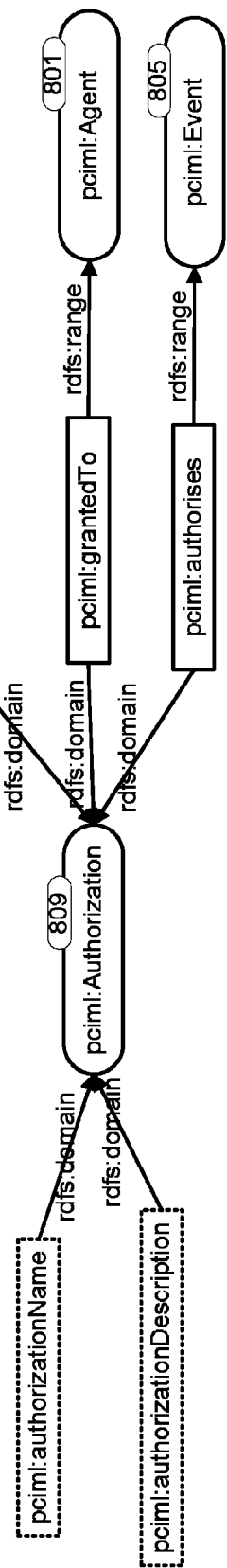
Fig. 8i
Fig. 8j

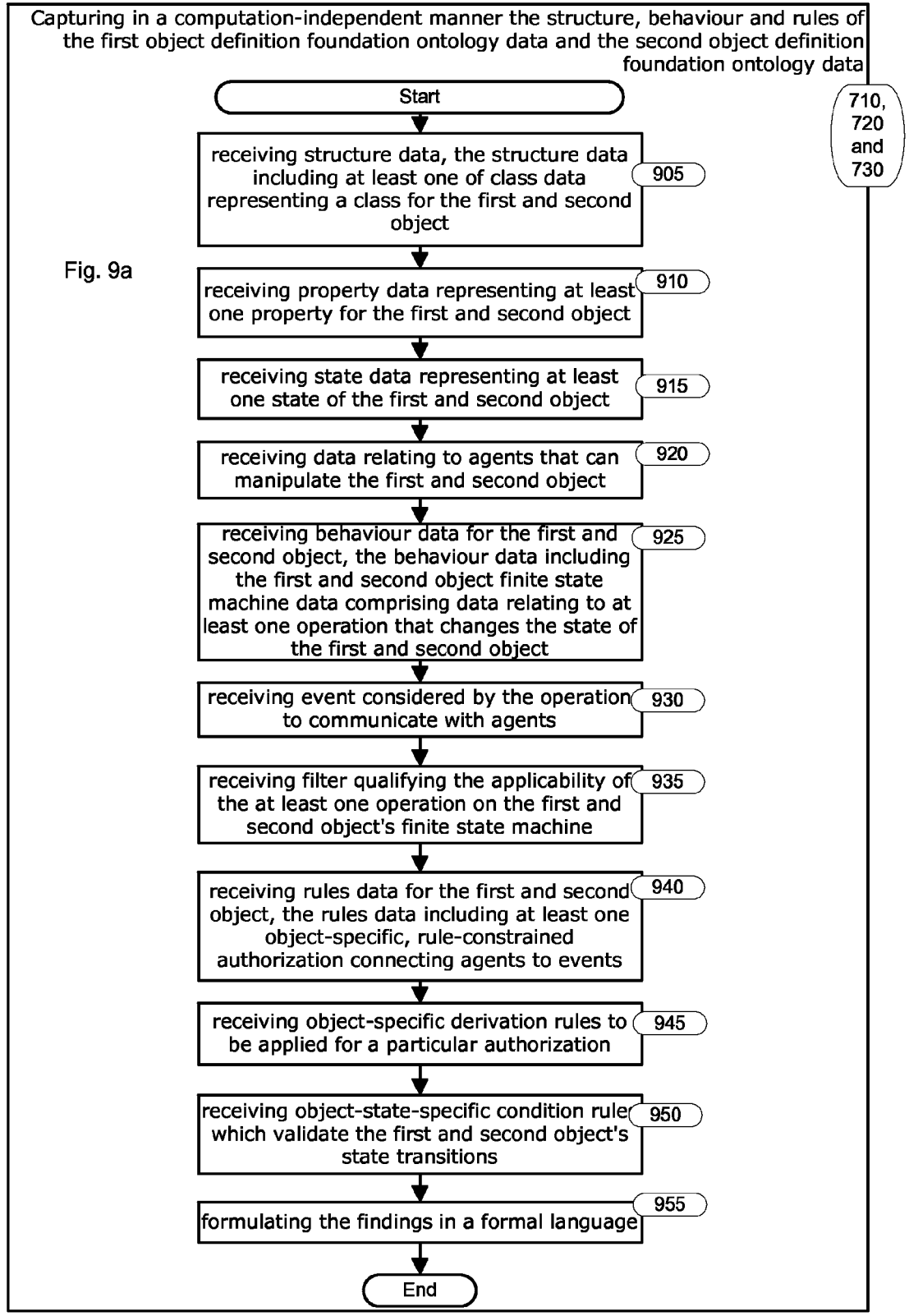

State: Approved Job Application

| | |
|---|---|
| Description: | This State defines the criteria that identifies a Job Application as approved |
| Achieved by: | Job Application Approval |
| Has Prerequisite Object: | All Interview Committed Job Application |
| Has Prerequisite Subject: | |
| Defined By: | |

| | Any Job Application with | |
|---|---|---|
| at least | 1 | Approved Date property |
| ( | | ) |

| Agent Name | has parent agent | Agents is authorised to | Agent Description |
|---|---|---|---|
| People Manager | | Self person Authorisation<br>Update Candidate Authorisation<br>View Self Authorisation | The Agent People Manager is responsible to Manage The detail of the people related to the Enterprise |
| Self Service Candidate | | Create Candidate Authorisation<br>Update Candidate Authorisation<br>View Candidate Authorisation | The Agent Self Service Candidate represents the Role of a Candidate accessing a Self Service Portal |

Fig. 9f

Events (964)

| Affect thing | Name | Considered By | Direction | Type | Sequence Nr | Trigger Inbound Event |
|---|---|---|---|---|---|---|
| Job Application | Button - Approve Job Application | Job Application Approval | Outbound | Button | | Approve Job application |
| Job Application | Approve Job application | Job Application Approval | Inbound | Data update | | |
| Job Application | Button - Save Job Application | Job Application Creation | Outbound | Button | | Save Job Application |
| Job Application | Save Job Application | Job Application Creation | Inbound | Data save | | |
| Job Application | Instantiate New Job Application | Job Application Creation | Inbound | Data create new | | |
| Job Application | Button - Open Job Application | Job Application Maintenance | Outbound | Button | | Open Job Application |
| Job Application | Menu - Create Job Application | Job Application Maintenance | Outbound | Menu | | Instantiate New Job Application |
| Job Application | Menu - Search Job Application | Job Application Maintenance | Outbound | Menu | | Search Job Application |
| Job Application | Search Job Application | Job Application Maintenance | Inbound | Data | | |
| Job Application | Open Job Application | Job Application Maintenance | Inbound | Data select | | |
| Job Application | Button - Update Job Application | Job Application Maintenance | Outbound | Button | | Update Job Application |
| Job Application | Update Job Application | Job Application Maintenance | Inbound | Data update | | |
| Job Application | Button - Reject Job Application | Job Application Rejection | Outbound | Button | | Reject Job Application |
| Job Application | Reject Job Application | Job Application Rejection | Inbound | Data update | | |
| Job Application | Button - Submit Job Application | Job Application Submission | Outbound | Button | | Submit Job Application |
| Job Application | Event - Send To Recruiter List | Job Application Submission | Outbound | Event INBOX | | |
| Job Application | Submit Job Application | Job Application Submission | Inbound | Data update | | |

Fig. 9g

Filter: Instantiated Candidate Selected (965)

Description: The Filter Instantiated Candidate Selected defines the situation where a New Candidate been selected Enable: Candidate Creation (967)

State Pattern

| Subject (835) | Predicate (836) | Object (837) |
|---|---|---|
| | | New Candidate (966) |

Filter: Created Candidate has Job Application Selected (968)

Description: The Filter Created Candidate has Job Application Selected defines the possible relationship between a created candidate and a possible job application Enable: Employee hiring (971)

State Pattern

| Subject (835) | Predicate (836) | Object (837) |
|---|---|---|
| Created Candidate (969) | has job application (970) | |

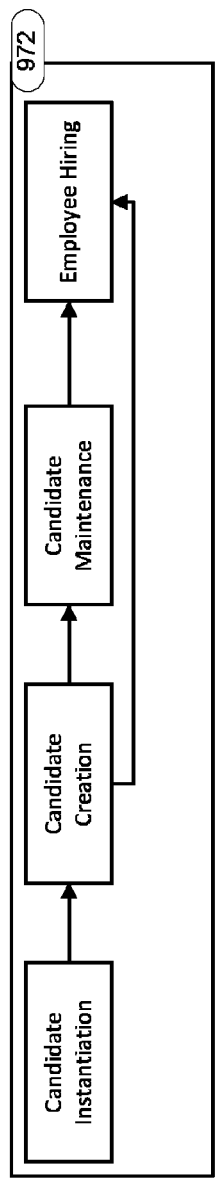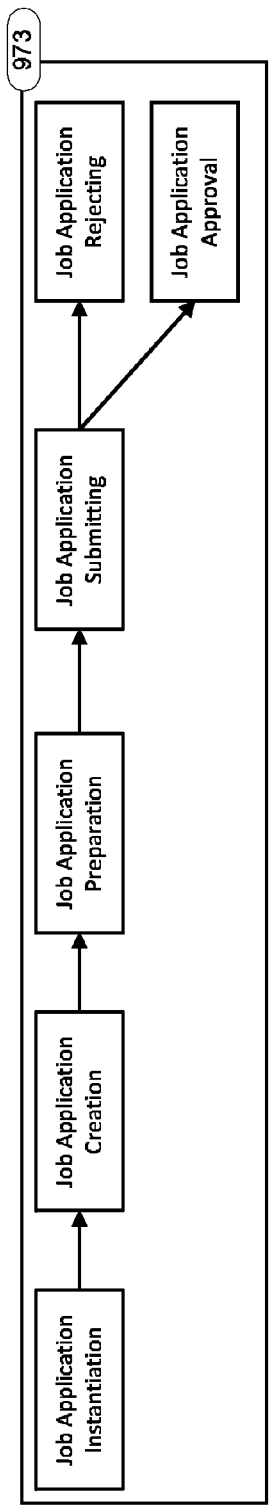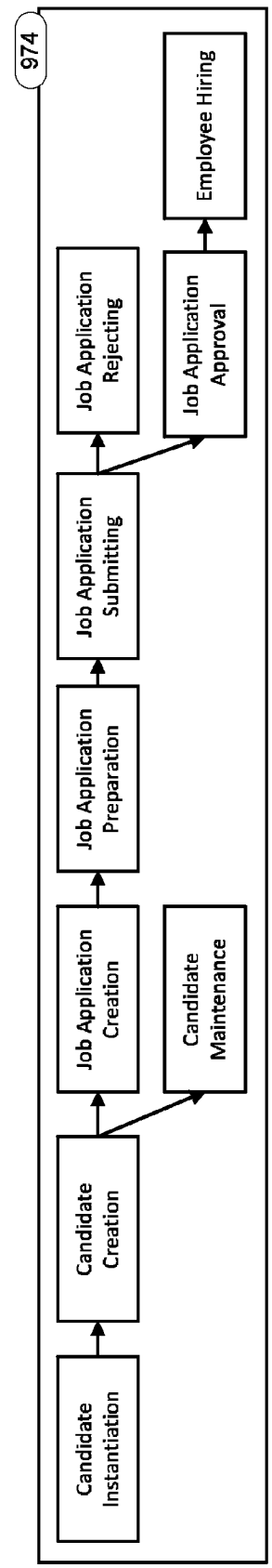
Fig. 9h

Fig. 9i

Property formulas 975

| derivation name | has Formula | From Data Set | Obligated By | enforced on |
|---|---|---|---|---|
| Age Calculation | pmda:age(?dateOfBirth) | Pmda Default Data Set for Domain | age | Question Candidate Authorization, Edit person Authorization, Update Candidate Authorization, View Person Authorization |
| Created By Default Value | pmda:User() | Pmda Default Data Set for Domain | created By | Create Candidate Authorization |
| Date Created Default Value | afn:now() | Pmda Default Data Set for Domain | date Created | Create Candidate Authorization |
| Date Updated Default Value | afn:now() | Pmda Default Data Set for Domain | date Updated | edit person Authorization, Update Candidate Authorization |
| Candidate Number Default Value | pmda:CandidateNewNumber() | Pmda Default Data Set for Domain | candidate Number | Create Candidate Authorization |
| date Approved Default Value | afn:now() | Pmda Default Data Set for Domain | Approved Date | Approve Job Application Authorization |
| date Created Default Value | afn:now() | Pmda Default Data Set for Domain | job Application Date | Create Job Application Authorization |
| date Rejected Default Value | afn:now() | Pmda Default Data Set for Domain | rejected Date | Reject Job Application Authorization |
| date Submitted Default Value | afn:now() | Pmda Default Data Set for Domain | job Application Submit Date | has Formula to submit job application, Submit Job Application Authorization |

Fig. 9j

Value Set (976)

| derivation name | Value Set code | Value Set value | From Data Set | Obligated By | enforced on |
|---|---|---|---|---|---|
| GenderValueSetValue01 | 01 | Male | | gender | Create Candidate Authorization, View Candidate Authorization, Update Candidate Authorization, View Person Authorization |
| GenderValueSetValue02 | 02 | Female | | gender | Create Candidate Authorization, View Candidate Authorization, Update Candidate Authorization, View Person Authorization |
| GenderValueSetValue03 | 03 | Not Known | | gender | Create Candidate Authorization, View Candidate Authorization, Update Candidate Authorization, View Person Authorization |
| GenderValueSetValue04 | 04 | Not Specified | | gender | Create Candidate Authorization, View Candidate Authorization, Update Candidate Authorization, View Person Authorization |
| Title Value Set Value 01 | 01 | Mr | | title | Create Candidate Authorization, View Candidate Authorization, Update Candidate Authorization, View Person Authorization |
| Title Value Set Value 02 | 02 | Mrs | | title | Create Candidate Authorization, View Candidate Authorization, Update Candidate Authorization, View Person Authorization |

Fig. 9k

| Condition Number | Condition Name | Condition Type | validate | enforces property in Condition | State Condition using criteria | Verified By | Condition Message | Arbitrated By | Condition Description |
|---|---|---|---|---|---|---|---|---|---|
| 981 | Validate Employee Age | Error | | age | Greater than | Minimum Age Employee | The person trying to apply for a Job does not meet the minimum required age for becoming an Employee | | The Condition Validate Employee Age validates if the Candidate Age is greater than the Compliance property Minimum age of Employee. If this is true, this condition returns true. This condition Validates the Minimum age employee when the Operation to Convert Candidate to employee is Enabled. |
| 982 | Validate First Name (978) | Error (982) | (981) | first Name (979) | is required (980) | | First Name is a required Property of Candidate (983) | | The Condition Validate First Name validates if the First Name has been filled. If the first name has any value this condition returns true. This condition enforces that first Name is required for a Created Candidate State to be achieved. |
| 983 | Validate Last Name | Error | | last Name | is required | | Last Name is a required Property of Candidate | | The Condition Validate Last Name validates if the Last Name property has been filled. If the last name has any value this condition returns true. This condition enforces that last Name is required for a Created Candidate State to be achieved. |
| 984 | Validate Address | Error | | has home address | is required | | Address is a required Property of Candidate | | The Condition Validate Address validates if the Address property has been filled. If the Address has any value this condition returns true. This condition enforces that Address is required for a Created Candidate State to be achieved. |
| 985 | Validate Candidate | Error | | has Candidate | is required | Pmda Default Data Set for Domain | has Candidate is required for a Job Application to be saved | | The Condition Validate Candidate validates if the has Candidate property has been filled. If the has Candidate has any value this condition returns true. This condition enforces that has Candidate is required for a Created Job Application State to be achieved. |
| 986 | Validate Job Position | Error | | has Job Position | is required | Pmda Default Data Set for Domain | has Job Position is required for a Job Application to be saved | | The Condition Validate Job Position validates if the has Job Position property has been filled. If the has Job Position has any value this condition returns true. This condition enforces that has Job Position is required for a Created Job Application State to be achieved. |
| 987 | Validate Cover Letter | Error | | has Cover Letter | is required | Pmda Default Data Set for Domain | has Cover Letter is required for a Job Application to be submitted | | The Condition Validate Cover Letter validates if the has Cover Letter property has been filled. If the has Cover Letter has any value this condition returns true. This condition enforces that has Cover Letter is required for a Submitted Job Application to be achieved. |
| 988 | Validate Resume | Error | | has Resume | is required | Pmda Default Data Set for Domain | has Resume is required for a Job Application to be submitted | Submit Job Application Authorization | The Condition Validate Resume validates if the has Resume property has been filled. If the has Resume has any value this condition returns true. This condition enforces that has Resume is required for a Submitted Job Application to be achieved. |

Fig. 9l

| authorization name | Authorization Description | Authorizations | | |
|---|---|---|---|---|
| | | Authorisers | Granted To | Constrained By |
| Approve Job Application Authorization (984) | This authorization is responsible for authorizing the approval of a Job Application | *(985)* | *(986)* | *(987)* |
| Create Candidate Authorization | This authorization is responsible for authorizing the creating a new Candidate | | | |
| Create Job Application Authorization | This authorization is responsible for authorizing the creation of a Job Application | | | |
| Edit Job Application Authorization | This authorization is responsible for authorizing the editing a Job Application | | | |
| Edit person | This authorization is responsible for authorizing the editing of a Person | | | |
| Edit person Authorization | This authorization is responsible for authorizing the editing of a Person | | | |

Fig. 10c

| www.pmdaframework.com | PCIML – BOPerson Management | John Smith - Logoff _ o X |

Definition View | Operations View | States View | Relationship View | Transition View Menu — Thing

| Label | Sub Class | Description | Has Type |
|---|---|---|---|
| Person (1024) | | The Person | Main |
| Worker | Person | The Worke | Sub |
| Candidate | Person | The Candi | Sub |

- PCIML (1016)
- (1017) - Structure
  - Agent
  - State
  - Resource
  - Thing
  - Property
- (1018) - Behaviour
  - Event
  - Operation
  - Filter
- (1019) - Rules
  - Authorization
  - Operation
  - Filter

Properties

| Name: | Person (1025) | Ok | Cancel | Delete |
| Sub Class Of: | | Ok | Cancel | Delete |
| Description: | The Person Thing describ | Ok | Cancel | Delete |
| Has Type: | Main | Ok | Cancel | Delete |

PCIML Properties
derived By: | Ok | Cancel | Delete

Incoming References

| Sub Class Of: | Candidate | Ok | Cancel | Delete |
| | Worker | Ok | Cancel | Delete |
| Is Property Of: | Age | Ok | Cancel | Delete |
| | Created By | Ok | Cancel | Delete |
| | email | Ok | Cancel | Delete |
| | has Home Address | Ok | Cancel | Delete |
| | home Phone | Ok | Cancel | Delete |
| | mobilie Phone | Ok | Cancel | Delete |
| | title | Ok | Cancel | Delete |
| | first Name | Ok | Cancel | Delete |

---

Fig. 10d www.pmdaframework.com   PCIML – BCRecruitmentManagement   John Smith - Logoff _ o X Definition View | Operations View | States View | Relationship View | Transition View

| Operation Taxonomy (1027) | Has Prerequisite Operation | Selected Operation (1028) | Is Prerequisite Operation (1030) |
|---|---|---|---|
| - Operation<br>- Recruitment Management (1037)<br>- Person Management (1039)<br>  - Candidate Creation<br>  - Candidate Instantiation<br>  - Candidate Maintenance<br>-Job Application Management (1038)<br>  - Job Application Creation<br>  - Job Application Instantiation<br>  - Job Application Maintenance | Job Application Instantiation<br>Candidate Creation | Job Application Creation (1040) | Job Application Preparation |
| | | Achieves State (1031) | |
| | | In draft Sob Application | |
| Considered Events (1032) | Review Form | Enable By Filter (1034) | Conditions (1033) |
| Save Job Application<br>Button - Save Job<br>Application | (form content) | Has Instantiated Job Application Selected | Validate Candidate<br>Validate Job Position |
| | Has Subject (1041) | Has Predicate (1042) | Has Object (1043) |
| | Created Candidate | Has Job Application | New Job Application |

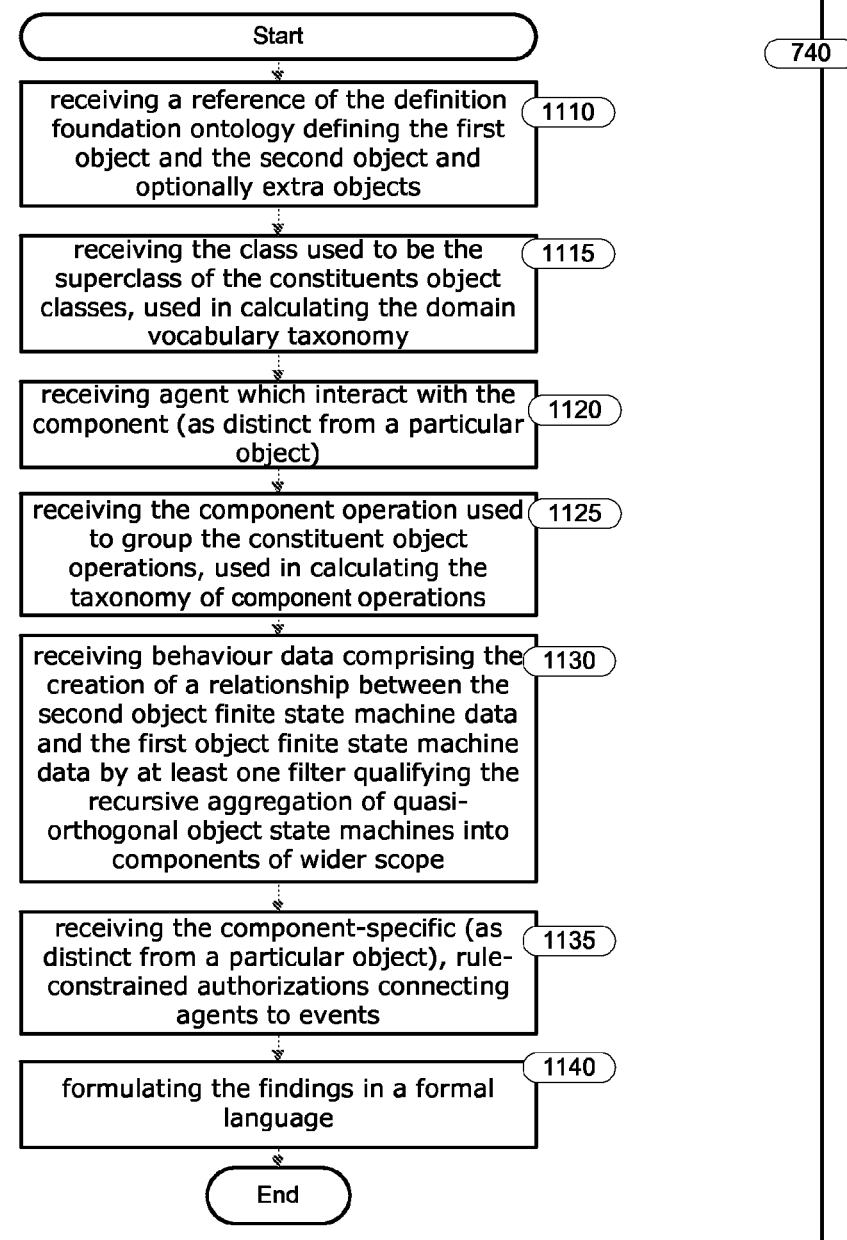

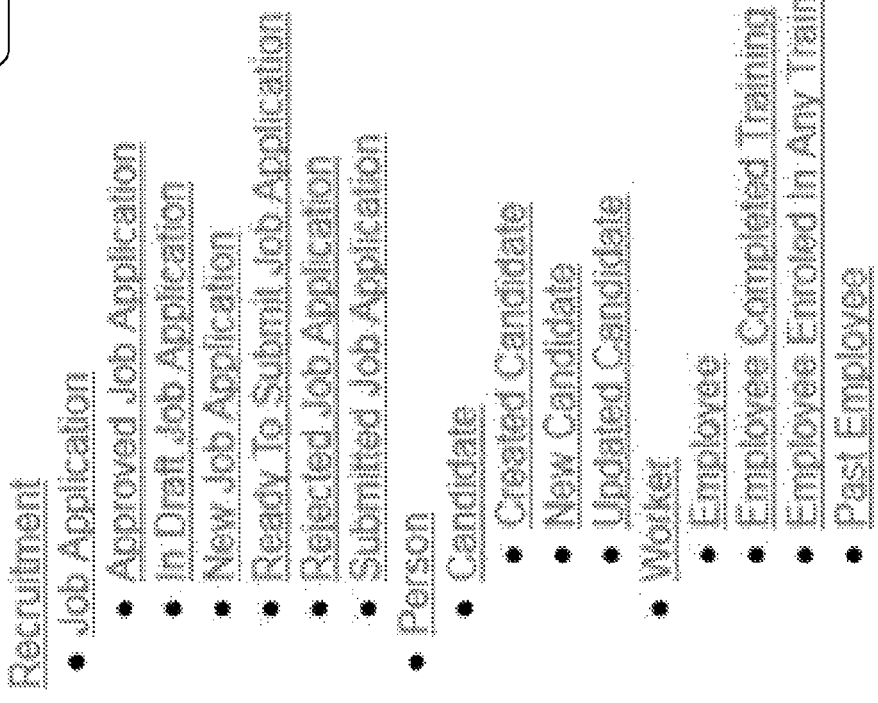
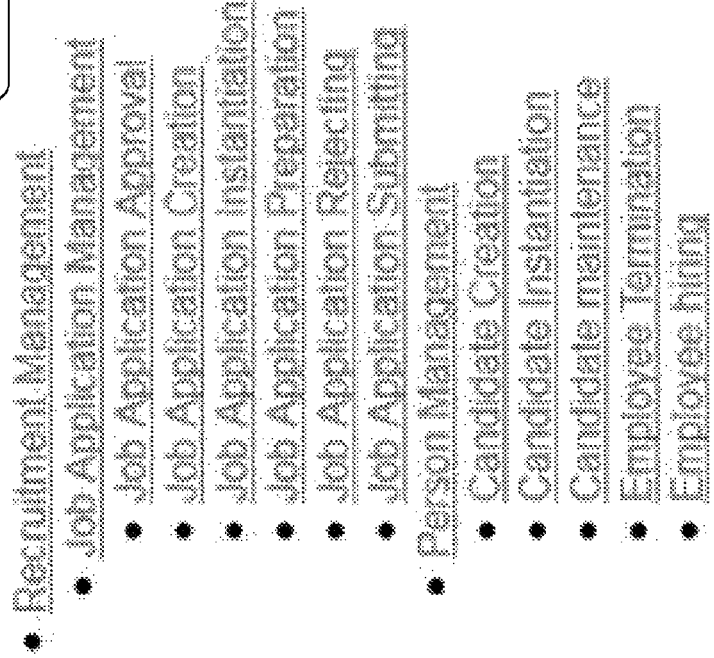
Fig. 11d

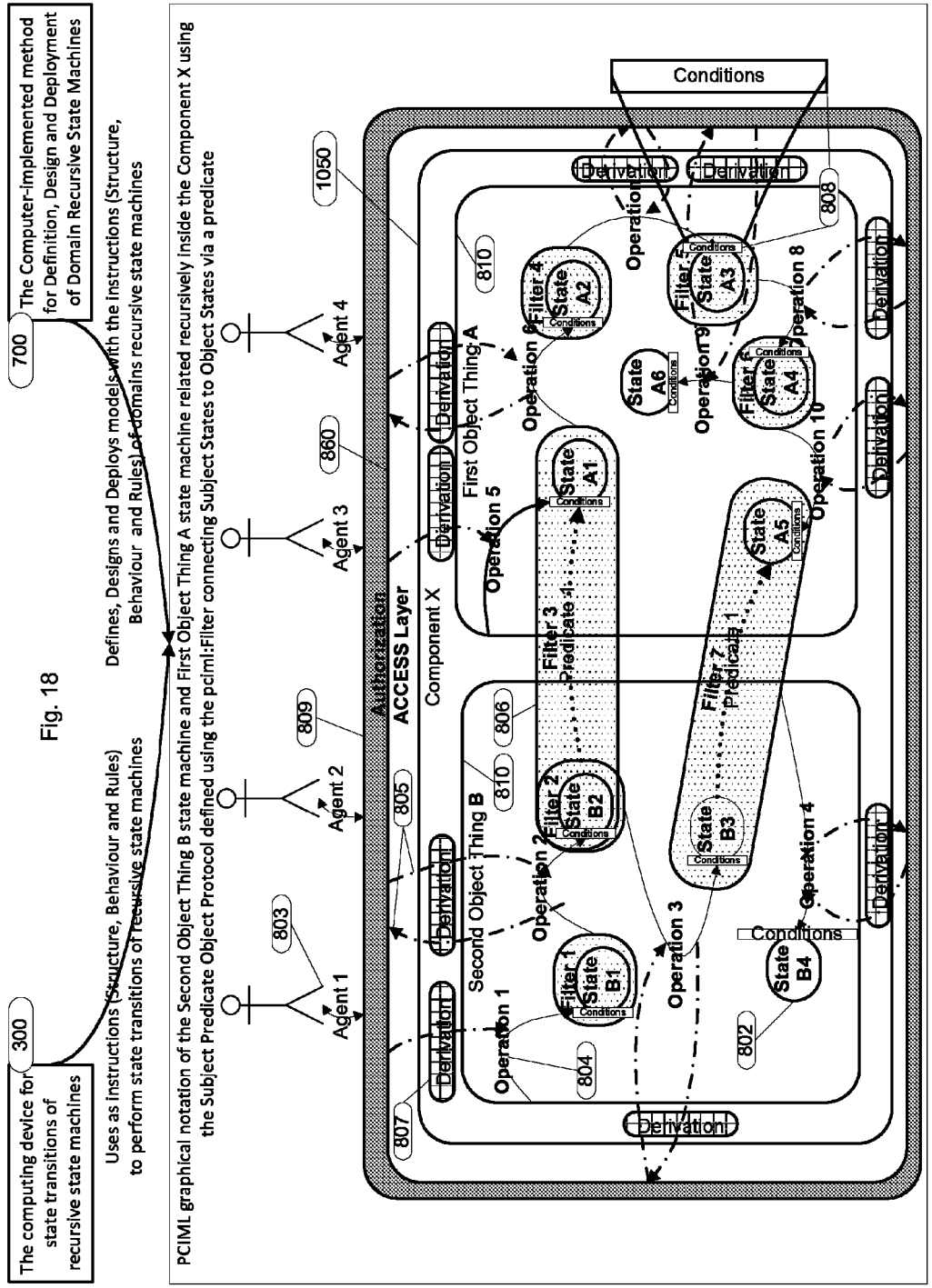

COMPUTING DEVICE FOR STATE TRANSITIONS OF RECURSIVE STATE MACHINES AND A COMPUTER-IMPLEMENTED METHOD FOR THE DEFINITION, DESIGN AND DEPLOYMENT OF DOMAIN RECURSIVE STATE MACHINES FOR COMPUTING DEVICES OF THAT TYPE

TECHNICAL FIELD

The present invention relates to the construction of an appliance that implements executable models of complex systems involving several disparate types of activity dynamics.

It has been developed primarily for the simulation of large systems involving human and automated components, particularly the type generally called "Enterprise Applications". However it is applicable to a much wider range of fields, such as cognitive modelling or robotics.

The description that follows will make use of examples drawn from a Human Resources Application and an Enterprise Framework Application, however it can be used for any application.

BACKGROUND ART

Any reference to publications or acts cited in this specification is not an admission that the disclosures constitute common general knowledge in Australia or elsewhere.
Enterprise Software History In the early days of computing, software was not thought of as an independent category of activity or product. In fact, the word software itself only acquired widespread usage in the 1960's. Up to the middle of the 1960s, there were programs, delivered to the buyer with the computing machinery (hardware) by the manufacturer. The more adventurous users slowly undertook to write their own programs in FORTRAN, Algol or, later COBOL. The first companies dedicated to developing software were founded in 1955 (Computer Usage Company) and 1959 (Computer Services Corporation), and the plan was to offer programming services.

Typically, the early applications of computers were military or scientific (mainly in fields of interest to the military or government, e.g., census, weather forecasting or mechanical translation). The first business-oriented languages were introduced in the late 1950's (FLOW-MATIC, COMTRAN, FACT, then COBOL)

The introduction of symbolic, compilable languages was the first step of abstraction in the separation of software (yet to be openly so named) from the underlying machinery. This step gave rise to two development trends leading to an independent software industry.

The first trend was motivated by the commercial imperatives of fledgling software companies. Bespoke program writing in large contracts for public or private organisations represented a narrow, constricted market, by comparison with the large field of business. There was strong incentive to develop "pre-written" products which would be usable on any machine of a certain type, or, more ambitious still, on a variety of hardware platforms (compilable, "high-level" languages made this conceivable).

Given IBM's domination of the hardware market, it is not surprising that many of the more successful software companies were founded by ex-IBM engineers.

The initial strategy was to identify a part of business activity which was similar if not identical across the range of businesses, and to reduce it to automation. Not surprisingly, the first successes were in the domain of business accounting.

The approach was extended to all repeatable aspects of business. By the early 1970s, the concept of Enterprise Resource Planning (ERP) was taking root, promoted in particular by SAP. ERP software is typically made up of modules for each business function; adopting modules from the same vendor almost guarantees perfect integration. However, not all of one company's modules are necessarily the "best of breed"; some vendors may specialise in particular areas (e.g., supply chain, or customer relationship) and produce superior products in their particular specialty. This in turn raises the issue of integrating offerings from different vendors.

At this point, the attractiveness of "packaged software" brought to the fore a new issue in business automation strategy: the "make or buy" decision. Wholly integrated solutions were typically expensive, while combining individual best-of-breed modules or developing in-house raised architecture, design and cost issues.

Software vendors responded to this new challenge in two ways. On the one hand, some vendors kept the concept of a unified business solution, but specialised to particular industry "verticals", such as banking or telecommunications. This approach enabled them to address the idiosyncratic needs of a given industry in a more precise way. Other vendors developed middleware products targeting the integration problem (transaction monitors, messaging platforms, business hubs). Middleware is positioned between system software, which addresses issues of machinery (hardware drivers and operating systems) and application software, which addresses issues of business needs.

The whole domain of Enterprise Application Integration (EAI) has proved to be a major step in the evolution of business software. Initially, EAI approaches were individual and ad hoc. Progressively, a body of wisdom and best practices emerged, and vendors followed by offering tools and products to implement those. As a result, there is a new balance in the enterprise software industry: while adopting integrated solutions from a single vendor still offers some advantages, the availability of integration resources makes best-of-breed approaches less risky.

The second trend concerns the engineering of software.

The term software engineering appeared almost simultaneously with the word software itself. Programmers, inspired by existing branches of engineering, were investigating how the engineering stance might apply to their work.

This concern with engineering was exacerbated by the software crisis in the 1960s. The lack of an established discipline for software construction has disastrous effects on software project costs and on the quality of results. The profession of software engineer was acknowledged as a result of two NATO conferences in the late 1960s.

The objective of software engineering is to apply a systematic, disciplined, quantifiable approach to the design, development, operation, and maintenance of software. This trend is independent of subject matter. The notion of reuse had flourished much earlier. As early software was free, it was shared without restraint. Some groups (e.g., IBMSHARE) offered catalogues of reusable components. But there were no principles to guide reuse.

The first successful, systematic form of reuse was based on the concept of libraries. A library offers a collection of implementation of common functions or algorithms, which can be invoked from any client program. The programmer remained responsible for designing and implementing the overarching logic flow of the program. Libraries were very successful in boosting the efficiency of programming, beginning with FORTRAN mathematic and scientific libraries.

Another approach inverted the problem: how to address a family of software tasks which share an overall logic flow, but in which small individual parts need to be customised. This gave rise to frameworks. In a typical framework, the core software can run "out of the box" and provide a useful function. This is made possible by the fact that all possible variable options have been given a "default" value. However, for each such point on the software, a mechanism is available to override the default and introduce newly defined behaviour. An interesting form of framework architecture is the "plug-in," introduced in Apache and systematised in Eclipse.

The concept of framework has been generalised to more complex arrangements, while maintaining the original characteristic of customisation points. In each case, the effect is to facilitate software development by allowing designers and programmers to devote their time to meeting requirements, rather than dealing with the details of providing a working system. Software frameworks include support programs, application programming interface (API) and tool sets that bring together all the different components to enable development of a solution. This approach is particularly suited to business software development, once the fundamental features of a given business problem are understood.

Another development in software engineering relates to the relationship between algorithms and data. According to Niklaus Wirth's formula "Algorithms+Data Structures=Programs". There is therefore a necessary coupling between some algorithms and some data structures. Identifying and investigating the nature of such couplings led to the formulation of Abstract Data Types (ADT). An ADT is a packaging of a Data type typically complex) with the functions (algorithms) which can operate on it. Expressing a software design in terms of ADT eliminates the need to manage the coupling separately, supports the factoring of the software into self-contained units which are more amenable to reuse, and supports the principle of information hiding, in that data structures are only accessible to functions which must operate on them, which protects against integrity violations and increases the potential for software quality.

The natural progression from ADT led to Objects. While ADTs are defined individually, it quickly appears that they in fact form "families" of similar types in which one is derived from another by specialisation—or conversely several can be grouped together by abstraction. Several forms of inheritance have been defined and codified in various languages. "Object-oriented programming" has known an overwhelming success, among other reasons because it is appealing to ordinary human cognition. In particular, objects defined in software engineering have often been interpreted as reflections of objects in the "real world", partly because much of object orientation arose from simulation.

On the other hand, objects tend to partition a domain of interest and fail to capture features common to different domains. Thus arose another perspective, around the concept of Aspects. Tooling has been developed to incorporate Aspect-oriented elements of code in Object-oriented software, thus taking advantage of both kinds of factoring.

All the above inventions amounted to various ways of raising the level of abstraction in the representation of what the software is meant to accomplish. In effect, the larger, more complex units identified in these efforts (library routines, framework structures, ADTs, Objects, Aspects) consisted in clustering the low-level commands to the hardware (instructions) into aggregates associated with a concept more amenable to human cognition.

The next step in this progression was the concept of a software engine, that is, a construct which had a defined, parameterised behaviour, such that the parameters could be declared in an appropriate notation ("high-level language", "4GL", etc.). In this group of innovations can be found interpreters, virtual machines, rules engines, process engines, reasoning engines, etc.

Of special importance to Enterprise applications are process engines which mechanise the execution of a (business) process. The desired behaviour of the process is declared using an appropriate language, e.g., BPMN (Business Process modeling notation). Changes in the process can now be implemented without having to write new code explicitly (with some process engines the high-level notation must be translated by a tool similar to a compiler; others are interpretive, and execute the notation directly)

Similarly, rules engine can execute rules, declared in a rule notation (e.g., Rule Speak), either interpretively or after compilation. This approach to software blurs the distinction between modelling and execution, and leads to the concept of an executable model.

If the granularity of the units identified and enacted by engines is such that they map to well-understood business concepts, the resulting software architecture is that known as Service-oriented.

Many commercial packages are architected as combinations of engine and framework: like frameworks, they provide for specific locations where the user can insert code additions to override defaults (software extensions). Like engines, they offer a rich set of parameters which can be declared by the user (configuration). However, this flexibility has strict limits: if the user introduces customisations, i.e., modifications which do not fit the prescribed extensions or configurations, the vendor offers no guarantee as to compatibility with future versions. Also, because extensions and customisations are specific to a given package, the associated concepts are not portable across packages, and cannot support an enterprise-wide approach.

Service Oriented Architecture (SOA) is an approach to address the resulting challenge. While an Enterprise's IT resources must serve the changing needs of the business, they must also be free to evolve in the best and most efficient way possible with technology trends. The concept of service supports the decoupling of Business dynamics (associated with the first trend), from Technology dynamics (associated with the second trend).

The dynamics of the business and of the information systems that support it are quite different. Business is driven internally by the enterprise mission and its strategy; and externally by the nature of the markets and by statutory obligations. Information systems are driven internally by the automation strategy (if any); and externally by technology trends and available vendors.

SOA is the first architectural approach which gives "first-class" status to the business view of services. While ITIL and other accepted norms of Information Technology refer to services, and may provide guidance on their management, there was no accurate definition of a service as such. SOA declares a service to be a unit of technology deployment which provides a definite business function. In simple terms, like a word in a language, a service within SOA has a "form"—its technical implementation and deployment—and a "meaning"—the function it provides to the business endeavour.

The analogy with language goes further. If services are like words in a language, there must be a way to combine them into meaningful "sentences" (read: service invocations must be combinable to form business-valuable scenarios). The "syntax" of a service language is called orchestration, and draws on the concepts of process engine and process notation.

The SOA approach has a major implication for IT professionals: a service's meaning is defined in the context of business operations. This means that any SOA effort presupposes a precise definition of the structure and behaviour of the business endeavour. IT Architects have long realised that they cannot devise sensible solutions without first having defined the business problem. However, in the past this definition was done piecemeal, addressed a limited scope, and took the form of a collection of requirements often lacking any sort of internal structure. SOA requires that services should be defined in a properly articulated business context, and brings to the fore the need for a Business Architecture as an essential part of the architecture of the enterprise.

With SOA, the level of abstraction has finally been raised all the way to "business value". In principle, services defined by their business value can be reused as long as the business meanings remain stable. Introduction of a new line of business might reuse some services and specify a few new ones. Innovations in technology might warrant the design of a new implementation; new deployment techniques (e.g., cloud deployment) may warrant changes in physical detail. All this can be accomplished economically and flexibly provided that the Business architecture exists to provide the base context.

The present invention is positioned at the convergence of the two trends discussed above. It supports defining a Business Architecture in terms of the activity types targeted in the first (commercial) trend, thereby leveraging the experience acquired in domain specification. It supports a fine, recursive decomposition of these domains into granular services (a necessity of structure, as will be shown in the following section on complex systems). Finally it supports the articulation of the business "meaning" of the services with a variety of implementation and deployment "forms", leveraging the engineering resources discussed in the second trend, which make it possible to anchor the conceptual business model in practical realisation.

The challenge of IT Architecture arises from the fact that Business Information Systems are complex systems, which embody several kinds of regularities at once. Any notation designed to document one kind of regularity (e.g., process) may be incompatible with notations for other kinds. A major contribution of the present invention is the devising of a meta-grammar which makes it possible to define grammars suitable for each regularity and yet to connect them as compatible formal devices. The detail of this development is the topic of the next section.

Complex Systems

The present invention arises as a response to the challenge of engineering, or simply modelling, complex systems, and addresses four characteristic issues of such systems.

Fitness for purpose: Such systems exist—or are intended to exist—within a context of intents and motivations which provide the criteria for their validity and adequacy.

Degree of Definition: The quality and precision of specification vary widely among the domains of knowledge implied by the various components.

Structural Diversity: The structure and dynamics of the components are diverse, and cannot be simply related to each other.

Interoperability: Because of this internal diversity, explicit protocols must be specified to ensure joint operation of the components.

EXAMPLE

Enterprise Architecture

A clear illustration of these issues is offered by the discipline of Enterprise Architecture, which was one of the starting points for the research which resulted in the present invention.

Fitness for Purpose

The usefulness of IT systems depends crucially on how well IT investments are aligned with business strategies. As suppliers of information systems, the IT team of an enterprise are tasked with delivering technology support to make the business more efficient, and are measured by the quality of the systems that they provide to the business. To get an overall perspective of how the systems link and flow together, they create detailed charts, maps and diagrams which together comprise an Enterprise Architecture. The Enterprise Architecture is used to describe, govern and manage the automated systems. The discipline of Enterprise Architecture, while not yet fully mature, has seen major progress over the past two decades. Theories have been elaborated, and methods developed to guide and support the work of practitioners. At the cost of some considerable effort, it is now possible to prepare and maintain effective models of the automated parts of an enterprise. Yet Enterprise Architecture still remains "headless", inasmuch as the essential motivation for its existence is not established with adequate clarity and precision. The consumers of enterprise information systems are the business stakeholders, who are tasked with managing and executing initiatives that realise business goals, and are measured by their achievement of business outcomes. Business systems are simply tools to make them more efficient in the execution of their activities. To fully realise its benefits, Enterprise Architecture must include a constituent Business Architecture, defined, governed and managed with a precision and clarity similar to those now available for the technical constituents. This is not currently the case. While several theories of business organisation are extant, there is no systematic approach to the discovery, analysis and definition of the architecture of a whole business endeavour.

ArchiMate, TOGAF and Enterprise Architect are examples, respectively, of a modelling language, a framework and a tool for Enterprise Architecture, in which some consideration is given to Business Architecture. In each, the elements associated with the definition of a business are little more than conceptual placeholders, lacking the clarity and precision of the more technical terms. The practitioner is left with little beyond a recourse to experience and intuition.

Degree of Definition

The major challenge to the construction of an adequate Business Architecture arises from the language practices within business. While business people mostly understand each other in everyday practice, difficulties arise when attempting to apply formal methods. This requires means of describing a business in a way which can be processed, using other tools, into IT specifications and—to be sufficiently ambitious—into executable artefacts (software, appliances, hardware devices, etc.) This objective of expressiveness and rigour has an obvious prerequisite: the notation must be adequate and precise. Since the notation adopted here is natural language, we are doomed to failure unless we introduce usage conventions in the form of a Controlled Vocabulary, i.e., a set of chosen words associated with an agreement to use the words of the set according to specific semantic rules controlling their denotation. For example, the term "domain" occurs quite frequently in the discussion of business activities. In spite of this common usage, there appears to be no formal definition of this term, nor even a precise understanding of its import.

At present, the practice of business modelling is primarily based on UML and BPMN. Of these, UML (Unified Modelling Language) is a general-purpose modelling language originally designed to model software. It is suitable for business modelling only by reason of its generality. In fact, practitioners must resort to the stereotype device to specialise the application of UML concepts. But there are no directing principles for this specialisation, with the consequence of incompatibility among the work of different individual practitioners.

As to BPMN (Business Process Modelling Notation), its name itself indicates that it is specialised for a narrow aspect of a business endeavour. Processes modelled using BPMN treat other aspects (e.g., the objects of the business and their lifecycles, or the groupings of such objects and functions by affinity) as peripheral or incidental.

Structural Diversity

Enterprises are typically made up of very diverse components. This is due to the fact that most have grown by accretion, and that the interactions between the parts have been set up on an ad hoc basis. This situation raises a serious challenge to the modeller: in order to be applicable to this diversity of fact, the modelling artefacts must exhibit three kinds of invariance.

Content Invariance

The modelling artefacts must not depend on the content of the components, since the subject matter of each is indefinitely variable. For example, an enterprise manufacturing widgets will also have a finance department dealing in budgets. While it makes sense to have a model for budgets and another for widgets, the means used in modelling must be uniform.

As mentioned above, UML provides the stereotype device, which is a mechanism for extending or altering the meaning, display and syntax of a model element. In other words, a stereotype allows the modeller to assign special features to a model element while at the same time assigning it to one of a few fundamental categories. As a result, the commonalities are carried by static categories, while the stereotypes allow indefinite variation in the syntax of dynamic interaction. By contrast, the present invention provides a uniform syntax for interactions, thereby making them invariant with respect to content.

Scale Invariance

Typically the analysis leading to a model will proceed by progressive decomposition. To return to the term "domain" discussed earlier, its applications range from narrow scopes (e.g., "the domain of stationery purchasing") to the full extent of an industry (e.g., "the utilities domain"); also, some "domains" can be contained within other "domains". Accordingly, any definition of the term is likely to be scale-invariant, and as a consequence have a recursive structure.

Among the existing notations, BPMN supports recursion in the specific mechanism of subprocess. On the other hand, given that its application is restricted to processes, it has nothing to offer for scale invariance in other aspects (e.g., objects or capabilities). As to UML, it allows recursion and scale invariance by default, inasmuch as the syntax of model elements is at the discretion of stereotype builders. The language itself has nothing specific to offer to guarantee scale invariance. In contrast, the present invention identifies three types of models: the Object models relate to atomic structural elements, and the Universe models define maximum extents. In between, component models provide the syntactic support for recursive decomposition.

Coupling Invariance

For the same reason, the way in which components of a modelling unit (e.g., a "domain") interact with each other (how they are coupled) must be describable using the same concepts and artefacts, regardless of the identity of the components. This kind of invariance applies to issues of governance and management mechanisms, composition mechanisms, scope and boundary specifications, etc.

In BMPN coupling of objects or functions is an incidental consequence of the defined processes. The only explicitly defined interactions are among processes themselves, either by virtue of shared objects of by intermediary events. In UML, any number of modelling constructs can induce some coupling.

By contrast, the present invention offers a single coupling mechanism, linking the lifecycles of two objects by rules which declare the states in which their interaction is possible and/or required.

Interoperability

System failures have often been traced to a failure of communication between the business agencies expressing their need for functionality and the Information technologists who were charged with supplying that need.

Necessarily, the structure and dynamics of automation and those of business systems evolve independently. It is not possible to find isomorphisms between those two worlds. In other words, when mapping business function to automation, there will appear discrepancies which must be reconciled by means of appropriate artefacts: recipes (or, to be more ambitious, algorithms) for the translation of expressed business needs to IT requirements. The formulation of such discrepancy-bridging recipes requires a suitable language.

While UML notation can be adapted by means of stereotypes, there is no provision for expressing complex mappings between models. This requires the introduction of a new notation. Proponents of Model-driven Architecture have introduced Mappings with the QVT formalism, and Marks to parameterise the mappings. However, these ideas are still at the conceptual stage, and much R&D is required to bring them to a point where their effectiveness can be assessed.

By contrast, the present invention offers the bridge mechanism. A bridge is an ontology dedicated to expressing the mapping between two sets of propositions in a semantic notation.

An Approach to Synthesis

Reactive Systems (Harel)

In the late 1980's, David Harel introduced statecharts, a very powerful means of describing reactive systems, that is, systems whose behaviour is sensitive to external events (as distinct from transformational systems, whose behaviour can be fully characterised by a fixed transfer function from input to output). He characterised statecharts as being an extension of state diagrams, in the following formula:

$$statecharts = state\text{-}diagrams + depth + orthogonality + broadcast\text{-}communication$$

In this formula, state-diagrams introduces the event-driven nature of such systems, depth provides for a hierarchical decomposition, orthogonality allows the coexistence of several parts which evolve independently of each other, while broadcast-communication provides for some degree of mutual influence between the parts.

These properties of statecharts go a long way towards addressing the challenges outlined above. Specifically, depth provides for recognising that systems are made up of parts organised at several scales, orthogonality deals with the diversity and quasi-independence of such parts, and broadcast-communication addresses the fact that parts typically do not know which other parts will be affected by their behaviour (and therefore cannot direct their messages).

Several refinements are possible, as outlined below.

Recursion

The intuitive notion of domain is used generally in discussion of enterprise systems. Its "degree of definition", as observed above, is generally vague. For the sake of a precise descriptive theory, we must either do without it or specify it adequately. Two considerations bear on a possible specification. First, the use of this term ranges from quite narrow cases (e.g., "the domain of stationery purchasing") to the full extent of an industry (e.g., "the utilities domain"); therefore there cannot be any limitation of subject matter ("content invariance").

Second, some "domains" can be contained within other "domains": this implies a hierarchical structure. Harel's statecharts provide the mechanism for hierarchical decomposition, but further refinement is needed. If distinct layers of the hierarchy are to be structured differently, it becomes necessary to identify "levels" and to assign a particular structural description to each of these levels. This fallacy has trapped many attempts at defining "domains". (For example, many process decomposition models claim to distinguish, say, three levels of process definition). The alternative is to accept that a given domain and its constituent subdomains are amenable to the same structural description. In other words, domain structure is self-similar, or scale-invariant, and the descriptive framework must be recursive.

The present invention embodies the second approach. "Domains" are taken to be properly embedded, and this hierarchy is modelled by the recursion of Component models, between the lower limit of atomic Object models and the upper limit of Universe models. The composition of models is uniformly ruled by a single mechanism (SPOP).

Limits of Recursion: Bridges

Strict self-similarity entails infinite detail at small scales: this clearly is not compatible with what we know of the components of the real world (water molecules, grains of sand, cells, etc.). So a fractal description of a natural object cannot be the whole picture. Regularities stated in a descriptive theory must be associated with a scope, that is, their applicability is limited to a range of scale or resolution in the phenomena under study.

For instance, a model of a cloud may invoke self-similarity, but this will cease to be applicable below the scale of water droplets. From the point of view of the cloud, water droplets are "atomic", or to put it another way, they are "black boxes": their internal structure is not accessible to the regularity that defines the cloud. This is not to say that such internal structure is not susceptible of description. Therefore, a water droplet participates in two kinds of regularity, one internal, in terms, say, of water molecules, the other external, in terms of its relation to the cloud. The constraint of fitting this dual structure is what we call a bridge.

From the above two observations we can construct a precise and stable concept of domain. A domain is any aggregation of subject matter which is amenable to a uniform descriptive rule. This rule may be "flat"—applying only to objects of a single scale, or recursive—applying self-similarly to a range of scales, in which case its scope will be contained between two bridges.

Event-Based Integration

The stricture of recursion has implications for the mechanism of communication. Harel's broadcast-communication is too general, in that it would allow some event in a deeply embedded subdomain to affect any part of the system directly. This is a well-known conundrum in information systems or computer science, manifested in "spaghetti code" and highlighted in such publications as Dijkstra's letter "Go To Statement Considered Harmful". More formally, this kind of undifferentiated messaging has been hemmed in by the principle of information-hiding. Communication of events can be structured by such mechanisms as hierarchical exception-handling (to climb the domain hierarchy), peer-to-peer messaging (for management of interfaces among "siblings") and delegation (whereby a construct passes an event "down" for handling by one of its children).

In the present invention, objects are "black boxes" which only expose their current state: any communication or coupling is restricted to that information. The SPOP mechanism is activated by an event and applies to whichever constructs are selected by rules.

Manifestation & Discrepancies

All of the above discussion is confined to one fold of modelling of a system.

Typically, the approach to the modelling is threefold. One may focus on the conceptual, in which a system is view in terms of intents, motivations and capabilities. Or one may consider the logical organisation, addressing the sequencing, dependencies and collaborations. Finally one may address the issues of implementation, whether through manual processes or automation.

The relationship between these folds is called manifestation. Thus logical structure manifests conceptual intent, and implementation manifests logical structure. Clearly there would not be a need for three folds if the structures were isomorphic. But the fact is that each of these folds has its own dynamics, is organised differently at any one time and evolves at different rates and in different directions. There is therefore a need to spell out the manifestation mappings. It goes without saying that only the non-isomorphic parts need to be specified. There are two aspects to those. On the one hand there are many-to-many mappings between elements in each fold.

On the other, and more intricate, there are atomic elements in one fold manifesting, or manifested by non-atomic structures in another. Such cases are called discrepancies, and are the source of much of the systems' complexity.

In the present invention, as discussed above, such discrepancies are handled by bridges. There are currently two bridge types. One manages the concept-to-design discrepancies by declaring semantic interconnections between the business systems definition (business CIM) and a defined structure and dynamics of automation (technical CIM) which is intended as the basis of design. The other manages the design-to-implementation discrepancies by declaring semantic interconnections between the business systems design (business PIM) and a defined structure and dynamics of machinery (platform CIM) which is intended as the platform for deployment.

DISCLOSURE OF INVENTION

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium.

The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Furthermore, some of the embodiments are described herein as a computer-implemented method or combination of elements of a method that must necessarily be implemented by a processor of a processor device, computer system, or by other computational device. Thus, a processor with the necessary instructions for carrying out such a method or element of a method forms a means for carrying out the method or element of a method.

Generally the invention comprises a computing device for state transitions of recursive state machines and a computer-implemented method for the definition, design and deployment of domain recursive state machines for computing devices of that type; such devices are intended for the simulation of large systems involving human and automated components, particularly the type generally called "Enterprise Applications"; such devices are also applicable to a much wider range of fields, such as cognitive modelling or robotics. The commonality between the computing device and the computer-implemented method is the Subject Predicate Object Protocol (SPOP) which is used to capture instructions using the computer-implemented method for the definition, design and deployment of recursive state machines and also used as the protocol used by the computing device for state transitions of recursive state machines to communicate inbound and outbound events based on the captured instructions. When executing the computer-implemented method for the Definition, Design and Deployment of domain recursive state machines 700, the Subject Predicate Object Protocol SPOP is captured during the domain definition using the PCIML construct Filter 806 (pciml:Filter) to capture and relate the objects 1010 finite state machines recursively to form components 1020 and universes 1030 behaviour which is then implemented by the PPIML Construct SPOP 1306 (ppiml:SPOP) which is then deployed using the PPSML Construct Rules Engine 1508 (ppsml:RulesEngine) which accesses the schema data, rules model data, data instances data and platform Specific Template Instances of objects configured using the PPSML Construct Repository Schema 1501 (ppsml:RepositorySchema) and the PPSML Construct Rules Repository 1507 (ppsml:RulesRepository) and the PPSML Construct Data Repository 1506 (ppsml:DataRepository) and the PPSML Construct Interface 1505 (ppsml:Interface) respectively. The Subject Predicate Object Protocol SPOP becomes then the protocol of communication via events received and sent by the computing device for state transition of recursive state machines (ESTCA) 300.

In a preferred embodiment of the invention, a computing device for state transitions of recursive state machines, the computing device comprising:

a processor for processing digital data;

a memory device for storing digital data including computer program code coupled to the processor;

a data interface for sending and receiving data coupled to the processor, wherein the processor is controlled by the computer program code to:

receive via the data interface, event data representing an event in relation to a first object;

receive via the data interface, first object data representing the first object;

receive via the data interface, second object data representing a second object;

receive via the data interface, data representing a relationship between the second object and the first object;

calculate a first state in relation to the first object;

calculate a second state in relation to the second object; and calculate a valid state transition in accordance with the relationship between the second state and the first state.

Preferably, in calculating the valid state transition, the device further comprises:

selecting a first object schema data and a first object rules model data in accordance with the first object data;

selecting a second object schema data and a second object rules model data in accordance with the second object data; and calculating the valid state transition further in accordance with the first object schema data and the first object rules model data and the second object schema data and the second object rules model data.

Preferably, in calculating the valid state transition involves:

validating the first object data in accordance with a condition from the first object rules model data and/or first object schema data.

Preferably, if the condition is untrue it is not a valid state transition and the device further comprises sending condition constraint data representing the untrue condition.

Preferably, if the condition is true it is a valid state transition and the device further comprises:

storing the first object data in the memory store; and storing optionally the second object data in the memory store.

Preferably, in storing the first object data in the memory store, the device further comprises calculating a valid action for the valid state transition.

Preferably, in calculating the valid action, the device further comprises sending valid event data representing the valid action.

Preferably, the valid event data further comprises the first object data, second object data and the data representing a relationship between the second object data and the first object data.

Preferably, in selecting a first object schema data and a first object rules model data in accordance with the first object data and selecting a second object schema data and a second object rules model data in accordance with the second object data, comprises defining, designing and deploying domain recursive state machines comprising the steps of:
  i. capturing in a computation-independent manner the structure of a first object definition foundation ontology data and a second object definition foundation ontology data;
  ii. capturing in a computation-independent manner the behaviour of the first object definition foundation ontology data and the second object definition foundation ontology data;
  iii. capturing in a computation-independent manner the rules of the first object definition foundation ontology data and the second object definition foundation ontology data;
  iv. capturing in a computation-independent manner a component definition foundation ontology data creating a relationship between the second object definition foundation ontology data and the first object definition foundation ontology data;
  v. calculating the schema data and the rules model data;
  vi. capturing in a platform-independent manner the design foundation ontology data; and
  vii. capturing in a platform-specific manner the deployment foundation ontology data.

In another preferred embodiment of the invention, a computer-implemented method for definition, design and deployment of domain recursive state machines comprising the steps of:
  i. capturing in a computation-independent manner the structure of a first object definition foundation ontology data and a second object definition foundation ontology data;
  ii. capturing in a computation-independent manner the behaviour of the first object definition foundation ontology data and the second object definition foundation ontology data;
  iii. capturing in a computation-independent manner the rules of the first object definition foundation ontology data and the second object definition foundation ontology data;
  iv. capturing in a computation-independent manner a component definition foundation ontology data creating a relationship between the second object definition foundation ontology data and the first object definition foundation ontology data;
  v. calculating the schema data and the rules model data;
  vi. capturing in a platform-independent manner the design foundation ontology data; and
  vii. capturing in a platform-specific manner the deployment foundation ontology data.

Preferably, the step of capturing in a computation-independent manner the structure of the first object definition foundation ontology data and the second object definition foundation ontology data comprises:
  i. receiving structure data for the first object, the structure data including at least one of class data representing a class for the first object and receiving structure data for the second object, the structure data including at least one of class data representing a class for the second object;
  ii. receiving property data representing at least one property for the first object and receiving property data representing at least one property for the second object;
  iii. receiving state data representing at least one state of the first object and receiving state data representing at least one state of the second object;
  iv. receiving data relating to agents that can manipulate the first object and receiving data relating to agents that can manipulate the second object; and
  v. formulating the findings in a formal language.

Preferably, the step of capturing in a computation-independent manner the behaviour of the first object definition foundation ontology data and the second object definition foundation ontology data comprises:
  i. receiving behaviour data for the first object, the behaviour data including a first object finite state machine data comprising data relating to at least one operation that changes the state of the first object and receiving behaviour data for the second object, the behaviour data including a second object finite state machine data comprising data relating to at least one operation that changes the state of the second object;
  ii. receiving an event considered by the operation to communicate with agents;
  iii. receiving a filter qualifying the applicability of the at least one operation on the first object's finite state machine and receiving a filter qualifying the applicability of the at least one operation on the second object's finite state machine; and
  iv. formulating the findings in a formal language.

Preferably, the step of capturing in a computation-independent manner the rules of the first object definition foundation ontology data and the second object definition foundation ontology data comprises:
  i. receiving rules data for the first object and second object, the rules data including at least one object-specific, rule-constrained authorization connecting agents to events;
  ii. receiving object-specific derivation rules to be applied for a particular authorization;
  iii. receiving object-state-specific condition rules which validate the first object and second object state transitions; and
  iv. formulating the findings in a formal language.

Preferably, the step of capturing in a computation-independent manner a component definition foundation ontology data creating a relationship between the second object definition foundation ontology data and the first object definition foundation ontology data comprises:
  i. receiving a reference of the first object definition foundation ontology data defining the first object; and
  ii. receiving a reference of the second object definition foundation ontology data defining the second object.
  iii. receiving behaviour data comprising the creation of a relationship between the second object finite state machine data and the first object finite state machine data by at least one filter qualifying the recursive aggregation of quasi-orthogonal object state machines into components of wider scope; and
  iv. formulating the findings in a formal language.

Advantageously, the method includes a frame-based definition view for receiving the definition foundation ontology data.

Preferably, the calculating the schema data and the rules model data comprises:
  i. calculating a first object schema data and a first object rules model data from the first object definition foundation ontology data defining the first object;
  ii. calculating a second object schema data and a second object rules model data from the second object definition foundation ontology data defining the second object; and
  iii. calculating the component schema data and component rules model data from the component definition foundation ontology data defining the component.

Advantageously, in calculating the schema data and the rules model data:
  i. the first object schema data is comprised of a logically equivalent ontology for the first object;
  ii. the second object schema data is comprised of a logically equivalent ontology for the second object; and
  iii. the component schema data is comprised of a logically equivalent ontology for the component relating the logically equivalent ontology for the second object and logically equivalent ontology for the first object.

Advantageously, in generating the logically equivalent ontology includes generating models that meets W3C Web Ontology Language (OWL) specification.

Advantageously, in calculating the schema data and the rules model data:
  i. the first object schema data is comprised of a physical database schema of the first object table;
  ii. the second object schema data is comprised of a physical database schema of the second object table; and
  iii. the component schema data is comprised of a physical database schema relationship between the second object table and first object table.

Advantageously, in generating the physical database schema includes generating schema that meets the formal language supported by a database management system (DBMS).

Advantageously, in calculating the schema data and the rules model data:
  i. the first object rules model data is comprised of a first object inference notation data;
  ii. the second object rules model data is comprised of a second object inference notation data; and
  iii. the component rules model data is comprised of a component inference notation data composed by the first object inference notation data and the second object inference notation data.

Advantageously, in generating the inference notation data includes generating data that meets W3C SPARQL Inference Notation (SPIN) specification.

Advantageously, it further comprising the step of providing a frame-based view for data entry type applications to capture first object, second object and component data in accordance with the first object schema data and first object rules model data, second object schema data and second object rules model data and component schema data and component rules model data.

Advantageously, the computer-implemented method for definition, design and deployment of domain recursive state machines, further comprising validating the first object definition foundation ontology data in accordance with definition foundation ontology.

Advantageously, the computer-implemented method for definition, design and deployment of domain recursive state machines, the method includes the additional step of simulating the first object finite state machine data in accordance with the first object definition foundation ontology data.

Advantageously, in simulating the first object finite state machine data in accordance with the first object definition foundation ontology data involves the use of a series of frame-based views.

Advantageously, the computer-implemented method for definition, design and deployment of domain recursive state machines, the method includes the additional step of generating a definition type report in accordance with the first object definition foundation ontology data or the second object definition foundation ontology data or the component definition foundation ontology data.

Advantageously, the computer-implemented method for definition, design and deployment of domain recursive state machines, the method includes the ability to maintain a library of business object models the library comprising:
  i. a library of a plurality of business object definition foundation ontology data models; and
  ii. a library of a plurality of independent business component definition foundation ontology data models comprised of a number of business object definition foundation ontology data models.

Advantageously, the computer-implemented method for definition, design and deployment of domain recursive state machines, the method includes the ability to maintain a library of domain specific language the library comprising:
  i. a library of a plurality of technical object definition foundation ontology data models; and
  ii. a library of a plurality of independent technical component definition foundation ontology data models comprised of a number of technical object definition foundation ontology data models.

Preferably, in capturing in a platform independent manner the design foundation ontology data comprises:
  i. capturing in a platform-independent manner a first object design foundation ontology data and a second object design foundation ontology data; and
  ii. capturing in a platform-independent manner a component design foundation ontology data.

Preferably, in capturing in a platform-independent manner the first object design foundation ontology data and the second object design foundation ontology data and the component design foundation ontology data comprises:
  i. receiving communication means required to connect the objects with appropriate agents;
  ii. receiving output means for state-specific representations of objects;
  iii. receiving elements required to build the outputs based on object requirements;
  iv. receiving actions required to implement the events that can be emitted with the output;
  v. receiving services required to implement the operations used to move objects through their states;
  vi. receiving subject predicate object protocols means that implement filters responsible for enabling services;
  vii. receiving permissions used to connect agents to a communication means or to authorise component and outputs via actions;
  viii. receiving templates declaring the formulas implemented inside functionality-specific models used to calculate derivation rules;
  ix. receiving rule-defined constructs from the objects' rule models used to validate conditions; and
  x. formulating the findings in a formal language.

Advantageously, the computer-implemented method for design of domain recursive state machines, the method includes providing a frame-based view for receiving the design foundation ontology data.

Advantageously, the computer-implemented method for design of domain recursive state machines, the method includes one or more of the following additional steps:
   i. calculating a first object platform specific model data in accordance with the first object design foundation ontology data;
   ii. calculating a second object platform specific model data in accordance with the second object design foundation ontology data;
   iii. calculating a component platform specific model data in accordance with the component design foundation ontology data;
   iv. generating at least one canonical model in accordance with the first object definition foundation ontology data in relation to the first object design foundation ontology data; and
   v. integrating the first object and second object at the definition level inside a component definition foundation ontology data and not at the design foundation ontology data.

Advantageously, the computer-implemented method for design of domain recursive state machines, the method comprises the additional step of calculating a Data and Application Architecture type report.

Preferably, in capturing in a platform specific manner the deployment foundation ontology data is comprised of the following steps:
   i. Capturing in a platform-specific manner a first object deployment foundation ontology data and a second object deployment foundation ontology data; and
   ii. Capturing in a platform-specific manner a component deployment foundation ontology data.

Preferably, in capturing in a platform-specific manner the first object deployment foundation ontology data and the second object deployment foundation ontology data and the component deployment foundation ontology data is comprised of the following steps:
   i. receiving addresses of all platform items required for implementing the objects and their agents;
   ii. receiving environments specification that provide agents the object-specific operations and user interface functionality;
   iii. receiving repository schemas that implement the object and component schemas;
   iv. receiving interfaces that embodies the PSM (Platform Specific Model) used by the each object or component to communicate;
   v. receiving application servers specifications that are used to implement the interface for a particular object;
   vi. receiving data repository items used to store the objects;
   vii. receiving security means used to protect the object;
   viii. receiving rules engines that are used for each domain object;
   ix. receiving rules repository items used to store the object rules; and
   x. formulating the findings in a formal language.

Advantageously, the computer-implemented method for deployment of domain recursive state machines, the method includes providing a frame-based view for receiving the deployment foundation ontology data.

Advantageously, the computer-implemented method for design of domain recursive state machines, the method comprises one or more of the following additional steps:
   i. deploying the first object schema data and first object rules model data;
   ii. deploying the second object schema data and second object rules model data; and
   iii. deploying the component schema data and component rules model data.

Advantageously, the computer-implemented method for deployment of domain recursive state machines, the method comprises the additional step of calculating a Technology Architecture type report.

Advantageously, the computer-implemented method for design of domain recursive state machines, the method comprises the additional step of calculating the equivalent to UDDI (Universal Description Discovery and Integration) information type configuration file.

Advantageously, with a plurality of computing devices, each device is adapted to:
   process different events related to the first object schema data and the first object rules model data, the second object schema data and the second object rules model data and the component schema data and the component rules model data.

Advantageously, with a plurality of computing devices, the devices are further adapted to perform process orchestration of the different events processed by the plurality of computing devices.

Advantageously, with a plurality of computing devices, at least one of the devices is further adapted to perform framework type events used to manage:
   i. receiving business object's definition foundation ontology data and business component's definition foundation ontology data;
   ii. calculating business object's schema data and object's rules model data and business component's schema data and component's rules model data;
   iii. receiving object's business design foundation ontology data and component's business design foundation ontology data;
   iv. receiving object's business deployment foundation ontology data and component's business deployment foundation ontology data; and
   v. manage the relationship between business object's definition foundation ontology data and business object's schema data and business object's rules model data and business object's design foundation ontology data and business object's deployment foundation ontology data.

BRIEF DESCRIPTION OF THE DRAWINGS

Notwithstanding any other forms which may fall within the scope of the present invention, preferred embodiments of the invention will now be described, by way of example only, with reference to the accompanying drawings in which:

FIG. 5 shows the part of the computing device for State Transitions of Recursive State Machines ESTCA (Event, State, Transition, Condition and Action) responsible for managing the action in accordance with an embodiment of the present invention;

FIG. 6 shows an exemplary graphical user interface generated in accordance with an embodiment of the present invention;

FIG. 7 shows the computer-implemented method for the definition, design and deployment of domain recursive state machines for computing devices for State Transitions of Recursive State Machines ESTCA (Event, State, Transition, Condition and Action) responsible for building the domain specific source models in accordance with an embodiment of the present invention;

FIG. 8e shows the pciml:Agent 803 structure displaying all its domain properties with its ranges in accordance with an embodiment of the present invention;

FIG. 8f shows the pciml:Operation 804 structure displaying all its domain properties with its ranges in accordance with an embodiment of the present invention;

FIG. 8g shows the pciml:Event 805 structure displaying all its domain properties with its ranges in accordance with an embodiment of the present invention;

FIG. 8h shows the pciml:Filter 806 structure displaying all its domain properties with its ranges in accordance with an embodiment of the present invention;

FIG. 8j shows the pciml:Authorization 809 structure displaying all its domain properties with its ranges in accordance with an embodiment of the present invention;

FIG. 8l shows the PCIML graphical notation of the Second Object (B) and First Object (A) definition in accordance with an embodiment of the present invention;

FIG. 9a shows part of the computer-implemented method for the definition of domain recursive state machines for computing devices for State Transitions of Recursive State Machines ESTCA (Event, State, Transition, Condition and Action) responsible for building the definition foundation ontology data model to provide for the definition of structure, behaviour and rules for the objects of interest in accordance with an embodiment of the present invention;

FIG. 9c shows the Job Application PCIML Model pciml:State definition examples extracted from a report in accordance with an embodiment of the present invention;

FIG. 9d shows the Person PCIML Model pciml:Agent definition examples extracted from a report in accordance with an embodiment of the present invention;

FIG. 9f shows the Job Application PCIML Model pciml:Event definition examples extracted from a report in accordance with an embodiment of the present invention;

FIG. 9g shows the Person PCIML Model pciml:Filter definition examples extracted from a report in accordance with an embodiment of the present invention;

FIG. 9h shows the Operation sequence diagram generated from the Person and Job Application Object PCIML Model and Recruitment Management Domain PCIML Model extracted from a report in accordance with an embodiment of the present invention;

FIG. 9i shows the Person and Job Application PCIML Model pciml:Derivation formulas definition examples extracted from a report in accordance with an embodiment of the present invention;

FIG. 9j shows the Person PCIML Model pciml:Derivation value sets definition examples extracted from a report in accordance with an embodiment of the present invention;

FIG. 9k shows the Person and Job Application PCIML Model pciml:Condition definition examples extracted from a report in accordance with an embodiment of the present invention;

FIG. 9l shows the Person and Job Application PCIML Model pciml:Authorization definition examples extracted from a report in accordance with an embodiment of the present invention;

FIG. 10c shows the PCIML frame-based definition view form used to capture the definition foundation ontology data;

FIG. 10d shows the PCIML operations frame-based view used for simulations of the definition foundation ontology data;

FIG. 11a shows part of the computer-implemented method for the definition of domain recursive state machines for computing devices for State Transitions of Recursive State Machines ESTCA (Event, State, Transition, Condition and Action) responsible for building the definition foundation ontology data that captures the component's structure, state machine and governance rules by including and connecting constituent objects in accordance with an embodiment of the present invention;

FIG. 11d shows the example of the Recruitment Management vocabulary taxonomy and the Recruitment Management operation taxonomy in accordance with an embodiment of the present invention;

FIG. 18 shows the relationship between the computer-implemented method for the Definition, Design and Deployment of domain recursive state machines 700 with the computing device for state transition of recursive state machines (ESTCA) 300 using the Subject Predicate Object Protocol SPOP. This Fig is also the Abstract Figure.

MODES FOR CARRYING OUT THE INVENTION

Figure 1:
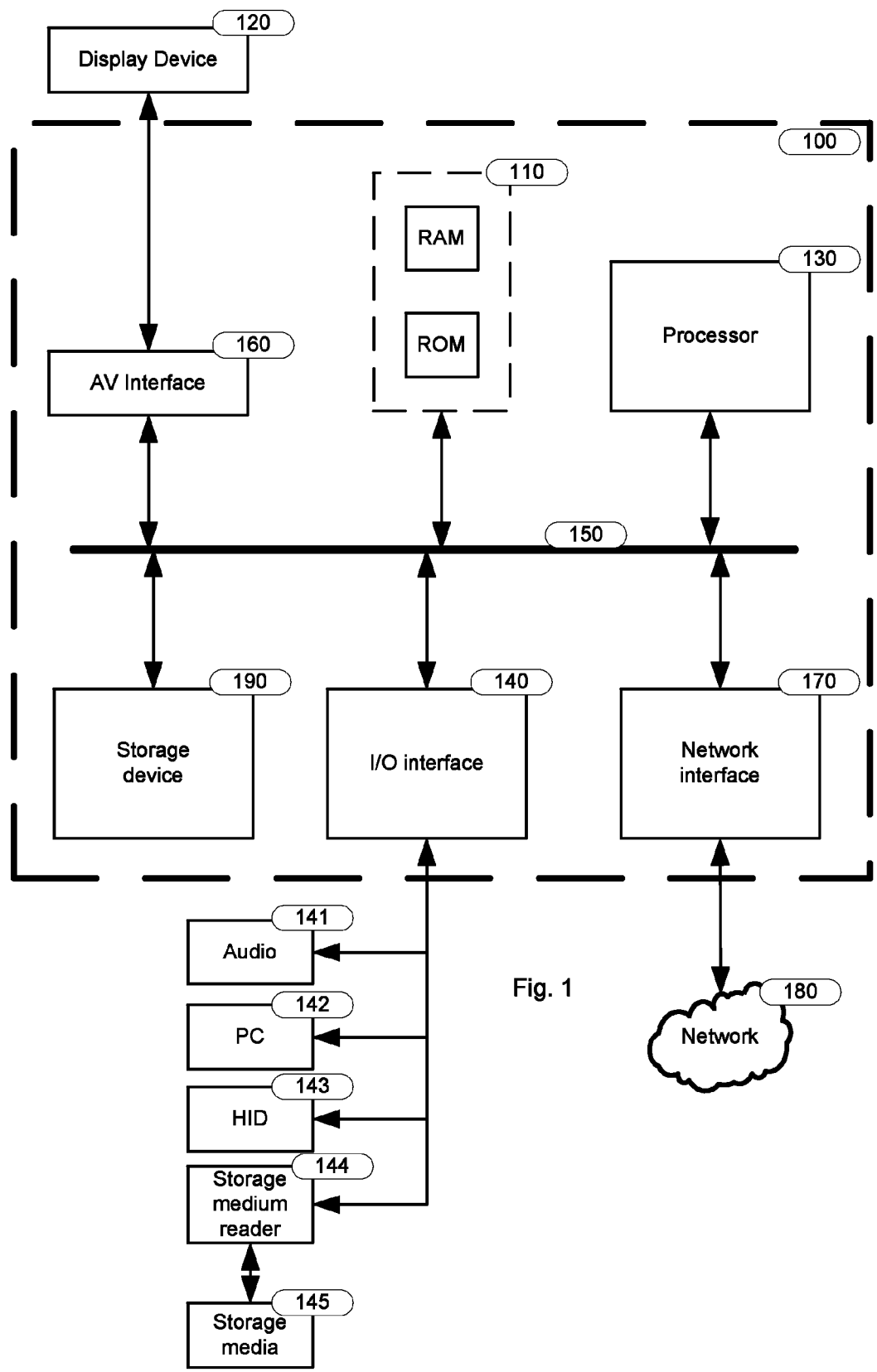
FIG. 1 shows a computing device on which the various embodiments described herein may be implemented in accordance with an embodiment of the present invention.

It should be noted in the following description that like or the same reference numerals in different embodiments denote the same or similar features.

FIG. 1 shows a computing device 100 on which the various embodiments described herein may be implemented. In particular the steps of the method for state transitions of recursive state machines may be implemented as computer program code instructions executable by the computing device 100. The computer program code instructions may be divided into one or more computer program code instruction libraries, such as dynamic link libraries (DLL) or resource description framework (RDF) of The Web Ontology Language (OWL) file libraries, wherein each of the libraries performs a one or more steps of the method. Additionally, a subset of the one or more of the libraries may perform graphical user interface tasks enabling the communication of events between agents and the computing device 100.

The device 100 comprises semiconductor memory 110 comprising volatile memory such as random access memory (RAM) or read only memory (ROM). The memory 100 may comprise either RAM or ROM or a combination of RAM and ROM.

The device 100 comprises a computer program code storage medium reader 144 for reading the computer program code instructions from computer program code storage media 145. The storage media 145 may be optical media such as CD-ROM disks, magnetic media such as floppy disks and tape cassettes or flash media such as USB memory sticks.

The device further comprises I/O interface 140 for communicating with one or more peripheral devices. The I/O interface 140 may offer both serial and parallel interface connectivity. For example, the I/O interface 140 may comprise a Small Computer System Interface (SCSI), Universal Serial Bus (USB) or similar I/O interface for interfacing with the storage medium reader 144. The I/O interface 140 may also communicate with one or more human input devices (HID) 143 such as keyboards, pointing devices, joysticks and the like. The I/O interface 140 may also comprise a computer to computer interface, such as a Recommended Standard 232 (RS-232) interface, for interfacing the device 100 with one or more personal computer (PC) devices 142. The I/O interface 140 may also comprise an audio interface for communicate audio signals to one or more audio devices 141, such as a speaker or a buzzer.

The device 100 also comprises a network interface 170 for communicating with one or more computer networks 180. The network 180 may be a wired network, such as a wired Ethernet devices 142. The I/O interface 140 may also comprise an audio interface for communicate audio signals to one or more audio devices 141, such as a speaker or a buzzer.

The device 100 comprises an arithmetic logic unit or processor 130 for performing the computer program code instructions. The processor 130 may be a reduced instruction set computer (RISC) or complex instruction set computer (CISC) processor or the like. The device 100 further comprises a storage device 190, such as a magnetic disk hard drive or a solid state disk drive.

Computer program code instructions may be loaded into the storage device 190 from the storage media 145 using the storage medium reader 144 or from the network 180 using network interface 170. During the bootstrap phase, an operating system and one or more software applications are loaded from the storage device 190 into the memory 110. During the fetch-decode-execute cycle, the processor 130 fetches computer program code instructions from memory 110, decodes the instructions into machine code, executes the instructions and stores one or more intermediate results in memory 110.

In this manner, the instructions stored in the memory 110, when retrieved and executed by the processor 130, may configure the computing device 100 as a special-purpose machine that may perform the functions described herein.

The device 100 also comprises a video interface 160 for conveying video signals to a display device 120, such as a liquid crystal display (LCD), cathode-ray tube (CRT) or similar display device.

The device 100 also comprises a communication bus subsystem 150 for interconnecting the various devices described above. The bus subsystem 150 may offer parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like.

Figure 2:
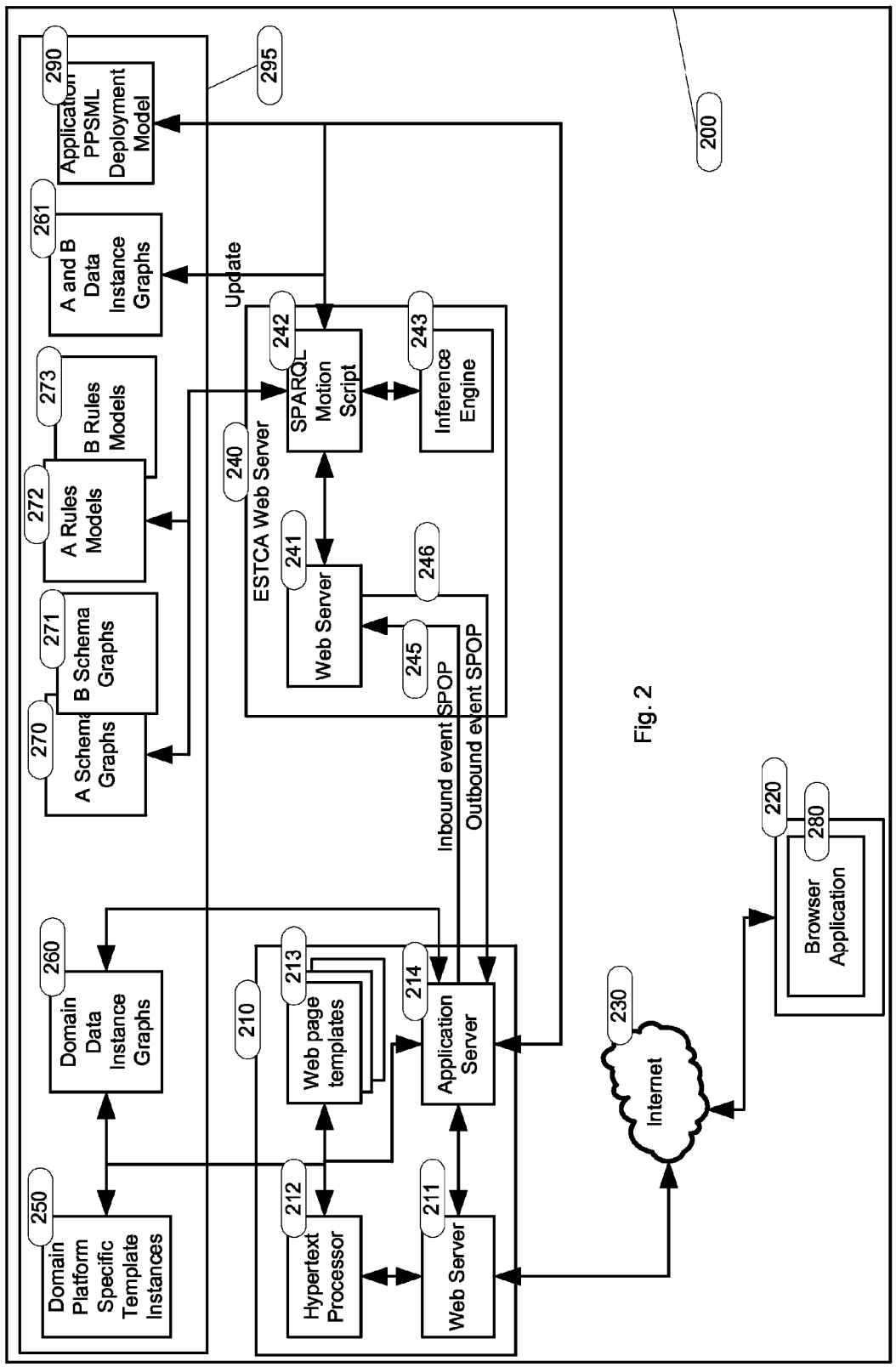
FIG. 2 shows a network of computing devices on which the various embodiments described herein may be implemented in accordance with an embodiment of the present invention.

FIG. 2 shows a network 200 of computing devices 100 on which the various embodiments described herein may be implemented. The network 200 comprises a cable network or a wireless network, such as a Bluetooth network or IEEE 802.11 network. The network 180 may be a local area network (LAN), such as a home or office computer network, or a wide area network (WAN), such as the Internet or private WAN.

In one particular example, the web server 210 is provided with a web server application 211 for receiving requests, such as Hypertext Transfer Protocol (HTTP) and File Transfer Protocol (FTP) requests, and serving hypertext web pages and files and SOAP and REST messages in response. The web server application 211 may be, for example the Apache or the Microsoft IIS HTTP server or any other portal technology.

The web server 210 is also provided with a hypertext preprocessor 212 for processing one or more web page templates 213 capable to access data from one or more databases and triple stores graphs which store Domain Data Instance Graphs 260 and Domain Platform Specific Template instances 250. This data is used to generate hypertext web pages. The hypertext preprocessor may, for example, be the PHP: Hypertext Preprocessor (PHP) or Microsoft Asp hypertext preprocessor or Top Braid Live SPARQL Web Pages (SWP). The web server 210 is also provided with web page templates 213, such as one or more SWP, PHP or ASP files.

The web server 210 host applications that can provide templates of pages, menus, buttons, and any other portal type component store as Web page templates 213.

Upon receiving a request from the web server application 211, the hypertext preprocessor 212 is operable to retrieve a web page template and its components, from the web page templates 213, execute any dynamic content therein, including loading information from the one or more databases or triple stores graphs storing Domain Data Instance Graphs 260 and Domain Platform Specific Template instances 250, that are domain specific models 295 to compose a hypertext web page. The composed hypertext web page may comprise client side code, such as Javascript, for Document Object Model (DOM) manipulating, asynchronous HTTP requests and the like.

Upon receiving a request from the web server application 211, the Application Server 214 is operable to execute a calculation using the appropriated Domain Data Instance Graphs 260 loading information from the one or more databases or triple stores graphs storing Domain Data Instance Graphs 260 and Domain Platform Specific Template instances 250 holding data for a specific domain which are part of the domain specific models 295. The Application Server 214 then responds with a calculation that can be used by the hypertext processor or by any other device (ATM, Liquid display, etc).

The Domain Platform Specific Templates instances 250 provide domain specific meta-data that is used to compose a domain specific hypertext web pages. This pages also contain domain specific information stored in the Domain Data Instances Graphs 260.

Upon loading information from the one or more databases or triple stores graphs storing Domain Data Instance Graphs 260 holding data for a specific domain using domain specific models 295, the Application Server 214 is going to send an inbound event SPOP 245 to the ESTCA Web Server 240. The event is received by the web server 241 that will trigger the computing device for state transitions of recursive state machines 300. The application server 214 is going then to listen for outbound event SPOP 246 sent by the web server 241 by the steps trigger outbound event sending condition constraint data representing the untrue condition generated by inference engine 470 or will send valid event data representing the valid action, which comprises the first object data, second object data and the data representing a relationship between the second object data and the first object data and routing it to the appropriated agent 560.

In this example, the client computing device 220 is provided with a browser application 280, such as the Mozilla Firefox or Microsoft Internet Explorer or Google Chrome or Opera browser applications. The browser application 280 requests hypertext web pages from the web server 210 and renders the hypertext web pages on a display device 120.

Other examples, using any other client computing devices 220 connected via client-server architecture can also be used.

As is evident from the technical description below, the embodiments described herein offer several distinct advantages, including the use of the network 200 of computing devices 100, such as displaying output pages with enabled events using the web server 210 that is not bound to any particular domain. Furthermore, this invention is able to implement different domains only by defining, designing and deploying domain foundation ontology data which are going to be explained later.

Referring now to FIG. 6, there is shown three exemplary graphical user interface (GUI) 600, 630 and 660. The GUI 600, 630 and 660 are displayed by the display device 120 of the client computing device 220 coupled to the web server 210 across the internet 230 that is going to communicate via events with the ESTCA web server 240 that implements the computing device appliance 300 for state transitions of recursive state machines. Herein, the embodiments will be described with reference to the human resources domain but it should be appreciated that application may be found in other related domains or industries too.

In GUI 600, 630, a user has registered himself and also provided information required to submit a job application for a job position for the purposes of getting a job in company ABC. In GUI 660, a user that is an internal Human Resources employee of company ABC has open a job application for review and processing. There are various ways by which the web server 210 receives job application data from the user representing the candidate. For example, the user may browse, using browser application 280, to a particular resource using a URL, such that the web server 210 is able to present the correct page, with the correct content based on the user role and the candidate and its job application states. In alternative embodiments, the user may apply for a job via a Mobile application.

As shown in FIG. 6, the GUI 600 self-service portal www.ABCjobapplication.com 605 displays a screen that is rendered based on the information contained in the response event coming from an outbound event SPOP 246 from the computing device 300 for state transitions of recursive state machines that was triggered when the user that has the self-service candidate role, Joe Blog 601 has selected the job application Nr. 001234 602 that triggered the event open job application. Upon the event is triggered, the Application Server 214 is going to send an inbound event SPOP to the Web Server 241 passing the event open job application from user Joe Blog 601 with the objects Joe Blog 606 (B Object) related via the predicate hasJobApplication to job application Nr. 001234 602 (A Object).

A different scenario is shown in FIG. 6, where the GUI 630 self-service portal www.ABCjobapplication.com 605 displays a screen that is rendered based on the information contained in the response event coming from an outbound event SPOP 246 from the computing device 300 for state transitions of recursive state machines that was triggered when the user that has the self-service candidate role, Joe Blog 601 has submitted the job application Nr. 001234 602 by pressing the submit button 604 that triggered the event submit job application. Upon the event is triggered, the Application Server 214 is going to send an inbound event SPOP to the Web Server 241 passing the event submit job application from user Joe Blog 601 with the objects Joe Blog 606 (B Object) related via the predicate hasJobApplication to job application Nr. 001234 602 (A Object) with the information required to change the status of the job application Nr. 001234 602 to Submitted 631.

A different scenario is shown in FIG. 6, the GUI 660 portal www.HumanResourcesManagement.com 661 displays a screen that is rendered based on the information contained in the response event coming from an outbound event SPOP 246 from the computing device 300 for state transitions of recursive state machines that was triggered when the user and employee that has the recruiter manager role, Mary Ann 662 has open the job application Nr. 001234 602 that triggered the event open job application. Upon the event is triggered, the Application Server 214 is going to send an inbound event SPOP to the Web Server 241 passing the event open job application from user Mary Ann 662 with the object Joe Blog 606 (B Object) related via the predicate hasJobApplication to job application Nr. 001234 602 (A Object) with the information required to open the job application Nr. 001234 602 that in this stage is submitted 631.

With the example defined in FIG. 6, Its is important to define that the A Object is the same as the First Object in the Claims Section. The B Object is the same as the Second Object in the Claims Section.

It is also important to highlight that in the example both portals described on the example such as www.ABCjobapplication.com 605 and www.HumanResourcesManagement.com 661 are described as implemented in the web server 210, however they could be implemented in different web servers and also use different ESTCA Web Server 240 described on the example as a single one.

ESTCA (Event, State, Transition, Condition and Action)

Figure 3:
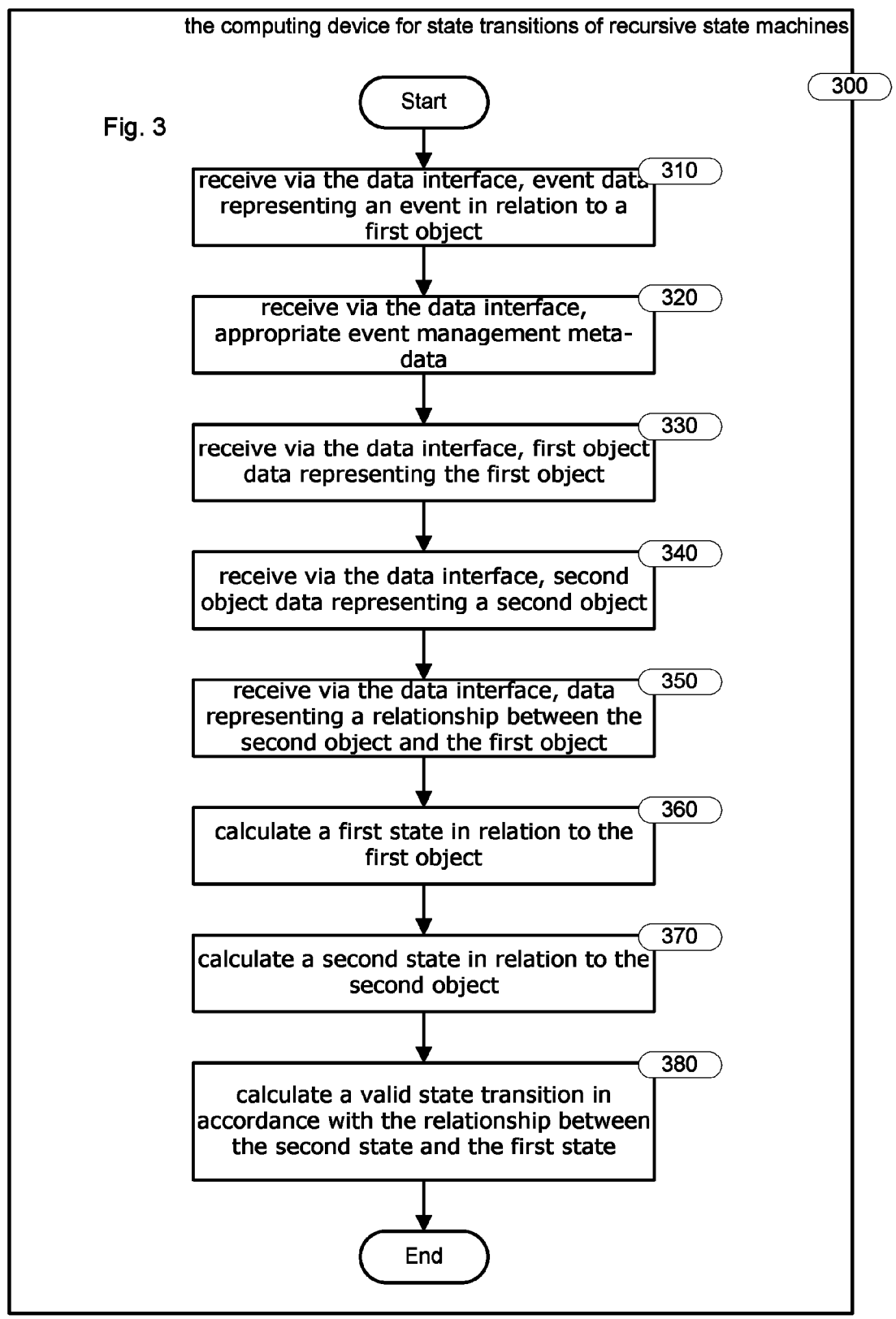
FIG. 3 shows the part of the computing device for State Transitions of Recursive State Machines ESTCA (Event, State, Transition, Condition and Action) responsible for managing the event in accordance with an embodiment of the present invention.
Figure 4:
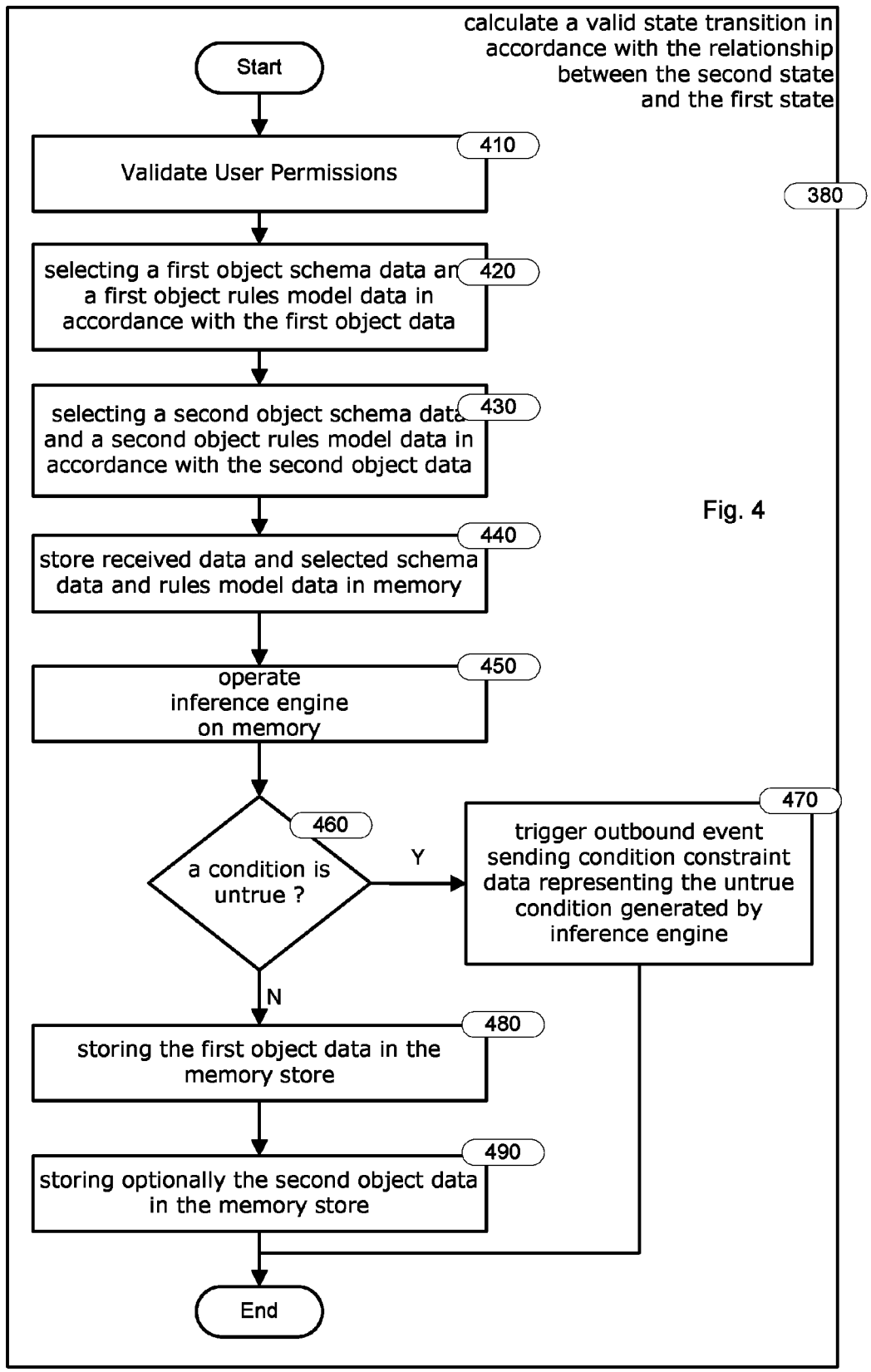
FIG. 4 shows the part of the computing device for State Transitions of Recursive State Machines ESTCA (Event, State, Transition, Condition and Action) responsible for managing the state, the transition and the condition in accordance with an embodiment of the present invention.

FIG. 3 shows the computing device for state transitions of recursive state machines 300 also called ESTCA (Event, State, Transition, Condition and Action) which delivers a mechanism for orchestrating events coming from at least one agent using a technical platform deployed using the Web Server 210 based on the state of the Subject Predicate Object (SPO) (or Object B State Relationship Object A State or Second Object State Relationship First Object State) of the domain that have changed by an external event or internal action. In order for ESTCA to work, the domain must be defined using PCIML, designed using PPIML and deployed using PPSML that will be described later.

The ESTCA web server 240 is provided with a web server application 241 for receiving requests, such as Hypertext Transfer Protocol (HTTP) requests, and serving REST and SOAP messages in response to the domain application servers 214 in this example. The web server application 241 may be, for example the Apache or the Microsoft IIS HTTP server.

The ESTCA web server 240 is also provided with a SPARQL Motion Script 242 for processing one or more state transitions by having access to data from the Application PPSML Deployment Models 290, the A schema graphs 270 and rules 272 and the B schema graphs 271 and rules 273, and the A and B Data Instance Graphs 261, and an Inference Engine 243 to calculate valid transition responses in the form of outbound event SPOP 246 messages. The response messages may, for example, be SOAP or REST messages.

Part of the computing device 300 for state transitions of recursive state machines is displayed in FIG. 3. The computing device 300 is implemented by one or more computing devices 100 and in particular one or more computing devices 100 connected across the Internet 230 as substantially shown in FIG. 2.

In this particular example, the steps of the computing device 300 described below are implemented by the ESTCA web server 240 for state transitions of recursive state machines. Herein, the web server 240 comprises a processor 130 for processing digital data; a memory device 110 for storing digital data including computer program code and being coupled to the processor 130 via a bus 150; a network interface 170 for sending and receiving digital data and being coupled to the processor 130 via the bus 150; and many data sources used for storing digital data that are domain specific models 295 including A Schema Graphs 270, A Rules Models 272, B Schema Graphs 271, B Rules Models 273, A and B Data Instance Graphs 261 and Application PPSML Deployment Models 290 being coupled to the processor 130 via the bus 150.

The ESTCA engine could also be implemented using different architectures that could simulate the inference power by been capable to identify states via rules like the subclass restrictions.

The computing device 300 starts at step receive via the data interface, event data representing an event in relation to a first object 310 wherein the processor 130 controlled by the computer program code to receive, via the network interface 170, an event related to a first object A 310.

The Event

At step receive via the data interface, event data representing an event in relation to a first object 310 of computing device 300, the web server 241, is adapted to receive from the Application Server 214 the inbound event SPOP 245 using the SPO Protocol. The computing device also executes the steps receive via the data interface, appropriate event management meta-data 320, receive via the data interface, first object data representing the first object 330, receive via the data interface, second object data representing a second object 340 and receive via the data interface, data representing a relationship between the second object and the first object 350.

The Subject Predicate Object Protocol (SPOP)

Both Inbound and outbound events communicate using the same protocol, which is the Subject Predicate Object Protocol (SPOP). This protocol communicates the following information:

The event data representing an event in relation to a first object 310:
  Event Name;
  Event Type; and
  Event Service.
The appropriate event management meta-data 320:
  Application;
  Host;
  User;
  session ID.
The first object data representing the first object 330, acting as the Object:
  Object A Class;
  Object A Properties; and
  Object A Current State.
The second object data representing a second object 340, acting as Subject:
  Subject B Class;
  Subject B Properties; and
  Subject B Current State.
The predicate Property data representing a relationship between the second object and the first object 350; Predicate Property that has the second object (Subject) as domain and the first object (Object) as range.

The First Object represents the Object A and the Second Object represents the Subject B in the Subject Predicate Object Relationship.

FIG. 3 shows the steps 360, 370 and 380 of computing device 300, that are executed upon receiving the SPOP from the web server 241. The SPARQL Motion Script 242 is then adapted to Validate User Permissions 410, based on the data contained on the Application PPSML Deployment Models 290.

The State

Upon success in Validate User Permissions 410, the SPARQL Motion Script 242, is adapted to selecting a first object schema data and a first object rules model data in accordance with the first object data 420. It is also adapted to selecting a second object schema data and a second object rules model data in accordance with the second object data 430. It is also adapted store received data and selected schema data and rules model data in memory 440. It is also adapted to operate inference engine on memory 450 in order to calculate a first state in relation to the first object 360 and in order to calculate a second state in relation to the second object 370 and calculate a valid state transition in accordance with the relationship between the second state and the first state 380.

The Transition

Advantageously when the SPARQL Motion Script 242, making use of the Inference Engine 243, to calculate a first state in relation to the first object 360 and calculate a second state in relation to the second object 370 and calculate a valid state transition in accordance with the relationship between the second state and the first state 380.

The TopSPIN Inference Engine provided by Top Quadrant is the most efficient inference engine by executing SPIN natively.

The Condition

When calculating a valid state transition, conditions will be applied and in the case where no conditions return untrue 460, the result is a valid state transition, the SPARQL Motion Script 242 will storing the first object data in the memory store 480 and storing optionally the second object data in the memory store 490 inside the first object A and second object B Data Instance Graphs 261. The update is based on the data provided via the steps receive via the data interface, first object data representing the first object 330 and receive via the data interface, second object data representing a second object 340.

When in calculating a valid transition if a condition is untrue 460 returning constraints, the SPARQL Motion Script 242 will trigger outbound event sending condition constraint data representing the untrue condition generated by inference engine 470 to the Web Server 241.

Upon the Web Server 241 receiving an outbound event from the SPARQL Motion Script 242, it will communicate the event to the Application Server 214 via the outbound event SPOP 246 using the SPO Protocol.

ESTCA Session Memory

FIG. 5 Shows part of the process that describes how ESTCA is capable of executing state transitions of recursive state machines. The SPARQL Motion Script 242 has a session memory where a history of the entire chain of second objects B and first objects A in a recursive Subject Predicate and Object relationship crossing different domains is stored. The maintenance of this memory is performed by the sub steps of storing the first object data in the memory store 480. Based on the result of the step Is A new, and A is also related to B on the top of the stack? 510 where A represents the first object data and B the second object data. The computing device will loop on the steps deleting from the top of the stack 530 and Based on management meta-data is it time to store new object ? 540 until storing in a stack the appropriate management metadata, second object B, relationship between the second object B and the first object A, first object A class, second object B class, first object A state and second object B state 520.

This is the mechanism provided by the embodiment to perform the recursion.

The Action

Upon storing the session memory, the SPARQL Motion Script 242 is going to calculate a valid action for the valid state transition 550 based on the content of the Application PPSML Deployment Models 290. The SPARQL Motion Script 242 is then going to send valid event data representing the valid action, which comprises the first object data, second object data and the data representing a relationship between the second object data and the first object data and routing it to the appropriated agent 560 that in this example is implemented on the Web Server 241.

Upon the Web Server 241 receiving an outbound event from the SPARQL Motion Script 242, it will communicate the event to the Application Server 214 via the outbound event SPOP 246 using the SPO Protocol.

Event-Based Engine

ESTCA is an event-based computing device that is triggered by inbound events (inbound event Subject Predicate Object Protocol (SPOP) 245) and respond using outbound events (outbound event Subject Predicate Object Protocol (SPOP) 246) based on the state of the Subject Predicate Object (SPO) (or Object B Relationship Object A or Second Object Relationship First Object) of the domain to the appropriated agent. The Agents do not have any intelligence, the intelligence is in ESTCA. In this example ESTCA it is implemented using the ESTCA Web server 240 that communicates with Agents implemented using the Web server 210.

The Domain Specific Models 295 Used by ESTCA

In order for ESTCA computing device be capable to perform state transitions of recursive state machines responding to Agent events which interact with a particular domain, it requires instructions (Structure, Behaviour and Rules) which are stored in separated specific domain models 295. This models are: the models Domain Data Instance Graphs 260; the A (First Object) and B (Second Object) Schema and Rules Models 270, 271, 272, 273; the A (First Object) and B (Second Object) Data Instance Graphs 261 for a specific domain. Since this Domain interacts using events with agents via some technology, the models Domain Platform Specific Template Instances 250 and the Application PPSML Deployment Model 290 will describe the domain implementation and deployment configuration using a particular technology.

The A (First Object) and B (Second Object) Schema models 270, 271 define the schema that defines the two Objects used by each state transition. It defines the object classes, properties and states as subclass cardinality restrictions used to store the objects and also infer the object states.

The Component Schema model defines the relationships of second object B and first object A classes.

The A (First Object) and B (Second Object) Rules models 272, 273 defines the constraint rules related to the respective object states and also the construct rules related to the respective object classes The A (First Object) and B (Second Object) Data Instance Graphs 261 and the Domain Data Instance Graphs 260 models contain the data instances or objects of the A (First Object) and B (Second Object) classes and the entire domain respectively.

The Domain Platform Specific Template Instances 250 contain the meta-data that relates a business domain that in this example is the Recruitment Management to a Technical Specification design pattern used to describe applications like in the example of the www.ABCjobapplication.com 605 and www.ABCHumanResourcesManagement.com 661.

The Application PPSML Deployment Model 290 connects the Physical Platform Components and the technical designs that support a Particular Domain.

In this example the domain is accessed by applications hosted in 210 that is composed of many models for all objects constituents of the domain, the Application PPSML Deployment Model 290 is used to map models and characteristics of the object A (First Object) and subject B (Second Object) used in each state transition such as:
the right permission for the transition execution;
the right Schema Graph Model and its location;
the right Rule Model and its location;
the right Data Instance Model and its location;
the platform independent SPOP, services, outputs and actions that are executed and triggered as a response;
the platform specific Addresses of Computing devices that interact with the domain such as: Application Server, Services, Interfaces, etc. (e.g Web server 210 for Agent and Webserver 240 for ESTCA Engine)

The Method for Definition, Design and Deployment of Domain Recursive State Machines FIG. 7 shows the steps of the computer-implemented method for Definition, Design and Deployment of Domain Recursive State Machines 700 used to create the domain specific models 295, defined in the section "The Domain Specific Models 295 used by ESTCA" that in the example are used to implement the GUI 600, 630 and 660 that is the Recruitment Management domain where the object A is the Job Application and Object B the Candidate which is a subclass of the Person class. The models are also defining the Recruitment Management domain's integration with two applications examples provided based in a particular technology which are www.ABCjobapplication.com 605 and www.ABCHumanResourcesManagement.com 661 running in the web server 210.

The Method for Definition of Domain Recursive State Machines

The first 4 steps 710, 720, 730 and 740 are responsible for the definition of Domain Recursive State Machines. The first step then is about defining the business Object PCIML Definition Models.

The Business Object PCIML Definition Model

The steps capturing in a computation-independent manner the structure of a first object definition foundation ontology data and a second object definition foundation ontology data 710, capturing in a computation-independent manner the behaviour of the first object definition foundation ontology data and the second object definition foundation ontology data 720 and capturing in a computation-independent manner the rules of the first object definition foundation ontology data and the second object definition foundation ontology data 730 are about defining the Business Object PCIML Definition Models (Business Object Definition Foundation Ontology Data) for each object that are constituent of a particular business domain.

Each Business Object PCIML Definition model contain one of the domain constituent business objects definition foundation ontology data captured using the Parametric Computation Independent Model Language (PCIML). In the example the Business Object PCIML Definition models are built for Job Application and Person Management Object PCIML Models that have their definition captured using the Parametric Computation Independent Model Language (PCIML).

The Parametric Computation Independent Model Language (PCIML)

Figure 8A:
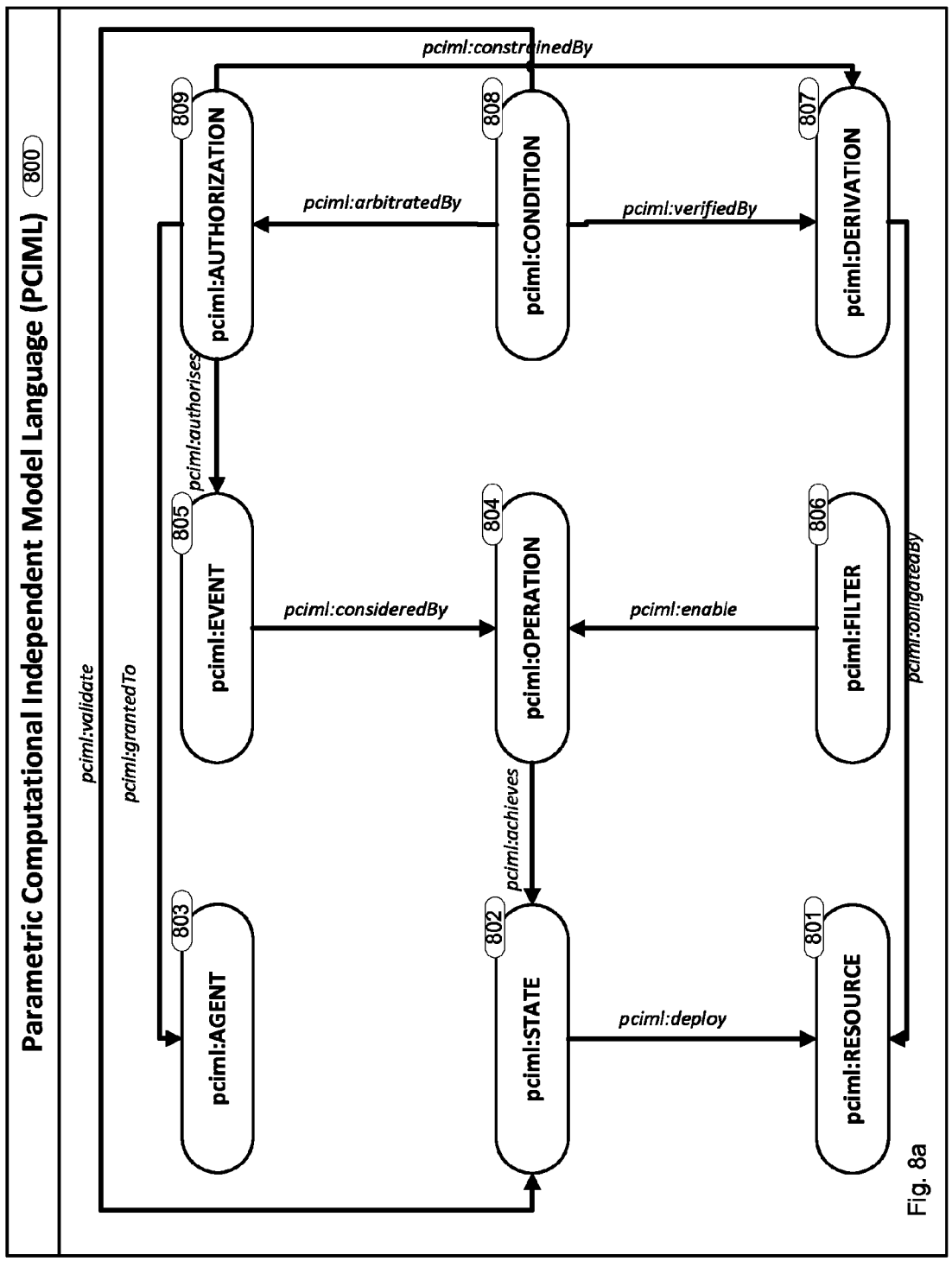
FIG. 8a shows the Parametric Computation Independent Model Language (PCIML) Class Relationship Diagram in accordance with an embodiment of the present invention.

FIG. 8*a* shows the Parametric Computation Independent Model Language (PCIML) 800 class relationship diagram represented graphically. This embodiment delivers a definition foundation ontology used to capture the definition foundation ontology data composed of structure, behaviour and control rules for the objects that are constituents of a domain from the computation independent viewpoint. The PCIML does not define details of the structure of systems. A CIM is sometimes called a domain model and a vocabulary that is familiar to the practitioners of the domain in question is used in its specification (OMG, 2003). PCIML delivers a Controlled Vocabulary with a well defined agreement between them based on specific semantic rules controlling their denotation.

PCIML 800 is a modelling language that is developed as an alternative to General-purpose modelling (GPM) languages such as UML (Unified Model Language) that can be also used to build DSL (Domain Specific Language). PCIML 800 follows an Object-Oriented Design implementing a Logical Domain Finite-State machine, where an object is said to have an internal state and is capable of receiving messages, responding to them, sending messages to other objects and changing the internal state during message handling. In more practical terminology, to call an object's method is considered the same as to send a message to the object.

The main advantage PCIML 800 provides over any other General-purpose modelling (GPM) Language is the method of building the structure relationship via the definition of its behaviour keeping the structure aligned with the behaviour, without constraining it.

The delivery of a filter that is the reification of a proposition using two object states, enables the definition of the entire domain logic, connecting object state machines recursively, in a form of Subject Predicate and Object prepositions which define the domain state transitions logic.

The Filter is also the PCIML mechanism to connect Classes and Domains via a Predicate in a way in which components of a modelling unit (e.g., a "domain") interact with each other (how they are coupled) are describable using the same concepts and artefacts, regardless of the identity of the components. This kind of invariance applies to issues of governance and management mechanisms, composition mechanisms, scope and boundary specifications, etc.

The PCIML meta-model is an example of a layer 2 MOF (Meta Object Facility) model: the model that describes PCIML 800 ontology itself. These M2-models describe elements of the M1-layer, and thus M1-models. These would be, for example, the object and component models written using the PCIML 800 ontology to capture the definition foundation ontology data. The last layer is the M0-layer or data layer. It is used to describe real-world objects and in this case is composed of the particular Schema Graph 270 and 271 models generated from the M1-layer and the data instances 260 and 261 used to hold domain instances.

The PCIML ontology is built using the web ontology language (OWL) and SPARQL Inference Notation (SPIN).

In Executable UML terms, a system is composed of multiple subject matters, known as domains. Executable UML is used to model a domain at the level of abstraction of its subject matter independent of implementation concerns. The resulting domain model is represented by the following elements: (1) The domain chart provides a view of the domain being modelled, and the dependencies it has on other domains. (2) The class diagram defines the classes and class associations for the domain. (3) The statechart diagram defines the states, events, and state transitions for a class or class instance. (4) The action language defines the actions or operations that perform processing on model elements.

The FIG. 9*a* shows the capturing in a computation-independent manner the structure of a first object definition foundation ontology data and a second object definition foundation ontology data 710, capturing in a computation-independent manner the behaviour of the first object definition foundation ontology data and the second object definition foundation ontology data 720 and capturing in a computation-independent manner the rules of the first object definition foundation ontology data and the second object definition foundation ontology data 730 which form the steps that are subdivided in sub-steps used to capture the Object PCIML Definition foundation ontology data of interest. The sub-steps are used define the Object Composition (Structure, Behaviour and Control Rules).

By performing the sub-steps on FIG. 9*a*, The PCIML Definition ontology for any object and specific to the example the Person and Job Application are going to enable the inference of the object chart (1), class diagram (2), statechart (3) and the action language (4). PCIML also have many other classes and properties that are responsible for configuration, simulation, constraints validation, etc upon execution of an inference engine on the model ontology described.

The Object PCIML Model 1010 is used to describe Objects that can be person, company, location, party, invoice, sales order, product, job application, schedule, accounts, service, purchase order, manufacture order, page, form, application, host, menu, buttons, actions, transactions, data repositories, etc.

In order to illustrate the method some examples provided are from the Job Application Business Object PCIML Model 1147 and others the Person Business Object PCIML Model 1146. In the Object PCIML Description Domain is equivalent to Object.

Structure

The definition of PCIML starts by defining the object structure using the step capturing in a computation-independent manner the structure of a first object definition foundation ontology data and a second object definition foundation ontology data 710, where the first two sub steps are about receiving structure data, the structure data including at least one of class data representing a class for the first and second object 905 and receiving property data representing at least one property for the first and second object 910 using the PCIML construct Resource 801 that describes the Object. In other words, it defines the classes (pciml:Thing) and attributes (pciml:Property) that define the scope of the Object model.

Class

Figure 9B:
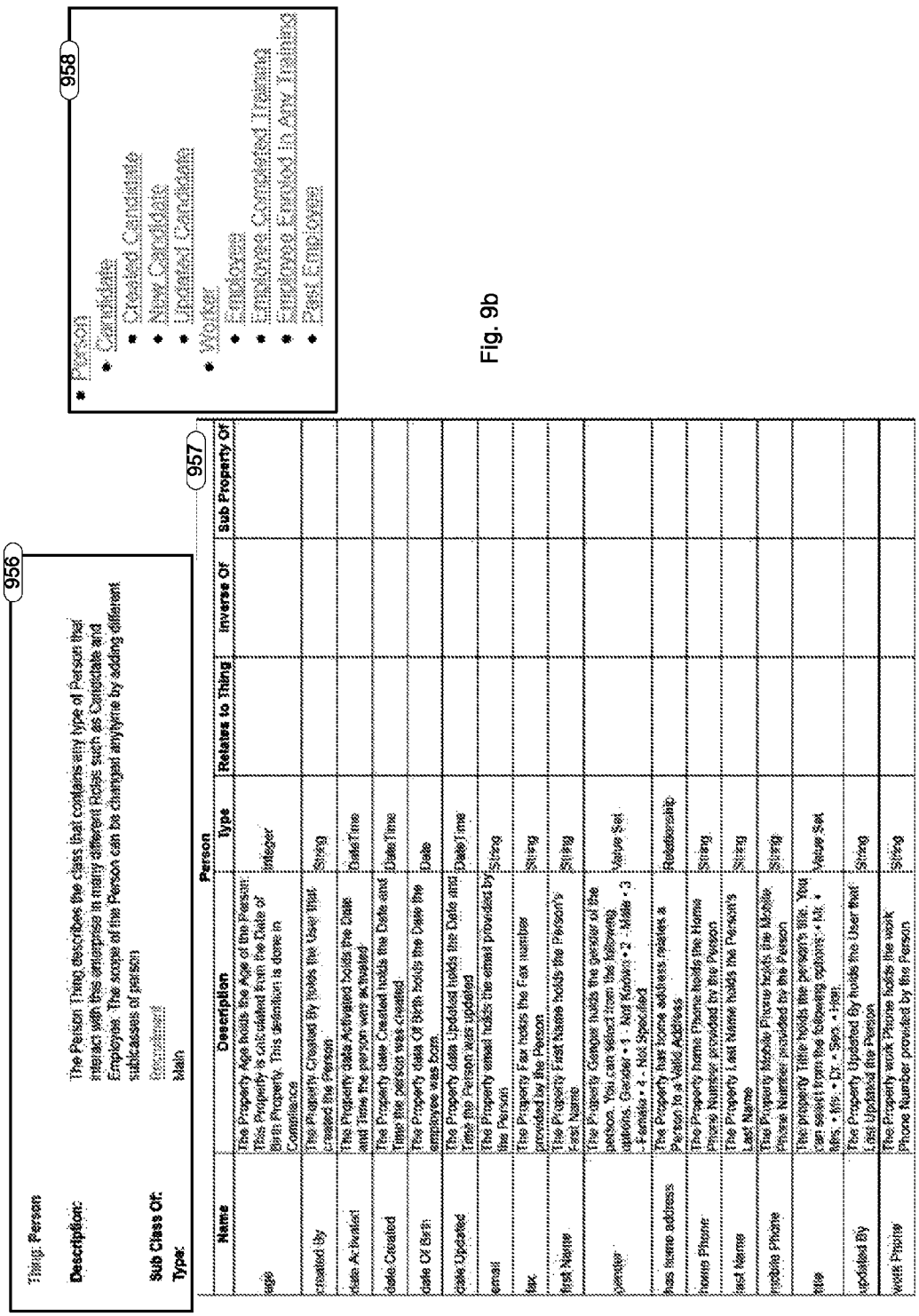
FIG. 9b shows the Person PCIML Model resources taxonomy including the states, the Person pciml:Thing and pciml:Property definition examples extracted from a report in accordance with an embodiment of the present invention.

The PCIML construct Thing 810 (pciml:Thing) describes the classes the model is formed of, following a Sub-Class hierarchy defined by the property pciml:subclassOf 813. This hierarchy creates the object model taxonomy. Refer to FIG. 9*b* for the person resources taxonomy 958 including the states defined later.

Figures 8B, 8C:
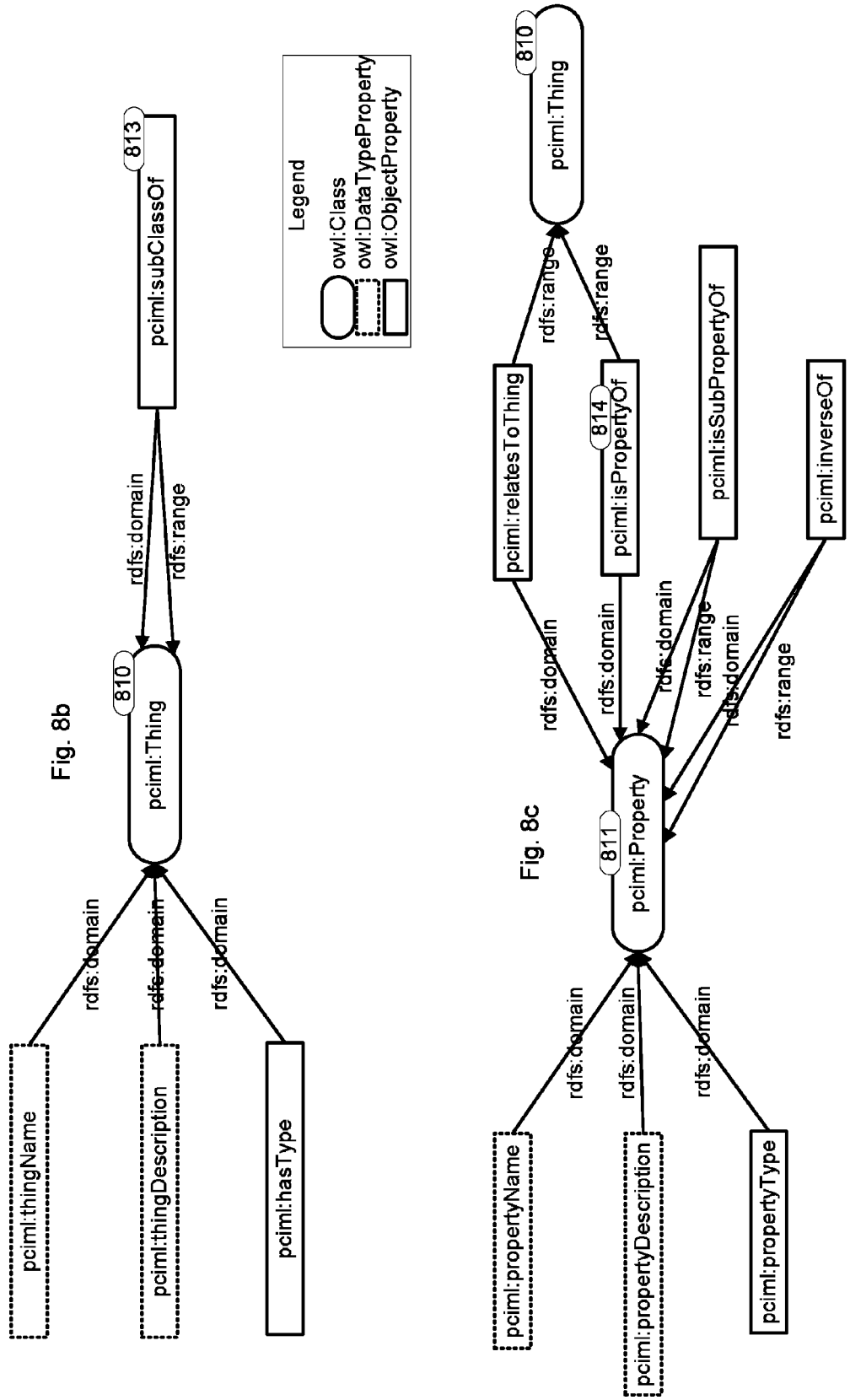
FIG. 8b shows the pciml:Thing 810 structure displaying all its domain properties with its ranges in accordance with an embodiment of the present invention.
FIG. 8c shows the pciml:Property 811 structure displaying all its domain properties with its ranges in accordance with an embodiment of the present invention.

Refer to FIG. 8*b*, for the pciml:Thing 810 structure displaying all its domain properties with its ranges.

Everything we call a "Thing" can be a pciml:Thing 810. Some examples are: person, companies, organisational units, sites, products, services, materials, assets, accounts, job application, orders, invoices, contracts, warranties, pages, forms, fields, menus, host, application, data sources.

For the Person PCIML Model pciml:Thing example refer to FIG. 9*b*. The FIG. 9*b* displays the Person thing definition 956, the person model also contain Candidate and Worker things that are subclasses of Person extracted using a report provided by the invention.

Property

After defining the construct Thing, the PCIML construct Property 811 (pciml:Property) that describes the properties of the classes defined as pciml:Thing 810 which are important to describe the Domain via the property pciml:isPropertyOf 814.

Refer to FIG. 8*c*, for the pciml:Property 811 structure displaying all its domain properties with its ranges.

PCIML supports any types of Property needed to specify a Domain.

Everything we call a "Property" can be a pciml:Property. Some examples are: first name, last name, age, data of birth, has manager, has address, has product ID, has price, weight, value of assets, field name, page name, host name, property.

For the Person PCIML Model pciml:Property examples refer to FIG. 9b which displays the Person properties definition 957 extracted using a report provided by the embodiment.

State

The next step is about receiving state data representing at least one state of the first and second object 915 using the PCIML construct State 802 (pciml:State) which defines the states of a class defined as a pciml:Thing 810 within the scope of the Object. These States are the possible results of object or component services.

The States are represented by subclasses of a class based on the presence of as value for some property in a form of parametric restrictions. These States are used to define the Object's Finite-State Machine.

For the Job Application PCIML Model pciml:State 812 definition examples refer to FIG. 9c where in the example the Approved Job Application State 959 extracted using a report provided by the embodiment. Based on the definition, if we use an example where the Job Application Nr 435, for the Candidate John Smith has approved Date of Jul. 7, 2012, we can infer that the State Approved Job Application 959 is true for the Job Application Nr 435, so the Job Application Nr 435 is of type Approved Job Application 959.

Figure 8D:
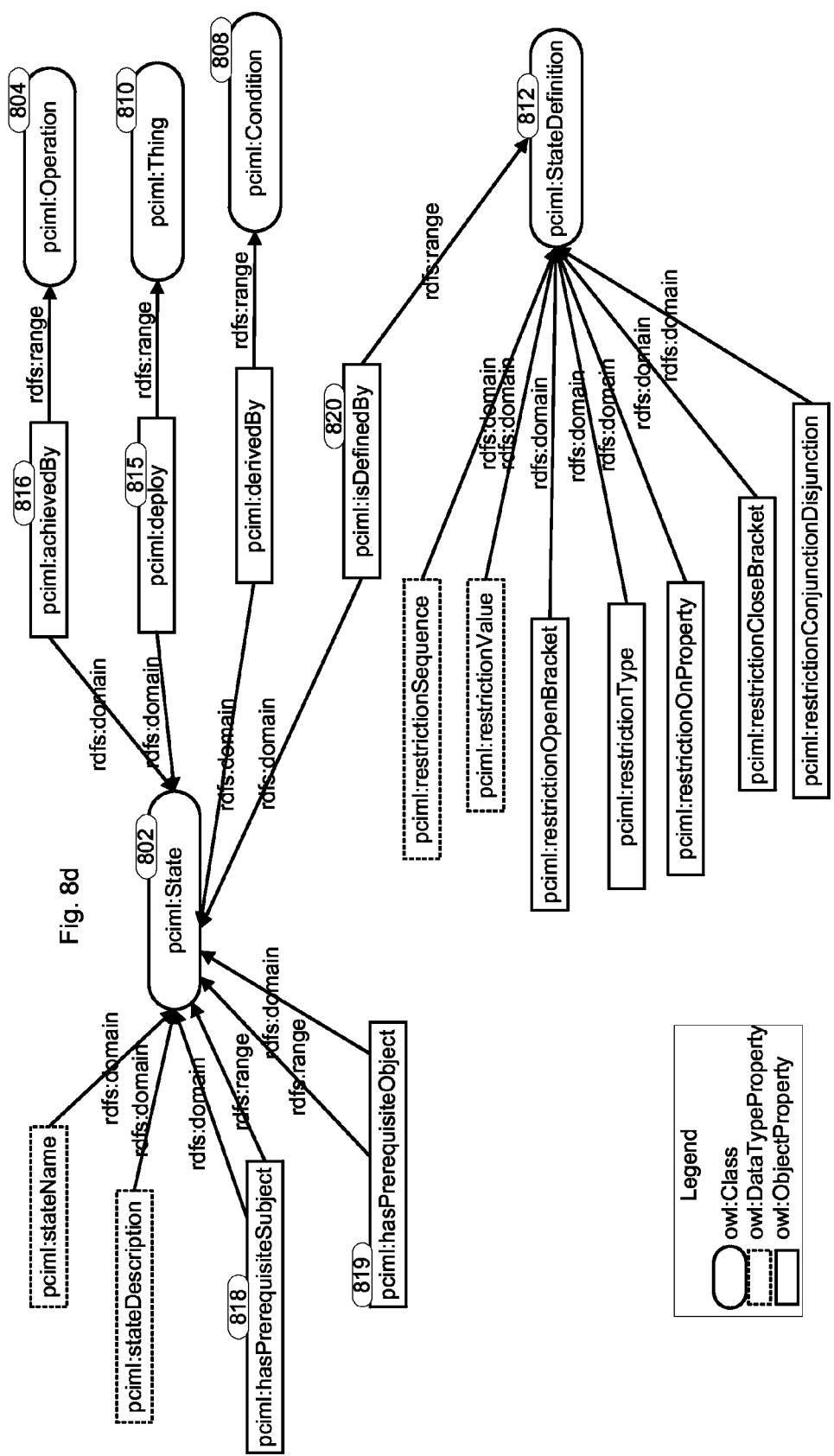
FIG. 8d shows the pciml:State 802 structure displaying all its domain properties with its ranges in accordance with an embodiment of the present invention.

Refer to FIG. 8d, for the pciml:State 802 structure displaying all its domain properties with its ranges.

The property pciml:deploy 815 defines the pciml:Thing which the state-of-affairs (pciml:State) is about. E.g The state employed is a sub class of the pciml:Thing worker with some descriptive restriction as characteristics.

The property pciml:achievedBy 816 is inferred by PCIML and is an inverse of the pciml:Operation 804 property pciml: achieves 817 which is going to be described later. It defines the pciml:Operation 804 that is responsible for achieving such pciml:State 802.

The property pciml:hasPrerequisiteObject 819 and pciml: hasPrerequisiteSubject 818 are properties inferred by PCIML that describes the pciml:State an object has to have acting as subject or object before having this pciml:State. This property enables the simulation of the Object Finite-State Machine behaviour.

The states restrictions should only use properties contained in the object model when defining the property pciml:isDefinedBy 820 which describes the parametric descriptive restriction definition used to create owl:restrictions. In this implementation, the state restrictions are based on subclass cardinality restrictions (Min Cardinality 1 or Cardinality 0). Other methods of definition of the states of an object using any kind of form that defines a criteria that can be calculated using other platforms can also be used. For the State definition 812 data structure refer to FIG. 8d.

Agent

The next step is about receiving data relating to agents that can manipulate the first and second object 920 using the PCIML construct Agent 803 (pciml:Agent). The Agent, defines who access, creates and evolves the instance of classes through its states within the scope of the Object.

These Agents are authorized to perform pciml:Events 805 (grouped by pciml:Authorizations 809) in order to change and evolve the instances through its states (pciml:State) 802 when executing pciml:Operation 804.

Refer to FIG. 8e, for the pciml:Agent structure displaying all its domain properties with its ranges.

For the Person PCIML Model pciml:Agent 803 definition examples refer to FIG. 9d where there is a table with the Agents definition 960 extracted using a report provided by the embodiment.

The property pciml:hasParentAgent 822 defines a hierarchy between agents in order to inherit privileges.

The property pciml:isAuthorisedTo 821 is inferred by PCIML and is an inverse of the Authorization Property pciml: grantedTo that is going to be described later. It defines the pciml:Authorization 809 that granted access to this agent.

Behaviour

After defining the Object structure constructs, the next step is defining the Behaviour of the Object using the step capturing in a computation-independent manner the behaviour of the first object definition foundation ontology data and the second object definition foundation ontology data 720.

Operation

The next step is about receiving behaviour data for the first and second object, the behaviour data including the first and second object finite state machine data comprising data relating to at least one operation that changes the state of the first and second object 925 using the PCIML construct Operation 804 (pciml:Operation) which defines functions that are executed in order to change the state of an instance within the scope of the Object.

This is done by defining the property pciml:achieves 817 that relates the pciml:State 802 that is achieved when the operation is executed.

Operations are subdivided into Transactions that are triggered internally in the domain and Actions which involve an external event to the Domain. Inbound and Outbound events embody communication with the external world.

Refer to FIG. 8f, for the pciml:Operation 804 structure displaying all its domain properties with its ranges.

The property pciml:hasParentOperation 823 is used to define the Operation hierarchy. The Operation taxonomy can be inferred by this relationship. An example of the Job Application Operation taxonomy 961 displayed on FIG. 9e extracted using a report provided by the embodiment.

The property pciml:hasPrerequisiteOperation 824 is a property inferred by PCIML and describes the pciml:Operation that are prerequisite of this particular operation. In another words it is the operation that achieves a state that makes a Filter pattern true, enabling this Operation. This property enables the simulation of the Domain Finite-State Machine behaviour.

The Property pciml:isPrerequisiteOperation 825 is a property inferred by PCIML and is a inverse property of pciml: hasPrerequisiteOperation 824, in another words it is the operation that can happen only after the execution of this operation. This property enables the simulation of the Domain Finite-State Machine behaviour. The Property pciml: enabledBy 826 is a property inferred by PCIML and is a inverse property of pciml:enable 829 defined with the Filter that is going to be described later.

The Property pciml:considerEvents 827 is a property inferred by PCIML and is a inverse property of pciml:consideredBy 828 defined with the Event that is going to be described later.

Figure 9E:
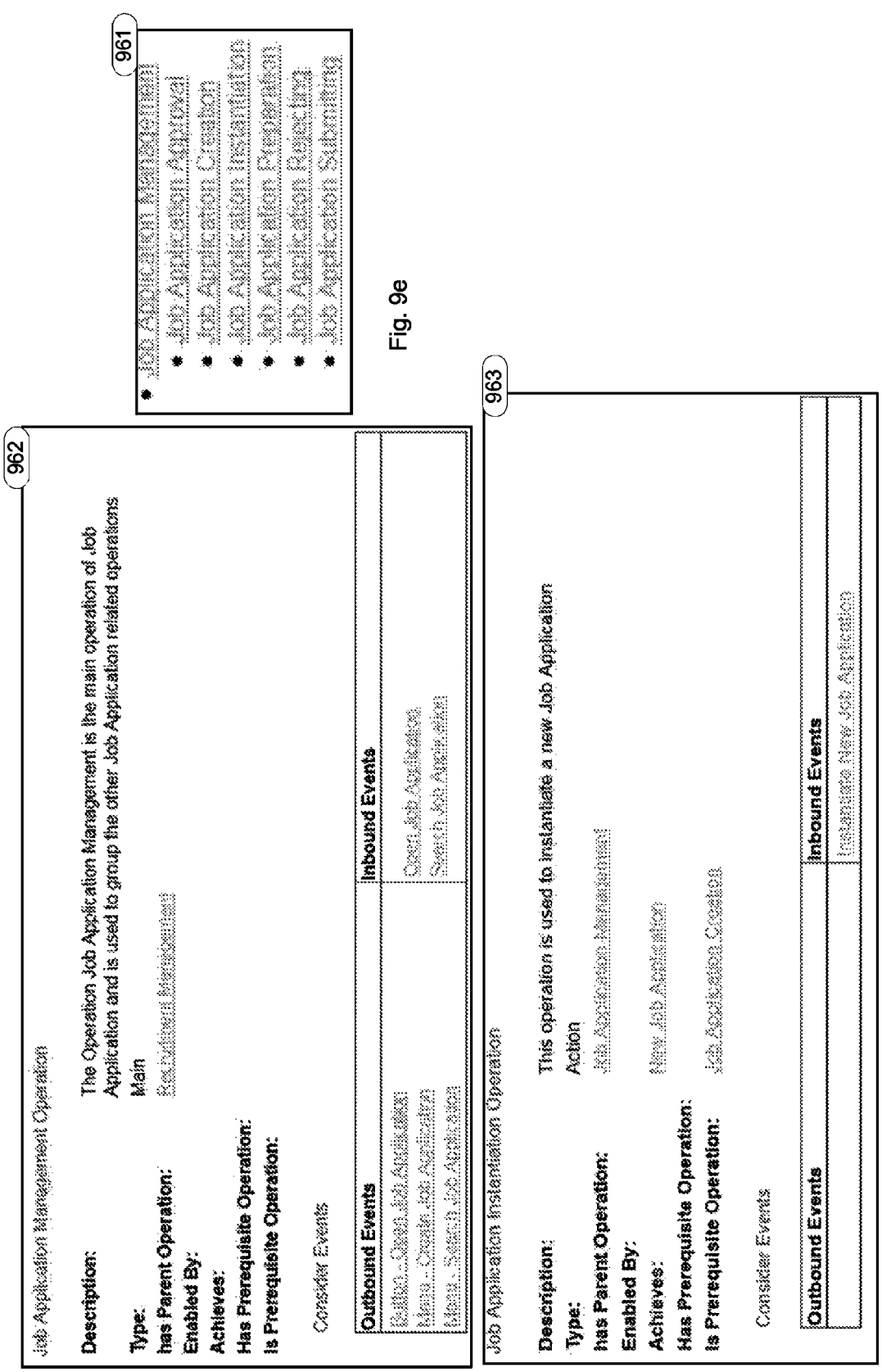
FIG. 9e shows the Job Application PCIML Model pciml:Operation definition examples extracted from a report in accordance with an embodiment of the present invention.

For the Job Application PCIML Model pciml:Operation definition example refer to FIG. 9e which are extracted using a report provided by the embodiment, where the Job Application Management Operation 962 is an example of the Main type of operation, that does not achieve any State and for consequence is not prerequisite of any other operation. The Job Application Instantiation 963 Operation is an example of Action and achieves New Job Application State. On the same FIG. 9e the Job Application Operation Taxonomy tree 961 is displayed.

Event

After defining the Operations, the next step is receiving event considered by the operation to communicate with agents 930 defining valid events that are going to be received and sent by ESTCA which is capable of invoking and be invoked by operations to evolve objects between states or to manipulate objects to perform domain specific functionality.

The PCIML construct Event 805 (pciml:Event) defines events that are required by the scope of the Domain in order to communicate with the external world in association with a particular pciml:Operation. It also defines the valid events which ESTCA computing device can receive and send based on the Domain State.

The events are related to pciml:Operation 804 via the property pciml:consideredBy 828 which defines the operation that would consider both outbound and inbound Events.

The Outbound Events (outbound event SPOP 246) are going to be triggered by ESTCA when the Operation is enabled getting to rest (Apart from Synchronous Request) and the Inbound Events (inbound event SPOP 245) received by ESTCA would trigger the execution of the Operation from the external World when the Operation is enabled.

Refer to FIG. 8g, for the pciml:Event 805 structure displaying all its domain properties with its ranges.

The property pciml:eventDirection 830 describes the direction of communication of the Event in relation to the Domain. The pciml:Outbound events communicates from the Domain to the external World via ESTCA (outbound event SPOP 246) (e.g a message or a widget can be displayed in Page). The pciml:Inbound events communicates from the external World to the Domain via ESTCA (inbound event SPOP 245) (e.g. the event triggers an update or opening of an object.)

PCIML supports any type 831 of Events required for ESTCA to interact with a Domain.

The property pciml:triggerinboundEvent 832 is used by the events of type Menu Create New, Menu Open, Button, Hyperlink and Menu. It enables outbound events to be linked to an inbound action. This five events are example of the content of the interface between the domain and the external world via a Dashboard.

The Property pciml:eventSequence 833 is mainly used for events considered by transaction type of operations and it defines the sequence the Events should follow in a particular transaction.

The pciml:affectThing 834 is a property inferred by PCIML that defines the pciml:Thing 810 that is affected by the event.

For the Job Application PCIML Model pciml:Event example refer to FIG. 9f extracted using a report provided by the embodiment, where a table with Job Application Events 964 is displayed.

Filter

After defining the Events that can be communicated via ESTCA, the next step is receiving filter qualifying the applicability of the at least one operation on the first and second object's finite state machine 935.

The filters that enable the Operations can be formed of a simple State or formed by the two States (a Subject and an Object) related via a predicate that is used by ESTCA during the step calculate a valid state transition in accordance with the relationship between the second state and the first state 380.

The PCIML construct Filter 806 (pciml:Filter) defines then filter patterns using a State defined as a Subject related via a Predicate to another State defined as Object.

By the word enable, one mean it is available, but is not guaranteed it will be executed. This mean branches can exist on the path of the Finite-State Machine.

Within the scope of a Component the Filter (pciml:Filter) is focused in defining the proposition using the "Subject Predicate Object" pattern linking different states. This propositions defines one subject (pciml:State) related via a predicate (pciml:Property) to object (pciml:State).

The Filter represents the reification of a proposition.

Inside Object Models, most of the times the full "Subject Predicate Object" pattern is not filled, since in most cases there is only one object inside an Object Model. So the Filter defines that in case any instance which has the state defined as Object is true an Operation is going to be enabled.

Inside Component Models, when the properties has subject, has Predicate and has Object are filled, the Filter defines that in case any instance which has the state defined as Object is true, and that is related by a predicate to any other instance which has the state defined as Subject is also true an Operation will be enabled. This will also create a relationship between the pciml:Thing deployed as Subject pciml:State via the predicate pciml:Property to the pciml:Thing deployed by the Object pciml:State.

Refer to FIG. 8h, for the pciml:Filter 806 structure displaying all its domain properties with its ranges.

The property pciml:enable 829 defines the pciml:Operation(s) that is enabled when the pattern is True.

An important Behaviour of the Filter is that if the Subject Predicate Object Pattern is true, a pciml:Operation is enabled to be executed if appropriate.

This evolution is represented in a Finite-State Machine that is triggered when filters are matched, enabling actions or transactions which trigger events communicated to the external world responsible for moving object instances to the next State achieved by the next Operation. This is also called Filter—Operation—State Transition.

The combination of these state transitions represents the Component or Object Logic. This defines the core behaviour in form of state transitions used by the ESTCA Web Server 240 as instruction in performing state transitions.

For the Person PCIML Model pciml:Filter examples refer to FIG. 9g extracted using a report provided by the embodiment, where the Filter Instantiated Candidate Selected 965 that has the Object pattern defined as:

Subject 835:
Predicate 836:
Object 837: New Candidate 966

The same Filter enable the Operation Candidate Creation 967

Another example refer to FIG. 9g extracted using a report provided by the embodiment, where another Filter, the Created Candidate has Job Application Selected 333 has Subject and Predicate pattern defined as:

Subject 835: Created Candidate 969
Predicate 836: has Job Application 970
Object 837:

This same Filter enable the Operation Employee hiring 971

Refer also to FIG. 9h extracted using a report provided by the embodiment, for the Operation Sequence Diagrams representing the Candidate 972 and Job Application 973 and Recruitment Management 974 Finite-State Machines.

Rules

After defining the Filter which is the last behaviour construct, the next step in defining the domain foundation ontology is defining the Rules of the domain using the step capturing in a computation-independent manner the rules of the first object definition foundation ontology data and the second object definition foundation ontology data 730.

Derivation

The next step is receiving object-specific derivation rules to be applied for a particular authorization 945 using the PCIML construct Derivation 807 (pciml:Derivation) which defines the parameters which define how the information should be set when a particular Agent is receiving or sending an Event.

PCIML supports any Derivation types required to describe a Domain. Some example of derivation types are: (1) Object property parameters that are configured by the user admin that manages the Domain Configuration. (2) Parameters that define the values that are included in the value set Properties. (3) Formulas used to define Property values that are calculated based in a formula or by a function. (4) Domains, business unit and sales regions data sets within domains. (5) External objects that are required by the business object behaviour or by specific functions.

Figure 8K:
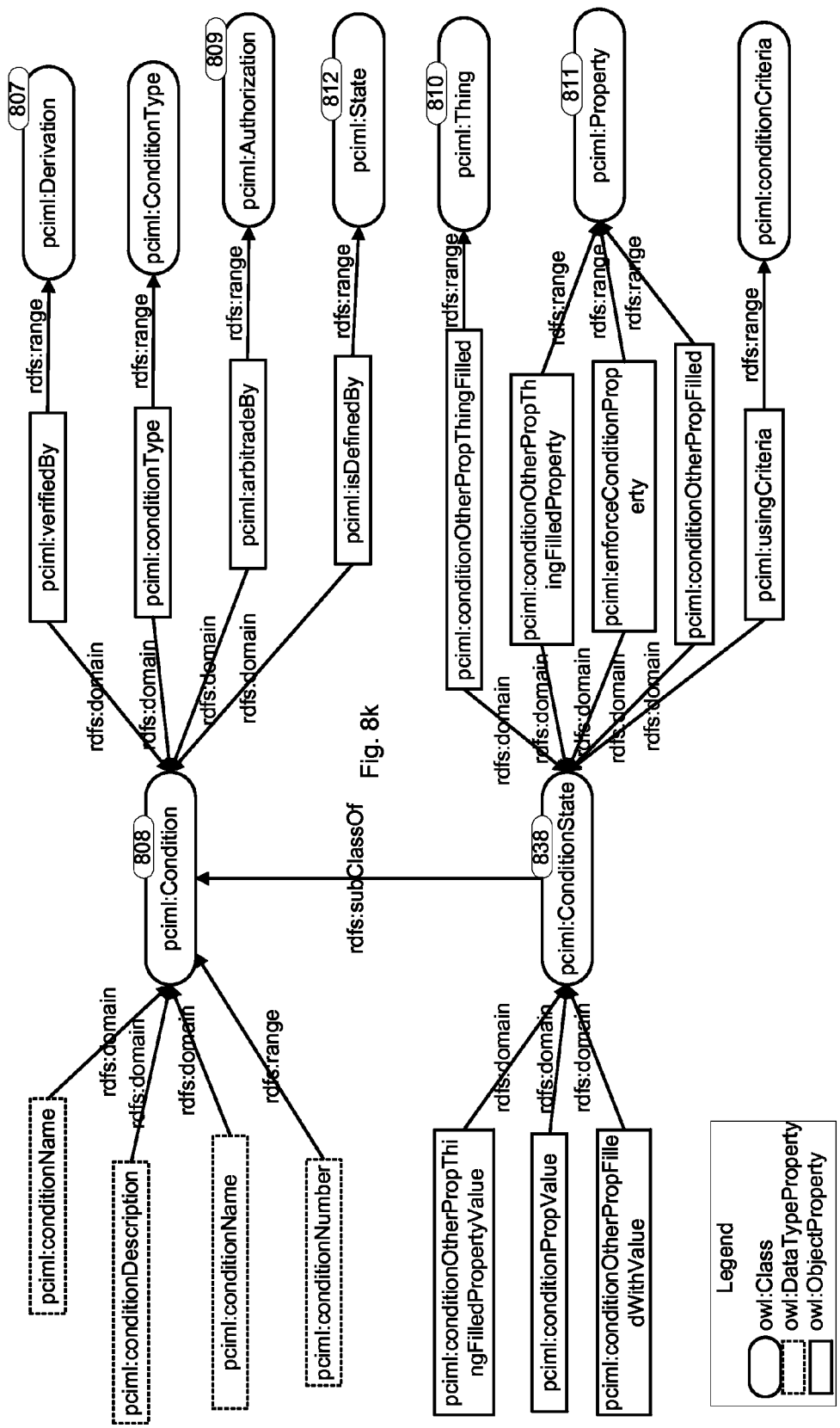
FIG. 8k shows the pciml:Condition 808 structure displaying all its domain properties with its ranges in accordance with an embodiment of the present invention.
Figure 8I:
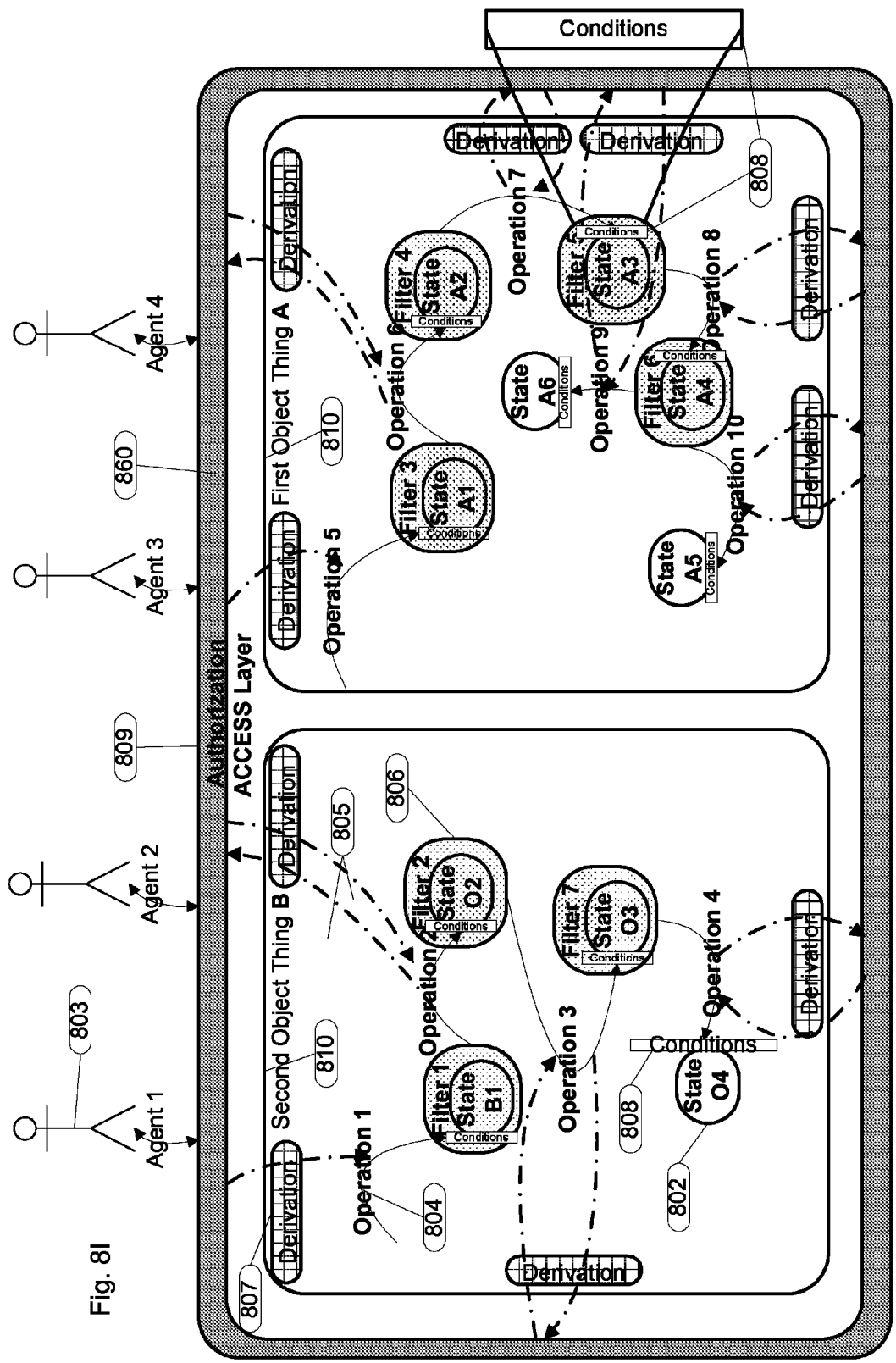
FIG. 8i shows the pciml:Derivation 807 structure displaying all its domain properties with its ranges in accordance with an embodiment of the present invention.

Refer to FIG. 8i, for the pciml:Derivation 807 structure displaying all its domain properties with its ranges.

For the Person and Job Application PCIML Model pciml: Derivation example refer to FIG. 9i extracted using a report provided by the embodiment, where there are formulas 975 examples and 9j extracted using a report provided by the embodiment, where there are Value set 976 examples.

Condition

After the Derivation construct is defined, the next step is receiving object-state-specific condition rules which validate the first and second object's state transitions 950 used by ESTCA on the step calculate a valid state transition in accordance with the relationship between the second state and the first state 380. The PCIML construct Condition 808 (pciml: Condition) defines the condition rules to validate the instance against the State to be achieved by an operation within the scope of the Domain. The condition will normally enforce a criterion over the Subject or Object properties returning true for a valid state transition and untrue for an invalid state transition.

Refer to FIG. 8k, for the pciml:Condition 808 and pciml: ConditionState 838 structure displaying all its domain properties with its ranges.

For the Person and Job Application PCIML Model pciml: Condition example refer to FIG. 9k extracted using a report provided by the embodiment, where the Condition Validate First Name 978 defines that the property first Name 979 is required 980 for achieving the Created Candidate State 981. If condition is untrue, it will return an error 982 type constraint with the Message "First Name is a required property of Candidate" 983.

Authorization

After defining the Condition construct, the next step is receiving rules data for the first and second object, the rules data including at least one object-specific, rule-constrained authorization connecting agents to events 940 via the PCIML construct Authorization 809 (pciml:Authorization) which describes the Authorization to Operations, Data Sets, etc which are granted to Agents within the scope of a Domain.

Refer to FIG. 8j, for the pciml:Authorization 809 structure displaying all its domain properties with its ranges.

Each pciml:Authorization groups pciml:Event 805 using the pciml:authorises 438 property. This group of events are then related to Agents that are granted permission to the particular pciml:Authorization via the property pciml:grantedTo 439 property The property pciml:constrainedBy defines which Derivation should be enforced on the Authorization.

For the Person and Job Application PCIML Model pciml: Authorization example refer to FIG. 9l extracted using a report provided by the embodiment, where the Create Candidate Authorization 984 authorizes the events Button—Save Candidate, Instantiate New Candidate, Menu—Create New Candidate and Save Candidate 985 and is granted to the agents Recruiter and Self Service Candidate 986.

This Authorization is also constrained by the following Derivations: Created By Default Value 987, etc.

PCIML Graphical Notation

Referring to FIG. 8l we can see an example of the graphical notation view of the Second Object Thing B and the First Object Thing A definition using PCIML. The view displays the Second and First Objects which are interfaced to the external World via the ACCESS Layer 860.

Inside the ACCESS Layer 860, there are then two smaller sets which represent the pciml:Thing 810 Second Object Thing B and pciml:Thing 810 First Object Thing A which defines two classes. Inside each Things there are smaller sets which represent the pciml:State 802 that deploy each particular Thing. The properties are not displayed in the diagram but they are defined for each thing as domain properties and are used in the criterion that restricts the States sets.

At the boundary of the domain represented by the access layer 860 are the agents 803 that will have access to the Domain.

There are also lines with arrows that represent the pciml: Operation 804 achieving one state each. As demonstrated on the diagram, each pciml:Operation 804 achieves only one pciml:State 803.

Interfacing the Operations to the ACCESS Layer 860 to be communicated via ESTCA represented as black broken arrows are the pciml:Event 805.

The pciml:Filter 806 is represented by the round rectangles with a dot style pattern which defines the object state patterns around the object states which enables an operation that will achieve another State, creating two separated Object's Finite-State Machines (FST). In the example we have one FST for the Second Object Thing B and another for the First Object Thing A.

The Derivations 807 are represented by ellipses with a brick style that are located on top of the Events that interface the External World to the Domain. The Conditions 808 which are represented by rectangles are used like gates between the Operations and the States to be achieved. The idea is to gate an operation based on its state conditions been true.

And the last of the PCIML constructs which is responsible for Authorizing Agents to have access to Events available at the ACCESS Layer 860 that is represented as an external grey belt or wall that connects Agents to Events via different Authorizations 809.

At the end of the PCIML definition, the Objects Job Application and Person have their structure, the finite-state machine, and the rules that control the objects defined the same way as the Object A and B have on the example. PCIML is then responsible for formulating the findings in a formal language 955, defining the objects logic that can be used by ESTCA as instructions to process state transitions.

PCIML is deployed in one ontology file that is pciml.owl—Base URI: <http://estca.org/pciml> and also one spin file that is pciml.spin.ttl—Base URI: <http://estca.org/pciml.spin>.

Both the Person 1146 and Job Application 1147 Object PCIML Models import the pciml.owl model. After defining the Business Object PCIML models, the next step is defining the Business Component PCIML Models.

The Business Component PCIML Definition Model

FIG. 11a shows the capturing in a computation-independent manner a component definition foundation ontology data creating a relationship between the second object definition foundation ontology data and the first object definition foundation ontology data 740 which captures the component's structure, state machine and control rules by including and relating constituent objects subdivided in sub-steps used to capture the Component PCIML Definition ontology of interest. The sub-steps are used to define the Component Composition (Structure, Behaviour and Control Rules).

By performing the sub-steps described on FIG. 11a, the Recruitment Management Component PCIML 1145 definition ontology is going to enable the inference of the Recruitment Management domain chart (1), class diagram (2), statechart (3) and the action language (4). PCIML also have many other classes and properties that are responsible for configuration, simulation, constraints validation, etc upon execution of an inference engine on the model ontology described.

In order to illustrate the steps some examples are defined using the Recruitment Management Business Component PCIML Model 1145 that is going to include the Person 1146 and Job Application 1147 Object PCIML Models.

This embodiment defines steps that will enable the capture of the definition of a component composed of objects to be integrated with ESTCA.

In order to perform the sub-steps described on FIG. 11a starting from receiving a reference of the definition foundation ontology defining the first object and the second object and optionally extra objects 1110, this embodiment proposes to subdivide the domain in small building blocks that can be plugged when necessary in order to provide a solution which is scale-invariant where some "domains" can be contained within other "domains" and also be object oriented.

Universe 1030, Component 1020 and Object 1010 PCIML Models

By doing this, the building blocks will be kept decoupled from the broader domain, being available to be developed, tested and used separately from other broader domains. This embodiment enables the scale invariance.

This embodiment approaches design starting from dividing the Domain in hierarchical smaller Building Blocks (BB) Domains. The smallest BB are called Object PCIML Model 1010 used to define the Person and Job Application examples above. As described, an Object PCIML Model 1010 defines the objects structure, its Finite-State Machines and the rules that are captured using the PCIML.

Object PCIML Models 1010 are then imported by Component PCIML Models 1020 filtering the scope to the specific area of endeavour addressed by that Domain that are then imported by Universes PCIML Models 1030 that define a broader area of endeavour.

In applying it to real world situations, Industry Domains (Business Universe PCIML Models 1030) would establish a common language for a particular industry model. A particular enterprise within an Industry Domain, might define Functional Domains (Business Component PCIML Models 1020) along functional business areas within the organization. For example, a typical business might have separate Domains for Human Resources Management, Customer Management, Supplier Management, Manufacturing, Financial Management, Recruitment Management, etc.

Figure 10A:
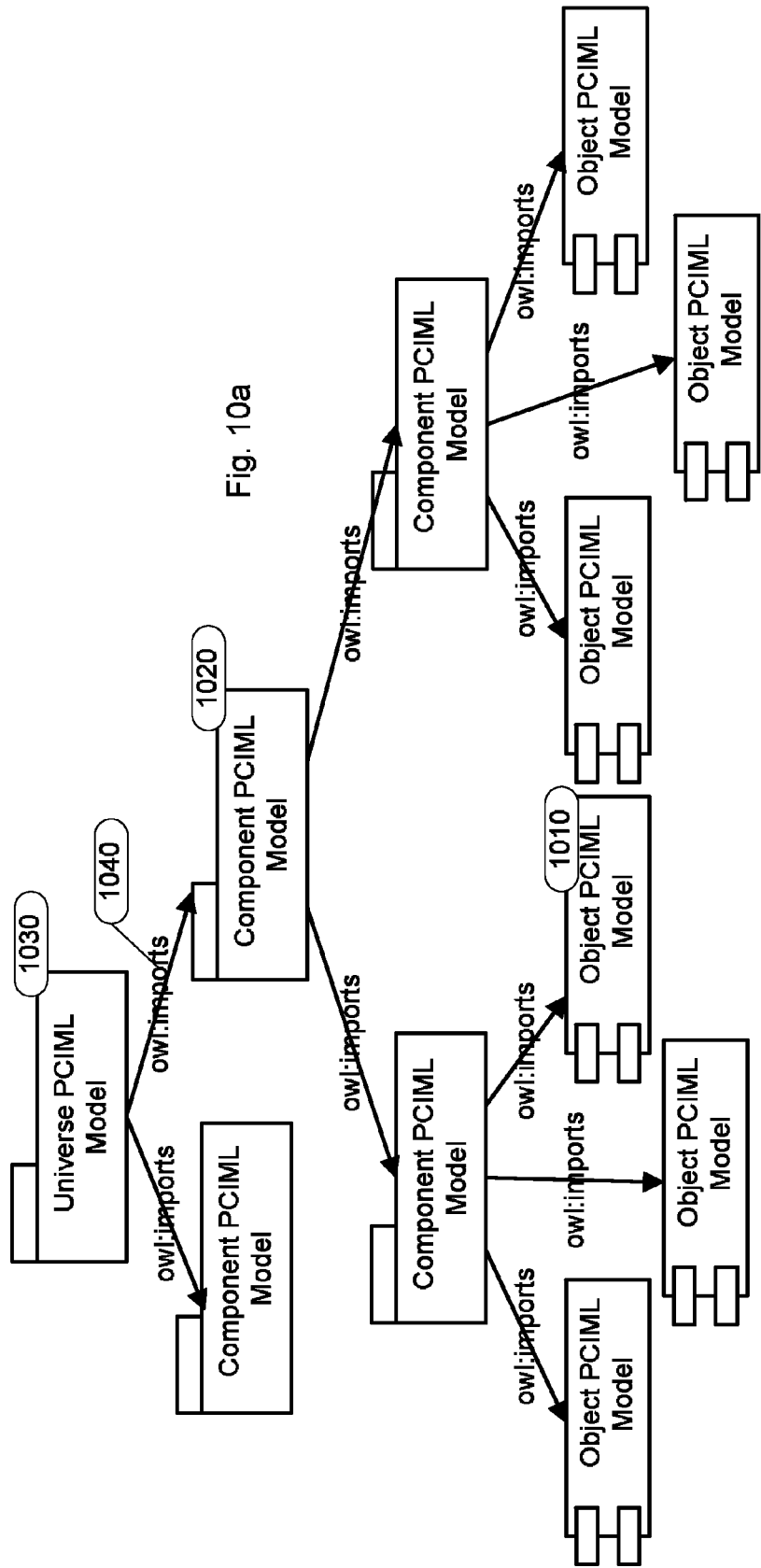
FIG. 10a shows the PCIML Model types related in an hierarchical structure in accordance with an embodiment of the present invention.

Refer to FIG. 10a for visual hierarchy diagram, where from a hierarchy perspective PCIML models can be of three different types that build the domain hierarchy: (a) Universe PCIML Models 1030; (b) Component PCIML Models 1020 and (c) Object PCIML Models 1010.

The embodiment assures the object model controls the object definition only. It is independent of any other object that also forms the domain. From a Service Oriented Architecture (SOA) perspective this subdivision enables the creation of unassociated, loosely coupled units of behaviour and functionality that have no calls to each other embedded in them.

The core of the component definition including the Object Finite-State Machines is defined in the Object PCIML Model 1010 captured during capturing in a computation-independent manner the structure of a first object definition foundation ontology data and a second object definition foundation ontology data 710, capturing in a computation-independent manner the behaviour of the first object definition foundation ontology data and the second object definition foundation ontology data 720 and capturing in a computation-independent manner the rules of the first object definition foundation ontology data and the second object definition foundation ontology data 730.

Connecting Object Models Inside the Component Models

Another embodiment delivers two types of relationships between models that are used to relate Object PCIML Models 1010 that are part of the same Logic Component PCIML Model 1020.

The relationships are recorded at the broader level, this mean that two Object PCIML Models 1010 can be related via a Component PCIML Model 1020 and two Component PCIML Models 1020 can be connected via a Universe PCIML Model 1030 without changing the child in this Parent Child relationship.

The first type of relationship is about the Hierarchy Relationship (owl:imports) 1040.

The Imports 1040 (owl:imports) relationship defines the Parent—Child relationship between PCIML models that are part of the same Domain. This relationship type is responsible for defining the Domain Architecture boundaries, Domain Dependencies and Domain Structure.

The embodiment allows the import and remove of a model from a component or universe model. So a Universe PCIML Model 1030 will import many Component PCIML Models 1020 which then will import many Business Object PCIML Models 1010.

When one Object PCIML Model 1010 is imported inside a Component PCIML Model 1020, the Main Thing of the Imported Object Model becomes a subclass of the Main thing of the broader domain model and the Main Operation of the Imported Object Model will have the Main Operation of the broader domain model as parent.

Figure 11B:
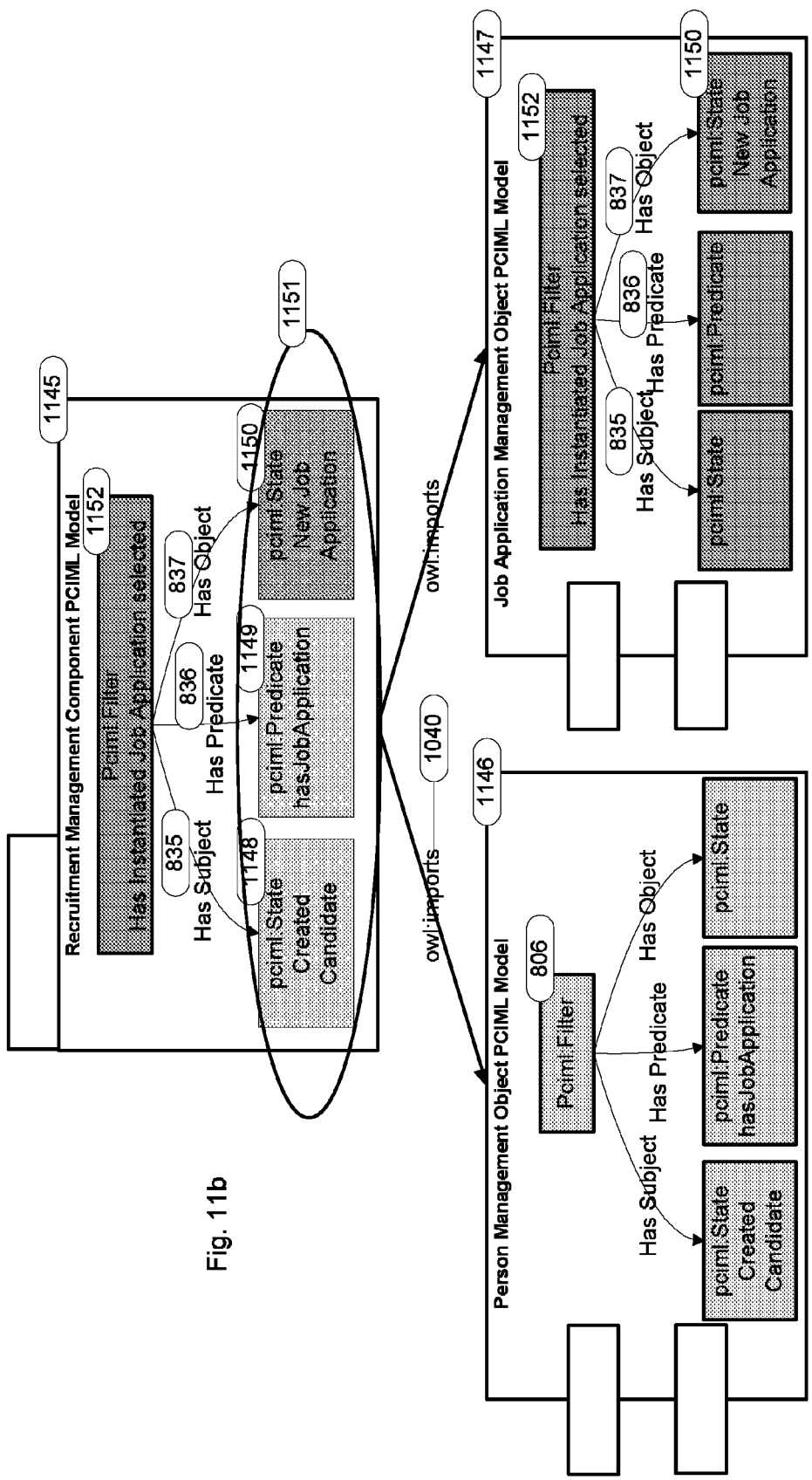
FIG. 11b shows graphically the PCIML model relationship example of the Recruitment Management Domain PCIML Model that imports the Person Management and Job Application Management Object PCIML Models in accordance with an embodiment of the present invention.

Refer to FIG. 11b where the Recruitment Management Business Component PCIML Model 1145 as an example imports the Person 1146 and Job Application Business 1147 Object PCIML Models when performing the sub-step receiving a reference of the definition foundation ontology defining the first object and the second object and optionally extra objects 1110 described on FIG. 11a.

Using the same example, the class Recruitment Thing is created in order to be the superclass of Person and Job Application during the step receiving the class used to be the superclass of the constituents object classes, used in calculating the domain vocabulary taxonomy 1115. Refer to FIG. 11d for the Recruitment Management vocabulary taxonomy 1152.

Using the same example, the Recruitment manager Agent is created in order to be able to change the Person and Job Application objects by defining this agent as parent agent of the Person and Job Application agents, when receiving agent which interact with the component (as distinct from a particular object) 1120.

Using the same example, the operation Recruitment Management is created in order to group the Person and Job Application operations when receiving the component operation used to group the constituent object operations, used in calculating the taxonomy of component operations 1125. Refer to FIG. 11d for the Recruitment Management operation taxonomy 1153.

The Second type of relationship is about the Behavioural/Functional Relationship between PCIML Models which are imported by the same Component or Universe. It is about building the Component or Universe Finite-State Machine by relating all required Object or Component Finite-State Machines recursively.

This embodiment proposes to use the PCIML construct Filter (pciml:Filter 806) in order to relate the behaviour of two PCIML models.

As described in receiving filter qualifying the applicability of the at least one operation on the first and second object's finite state machine 935 within the scope of an Object PCIML Model 1010 the (pciml:Filter 806) is used for defining the single States which are possible to happen within the scope of the Object PCIML Model 1010. It is also the main driver for the definition of the object model finite-state machine by the definition of the Object Filter-Operation-State transition.

However when receiving behaviour data comprising the creation of a relationship between the second object's finite state machine data and the first object's finite state machine data by at least one filter qualifying the recursive aggregation of quasi-orthogonal object state machines into components of wider scope 1130 using a Component PCIML Model 1020 or a Universe PCIML Model 1030 the Filter (pciml:Filter 806) qualifying the recursive aggregation of quasi-orthogonal object state machines into domains of wider scope is defined by the full proposition using the "Subject Predicate Object" pattern linking Object PCIML Models 1010 imported by the respective Component PCIML Model 1020. In this way, one State from one Object PCIML Model 1010 acting as Subject 835 is going to be related via a Predicate 836 that is also defined in the same Object PCIML Model 1010 to another State in another Object PCIML Model 1010 acting as Object 837 in the broader Component PCIML Model 1020.

The above embodiment embodies the approach where "Domains" are taken to be properly embedded, and this hierarchy is modelled by the recursion of Component models, between the lower limit of atomic Object models and the upper limit of Universe models. The composition of models is uniformly ruled by a single mechanism (SPOP) provided by the Filter.

Figure 11C:
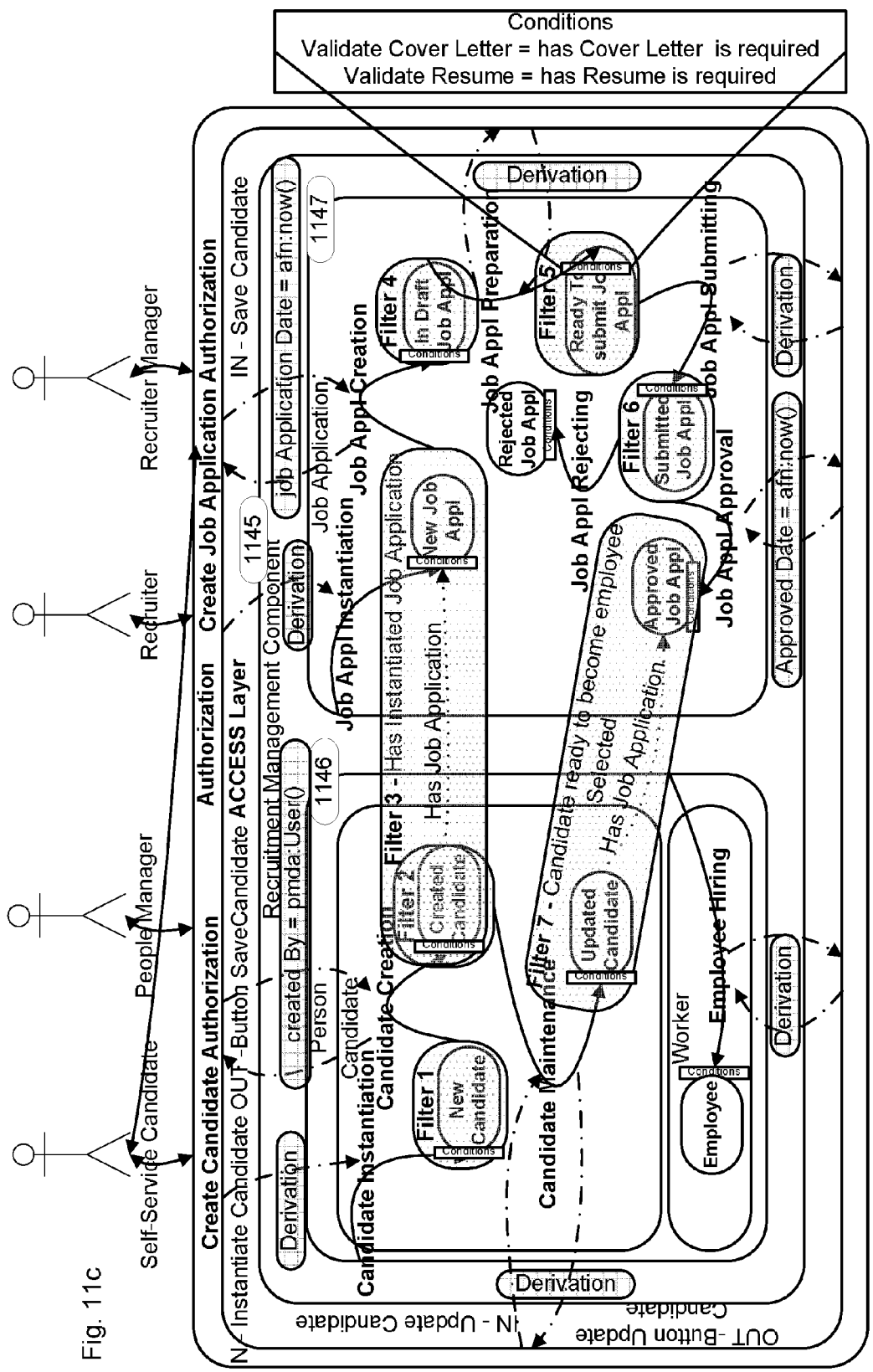
FIG. 11c shows a PCIML graphical notation example using the Person Management Object PCIML Model representing the B Second Object and the Job Application Management Object PCIML Model representing A First Object related via their behaviour using the pciml:Filter inside the Recruitment Management Domain PCIML Model representing the Component X definition in accordance with an embodiment of the present invention.

The FIG. 11c shows an example of the Recruitment Management Business Component PCIML Model 1145. The Person Management Object PCIML Model 1146 defines the Person lifecycle from New Candidate to Employed state, without taking in consideration the other functions that are required to evolve a candidate to an Employee. The Job Application Management Object PCIML Model 1147 defines the lifecycle of a Job Application from New Job Application to an approved or Rejected Job Application state.

When two Object PCIML Models 1010 are included inside a Component PCIML Model 1020, the Object PCIML Models 1010 lifecycle can be recursively connected using the pciml:Filter 806, so the Recruitment Management Component PCIML Model 1145 will describe the lifecycle of a candidate going through the process of creating an Job Application, then preparing it before submitting to a prospect employer.

It is important from a dependency perspective to mention that the Filter 806 with has Subject 835 Created Candidate 1148 has Predicate 836 hasJobApplication 1149 and has Object 837 New Job Application 1150 relationship 1151 which couples two Object PCIML Models 1010 without changing the Object PCIML Models 1010. The coupling happens inside the Recruitment Management PCIML Component Model 1145, leaving the Person Management PCIML Object Model 1146 and Job Application Management PCIML Object Model 1147 untouchable. This embodiment enables coupling invariance and also the ability to have a library of business objects which can be used as it is needed.

Refer to FIG. 11b for an example, the Filter Has Instantiated Job Application selected 1152 defined in the Job Application PCIML Model 1147 will be keep like below:
  Subject 835:
  Predicate 836:
  Object 837: New Job Application 1150

The coupling will happen in the Recruitment Management Component PCIML Model 1145 where for the same Filter Has Instantiated Job Application selected 1152 will be connected to the Subject and predicate like below:
  Subject 835: Created Candidate 1148
  Predicate 836: has Job Application 1149
  Object 837: New Job Application 1150

The Filter enable then the Operation Job Application Creation

By defining the full proposition 1151 on the example in the FIG. 11b the new Job Application 1150 cannot exist by itself within the Recruitment Component. It needs a Created Candidate 1148 as Subject 835 related by the predicate 836 has Job Application 1149.

From an Ontology Structure Perspective, it creates the Job Application as a Range for the Property has Job Application 1149.

This guarantees that each Object PCIML Model 1010 which contains one object lifecycle represented in a Object Finite-State Machine will be connected via the pciml:Filter 806 in a Component PCIML Model 1020 where the two Objects will be connected forming the Component Finite-State Machine which is composed of many Object Finite-State Machines connected recursively.

Figure 10B:
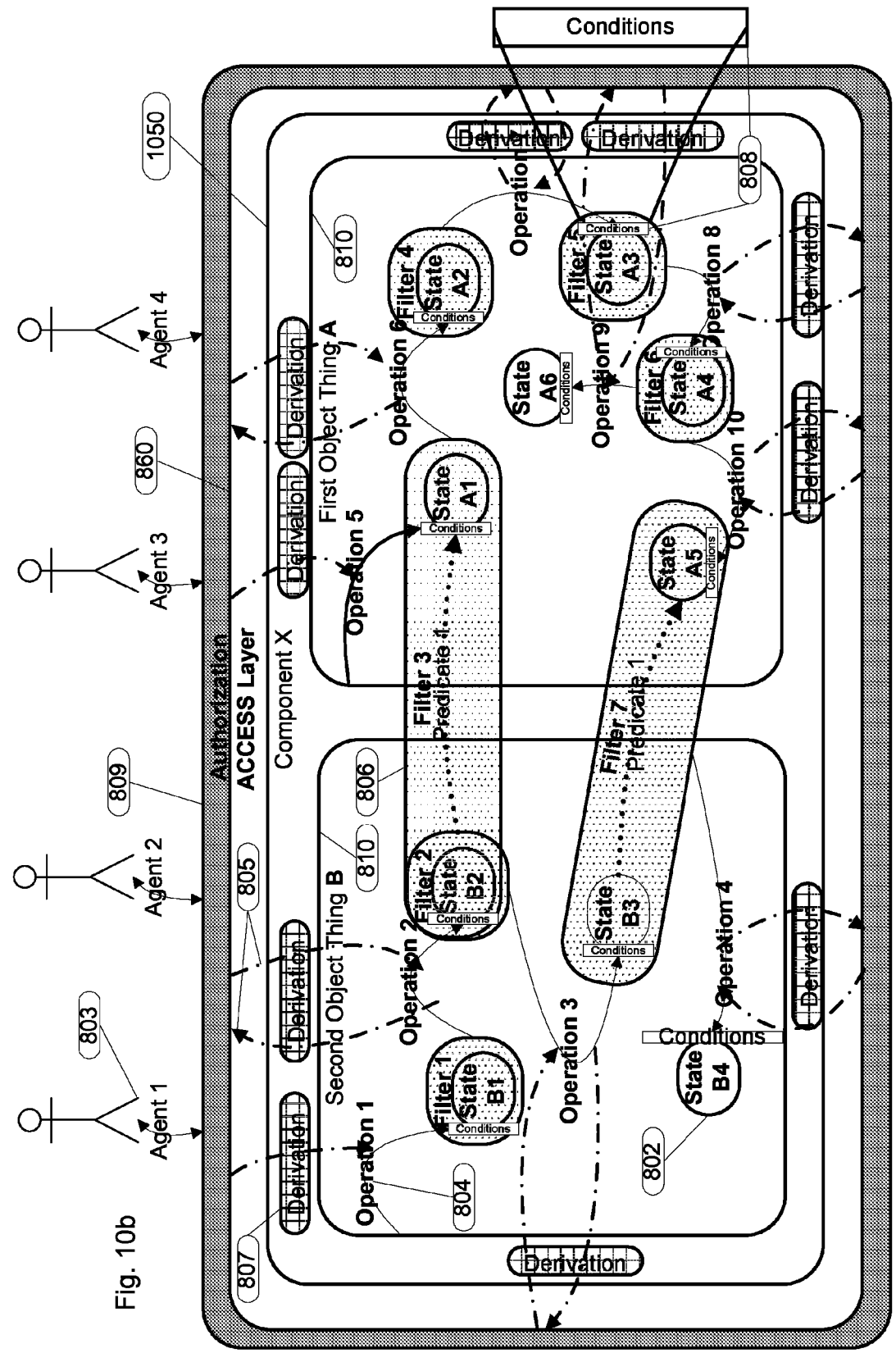
FIG. 10b shows the PCIML graphical notation of the Second Object Thing B and First Object Thing A related via their behaviour using the pciml:Filter inside the Component X definition foundation ontology data in accordance with an embodiment of the present invention.

Referring to FIG. 10b now, the graphical notation view defined in 710, 720 and 730 is displayed with the inclusion of the of the Component X definition foundation ontology data relating the second object B definition foundation ontology data and the first object A definition foundation ontology data using PCIML defined in capturing in a computation-independent manner a component definition foundation ontology data creating a relationship between the second object definition foundation ontology data and the first object definition foundation ontology data 740. The view displays the Component X 1050 that is interfaced to the external World via the ACCESS Layer 806.

Referring back to FIG. 8l, the second object B and the first object A were not connected inside the Component X 1050. The FIG. 8l shows the pciml:Filter 806 represented by the round rectangles with dot style patterns which define the object state patterns around only object states that enables operations that will achieve another State, defining two separated Objects Finite-State Machine (FSM). The FIG. 10b shows a different example of pciml:Filter use case, where it shows the connection of two individual objects FSM, the Second and First objects which are related via the pciml:

Filter, forming the Component X 1050 FSM. In this case the pciml:Filter 806 connects instances in a particular Subject (from Second Object B) State via a predicate to instances that are in a particular Object (from First Object A) State, and in case this pattern is true, the Operation is enabled achieving a new State.

The difference from the Filter 3 and Filter 7 from the FIGS. 8*l* to 10*b* is that in the FIG. 10*b* example, the Filter 3 enforces that in order for the Operation 6 to be enabled an instance of the object A1 is required to have an instance of B2 as Subject related via the predicate 1 instead of only an instance of A1 from the FIG. 8*l* example. In the other example of FIG. 10*b*, the Filter 7 enforces that in order for the Operation 4 to be enabled an instance of B3 subject requires to have an instance of A5 as object related via the predicate 1 instead of only an instance of B3 from the FIG. 8*l* example.

These two Filter 806 definitions from FIG. 10*b* also define that the instances of the First Object A acting as Object requires an instance the Second Object B acting as subject related via the property Predicate 1 to exist. This connects the two Finite-State Machines where the instance of the Second Object B needs to relate to an instance of the First Object A that will evolve in its own until it drives the evolution of the Second Object B instance. The Filter 806 also defines the relationships between classes of the Domain.

The Derivations 807 and all other constructs are just the same as they follow the object definitions however with a broader coverage.

Refer also to FIG. 9*h* for the Operation Sequence Diagrams displaying the Recruitment Management Component Finite-State Machine 974 and also the two separated object Finite-State Machine for Candidate 972 and Job Application 973.

Refer to FIG. 11*b* for a diagram that displays the Recruitment, Person and Job Application PCIML Models Hierarchical and Behavioural Relationships.

Refer to FIG. 11*c* for the PCIML graphical notation of the example the Recruitment Management Component PCIML Model 1145 (Component definition foundation ontology data) that is composed by two PCIML Object Models (Second Object definition foundation ontology data and First Object definition foundation ontology data) which are Person Management 1146 and Job Application Management 1147 respectively related hierarchically and behaviourally.

After defining the filters qualifying the recursive aggregation of object, using the Recruitment Management example, the next step would be for receiving the component-specific (as distinct from a particular object), rule-constrained authorizations connecting agents to events 1135. In this example no new Authorization is created, and the Person and Job Application objects authorizations are responsible to define the component authorizations.

PCIML is then responsible for formulating the findings in a formal language 1140. This defines the entire Component logic that can be used by ESTCA as instructions in order to perform state transitions.

The embodiment also offers a frame-based definition view where the Business Modeller or Business Domain is capable of editing of the Domain PCIML Models definition (definition foundation ontology data).

Refer FIG. 10*c* for the example of the frame-based Definition View for the BOPersonManagement Object PCIML Model. The frame-based Definition view is currently developed using Top Braid Ensemble delivered by Top Quadrant. Using the Person Domain example, the header of the view displays the name of the model been edited. e.g. BOPersonManagement 1044 with PCIML in front to highlight that the edited model is a PCIML Model The header also displays the hyperlink to navigate to the other frame-based views provided by the PMDA Framework to support the Definition. The different frame-based views are used for Simulation, Hierarchy and Relationship Visualization and Process Debugging provided in the same environment as different Tabs. These frame-based views are provided in order for the Business Modeller or Business Domain Expert to be capable to analyse the definitions from different perspectives.

At the Header there is also the Icon displaying a little disk 1045 which is used to save the changes on the PCIML model.

Below the header, on the left side of the frame-based Definition View there is the PCIML menu 1016 formed by a tree with nodes representing the PCIML Columns Structure 1017, Behaviour 1018 and Rules 1019 with their respective constructs provide by PCIML.

In order to navigate between the different instances of each construct, the user only need to select the constructs desired.

By selecting a construct, in the centre side of the view there is a grid 1020 which will display the instances of the construct selected on the left side. In the example, the Grid has Focus on the Construct Thing 1021.

On the Right corner of the Grid is also available a button used to insert instances of classes focused on the Grid in form of a Diamond with a Plus sign 1046 and a button used to delete the instance selected on the Grid in form of a Diamond with a Minus sign 1047.

In case the user wishes to change or just review one of the instances displayed on the Grid, it needs only to select the desired instance.

On the right side of the grid there is a Review 1022 and an Edit Form 1023 that is going to display the instance selected on the grid or also another instance selected using a hyperlink connected via a property. In the example the Person Thing is highlighted in the Grid 1024 and Displayed 1025 on the form.

This view also provides a template loader 1026 that could use any other model as a template and insert most of the PCIML Constructs that can then be adjusted, saving lots of time and effort by reusing models which have similar state lifecycles.

The definition view also displays constraint violations generated by any data inconsistency identified, and will be displayed by a particular icon with the message of the violation when hovering the mouse over each icon.

Another embodiment also provides many different methods of PCIML data import, from xml, csv files, excel files and database connection that can be used to upload domains into the PCIML Definition Foundation Ontology.

Currently, the navigation is coordinated by selecting a construct on the menu, then an instance of the construct and then reviewing or editing the instance without a proper sequence due to technical restrictions of Ensemble. The ideal GUI for PCIML would be a wizard like type of application that takes the Business Modeller or Business Domain Expert to a sequence of screens that would capture the PCIML Domain in the same sequence described on the PCIML Example definition using the steps 710, 720 and 730. This is the end goal for the Definition PCIML View.

The entire Component logic is also used for consistency and validation checking and also for activity simulations driven by State, Operation, and Transition. This is a powerful feature which allows domain partitioners to validate, simulate and print their domain modelling work.

The Component classes relationship diagram is also available for documentation and validation.

The second frame-based view deployed with the embodiment is called Operations View. This frame-based view will provide the ability to simulate within the Finite-State machine of the particular domain by running the inference button taking the Operations perspective.

The embodiment also allows the domain Business Modeller or Business Domain Expert to not only see the business processes sequencing with focus on the operations, but also all the operation taxonomy of the particular Domain, the condition rules that are linked to the state achieved by the operation, etc.

Refer FIG. 10d for the example of the frame-based Operation view for the BDRecruitmentManagement 1048 Domain PCIML Model that imports the BOPersonManagement and the BOJobApplicationManagement On the top left side of the frame-based Operations View there is the Operation Taxonomy 1027 that shows the Recruitment Management 1037 hierarchy that is composed by Job Application Management 1038 and the Person Management 1039 operations. When an Operation is selected in the Taxonomy tree, it will be displayed on the centre of the screen in the selected operation 1028 grid driving the display of the content of all other grid views. In the example the Job Application Creation 1040 is displayed in the centre of the page.

Since all other grids are updated based on the Operation selection, on the Grid has Prerequisite Operation 1029 there are two operations that are required to happen before the Job Application Creation which are: Candidate Creation and Job Application Instantiation.

On the Grid is Prerequisite Operation 1030 there is one operation that requires the Job Application Creation as prerequisite that is: Job Application Preparation.

On the Grid Achieves State 1031 there is the state achieved by the Job Application Creation Operation: In Draft Job Application.

On the Grid Conditions 1033 there are conditions related to achieving the in Draft Job Application State: Validate Candidate, Validate Job Position.

On the Grid Considered Events 1032 there are Events that are considered by the Job Application Creation Operation: Save Job Application, Button—Save Job Application.

On the Grid Enabled By Filter 1034 there is the SPO Protocol which enabled the Job Application Creation Operation: Has Instantiated Job Application Selected.

On the Grids has Subject 1041, has Predicate 1042 and has Object 1043 represent the Filter Parameters that enable the Job Application Creation Operation. They are respectively: Created Candidate, has Job Application, New Job Application.

By selecting the Operations in one of the Grids is Prerequisite Operation 1030 or has Prerequisite Operation 1029 the selected Operation would become the focus and it will be displayed at the centre of the screen changing all the other grids that are refreshed based on the new selected operation.

This view is very useful to navigate through the State machine in order to validate if the sequence is correct from an Operation perspective.

This view is populated by pressing the Infer Icon 1035 and can be cleared by pressing the Clear Icon 1036.

The embodiment also provides a third frame-based view which is called States View. This view will provide the ability to simulate within the Finite-State machine of the particular domain by running the inference button with focus on the states.

It also allows the domain Business Modeller or Business Domain Expert to not only see the business processes sequencing with focus on the states, but also all the vocabulary taxonomy of the particular Domain.

This view is very useful to navigate through the State machine in order to validate if the sequence is correct from a state perspective.

The fourth frame-based view is called Relationship View. This view will provide the ability to visualise the relationships between classes which is defined using the Subject Predicate and Object Pattern during the pciml:Filter definition within the particular domain.

It also allows the domain Business Modeller or Business Domain Expert to not only see the Classes or Entities relationship via properties, but also make changes on the sequencing triggered by the Filters in the particular Domain and dynamically navigate through the relationships from the Main Subject of the Domain jumping from each relationship to the far related entity.

This view is very useful to navigate through the Domain Relationship in order to validate if all required relationships are already created.

The fifth frame-based view is called Transition View. This view will provide the ability to visualise the full path of evolution with a focus on the States.

It also allows the domain Business Modeller or Business Domain Expert to not only see the evolution rules but also make changes on the sequencing triggered by the Filter-Operation-State Transition in the particular Domain.

This view allows the domain Business Modeller or Business Domain Expert to see each transition of the domain in detail, enabling him to do the final adjustments.

With all these views the domain Business Modeller or Business Domain Expert will be capable to not only define the domain but also to think logically on how these domains could be changed in order to implement changes required by the Business.

The embodiment also provides a script for validating the models against the PCIML Rules, in case all required properties of all instances of the nine constructs are filled, the model is going to be validated. The script cannot identify if there are missing instances of constructs, because this is a matter of the scope to be defined by the Business Modeller or Business Domain Expert.

The embodiment also provides a HTML Report that is dynamically created based on the Domain model inferred via TOP Spin. This report was used as examples of the PCIML constructs. These examples can be found FIGS. 9b, 9c, 9d, 9e, 9f, 9g, 9h, 9i, 9j, 9k and 9l.

This report provides a view of the domain that can be shared with Operation people of the particular domain for knowledge sharing and validation.

It is important to know that anytime a PCIML domain model is changed to describe a change on the business, the next report will be representing the situation of the Model at the time of the report.

This mean that when the entire Domain is considered completed, it become the source of truth of the Business to be used as requirement for software upgrades, or to provide to auditors, or also to be used by the strategic business people for simulation of new ways of performing business activities or procedures.

Creating the Schema Graph Model

After defining the Object PCIML Models 1010 by capturing in a computation-independent manner the structure of a first object definition foundation ontology data and a second object definition foundation ontology data 710, capturing in a computation-independent manner the behaviour of the first object definition foundation ontology data and the second object definition foundation ontology data 720 and capturing in a computation-independent manner the rules of the first object definition foundation ontology data and the second object definition foundation ontology data 730 and the Component 1020 and Universe 1030 PCIML Models by capturing in a computation-independent manner a component definition foundation ontology data creating a relationship between the second object definition foundation ontology data and the first object definition foundation ontology data 740.

The next step, calculating the first and second object and component schema data and the rules model data 750 creates the object schema, rules and data models based on the definition foundation ontology model for the objects of interest, where the first object A and second object B Object schema 270, 271 and the Domain (Component or Universe) Schema Graph models which are the schema models that formalise the data structure and the possible states of the domain. Each Schema Graph model is created based on a PCIML Model.

In order for the Web Server 210 to display the GUI 600 self-service portal www.ABCjobapplication.com 605 and the GUI 660 portal www.ABCHumanResources Management.com 661 displayed in FIG. 6 using the ESTCA Web server 240, the B Schema Graph 271 and A Schema Graph 270, and a component or universe Schema Graph (where the relationships of B and A classes is stored) for Person, Job Application and Recruitment Management respectively are required to be created.

As explained before each PCIML meta-model is a little database that holds instances of PCML Classes that describe part of the Domain, so each Component or Object Schema Graph model is then the model that implements that part of the Domain.

Figure 12A:
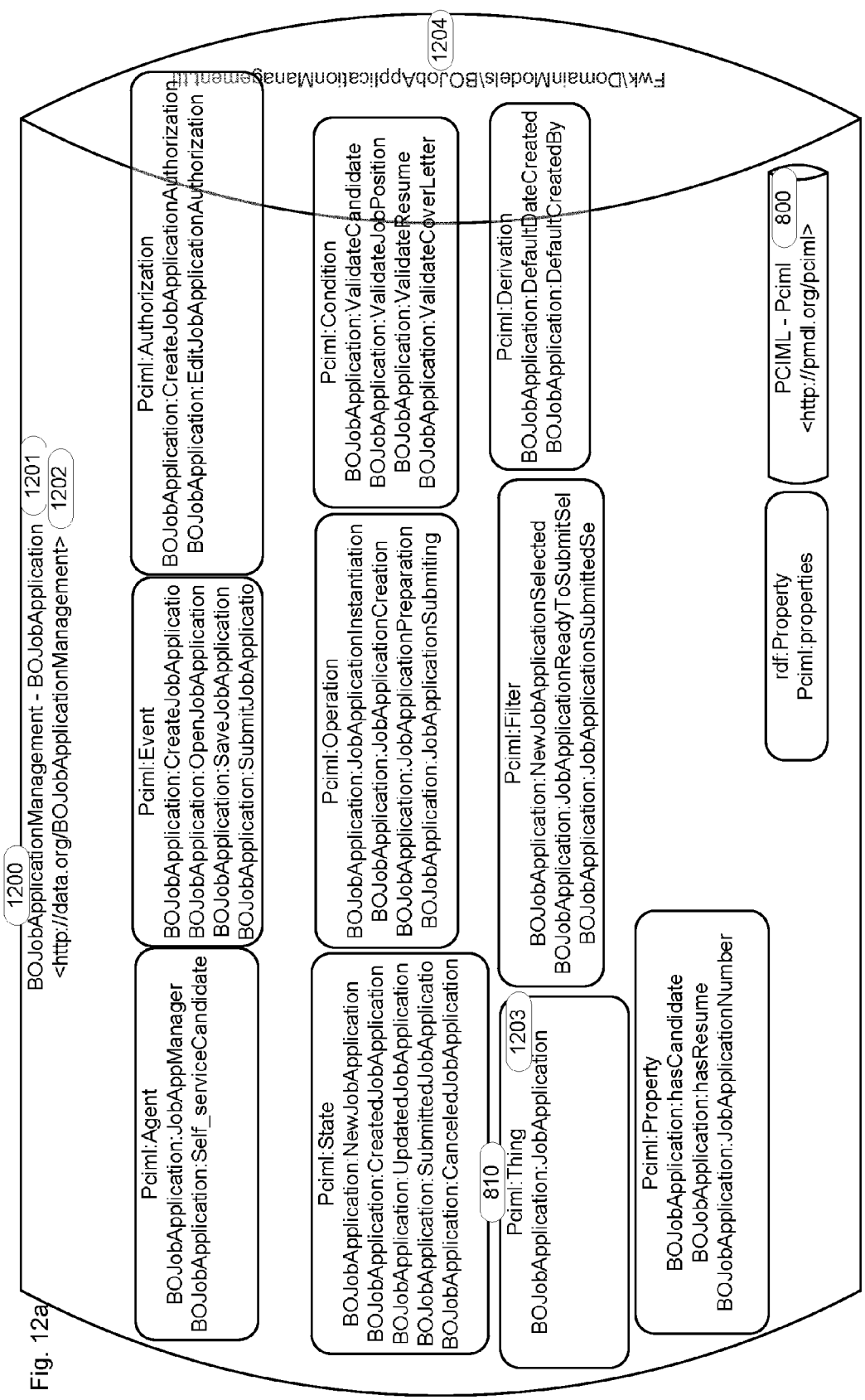
FIG. 12a shows the Job Application Object PCIML Definition Model example graphically in accordance with an embodiment of the present invention.

Using as example, the Object PCMIL Definition Model for Job Application that is stored in the following model file displayed in the FIG. 12a. Fwk\DomainModels\BOJobApplicationManagement.ttl 1204.

The PCIML Model BOJobApplicationManagement 1200 have the prefix BOJobApplication 1201 that is equivalent to the base URl <http://data.org/BOJobApplicationManagement> 1203.

Inside the PCIML Model the BOJobApplication:JobApplication 1203 which is an instance of the pciml:Thing 810 Class is the same of <http://data.org/BOJobApplicationManagement#JobApplication>.

This instance is then instantiated into an Object Schema Graph model BOJobApplicationManagement_ex 1220 with Prefix JobApplication 1221 and Base URl <http://data.org/BOJobApplicationManagement_ex> 1222. The Schema contains the class JobApplication:JobApplication 1223 that is the same of <http://data.org/BSJobApplicationManagement_ex#JobApplication>.

Figure 12B:
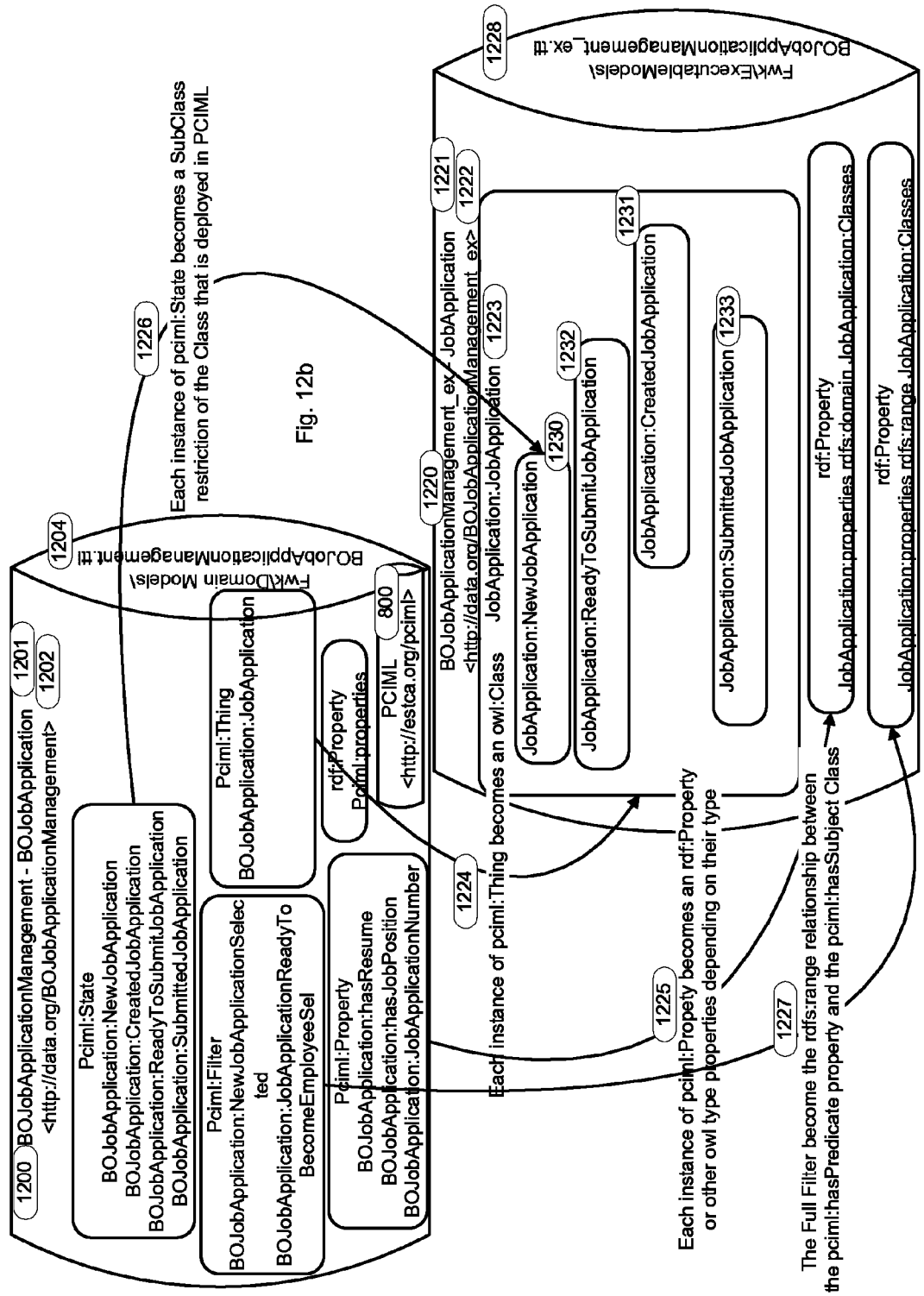
FIG. 12b shows the full transformation from PCIML Definition Model to Domain Schema Graph model graphically using the Job Application Object PCIML Model example in accordance with an embodiment of the present invention.

The full transformation from PCIML to Schema Graph model is detailed in FIG. 12b where the BOJobApplicationManagement 1200 is detailed with more instances examples defined inside each PCIML class constructs represented by the round rectangles.

The class constructs such as pciml:Thing 810, pciml:Properties 811, pciml:State 802 and pciml:Filter 806 will be used to create a new little Data Base where the classes are going to be the ones that were defined as pciml:Thing 810 and pciml:State 802 and not the PCIML Classes that used to calculate the instantiated Schema Graph model.

On the diagram on FIG. 12b there are 4 lines with arrows connecting the PCIML instances of the Job Application PCIML Object Model BOJobApplicationManagement 1200 to the instantiated classes or properties on the new Job Application Schema Graph Model BOJobApplicationManagement_ex 1220.

i. Each instance of pciml:Thing on the PCIML Model becomes an owl:Class on the Schema Graph 1224 ii. Each instance of pciml:Propety becomes a rdf:Property or other owl type properties depending on their type and are related to the respective Class as a domain property 1225 iii. Each instance of pciml:State becomes a SubClass restriction using min cardinality 1 and/or cardinality 0 of the Class that is deployed in PCIML 1226 iv. The Full Filter become the rdfs:range relationship between the pciml:hasPredicate property and the pciml:hasSubject Class 1227

The Instantiated Schema Graph model also respect the hierarchy defined for PCIML, keeping the Component models separated from the Object models, etc.

By keeping the Schema Graphs also separated, the entire Schema is kept in small specialised schemas that are connected via the rdfs:range linking subject properties to Object things which are kept in federated component or universe models. ESTCA is then capable of using only the modes required for the objects involved in each state transition. This embodiment enables enormous performance gains, since ESTCA uses in most cases only the schemas of the First Object A and Second Object B when reasoning via an inference engine in calculating a valid state transition.

Comparing to a Relational DB World, each Object model contain the schema of one table and its properties and the Component model contain the Relationship between the tables imported as Object Models representing a Domain Relational Schema.

The example on FIG. 12b also displays the Job Application 1220 Schema Graph model. In the Diagram the Main Classes of the Object Schema Graph Model is displayed (e.g. JobApplication:JobApplication 1223).

In the diagram the States are also created as subclasses of the JobApplication:JobApplication 1223 that are JobApplication:NewJobApplication 1230, JobApplication:CreatedJobApplication 1231, JobApplication:ReadyToSubmitJobApplication 1232, JobApplication:SubmittedJobApplication 1233.

The Properties are created related to the JobApplication:JobApplication 1223 via the property rdfs:domain.

The Schema Model for Job Application is then stored in the Fwk\ExecutableModels\BOJobApplicationManagement_ex.ttl 1228 file.

Creating the Rule Models

After the Schema Graph is created, in this example, the Rules models which use SPIN Rules to formalise the Domain Rules is also created. The same as the schema, each Rules model is created based on a PCIML Model.

In order for the Web Server 210 to display the GUI 600 self-service portal www.ABCjobapplication.com 605 and the GUI 660 portal www.ABCHumanResources Management.com 661 displayed in FIG. 6 using the ESTCA Web server 240, the A Rules models 272, B Rules models 273 and the component Rules models for Job Application, Person and Recruitment Management respectively are also required to be created.

As explained before each PCIML meta-model is a little database that holds instances of PCML Classes which describes a part of a Domain. Each Rules model is then the model that implements rules of part of a Domain.

Figure 12C:
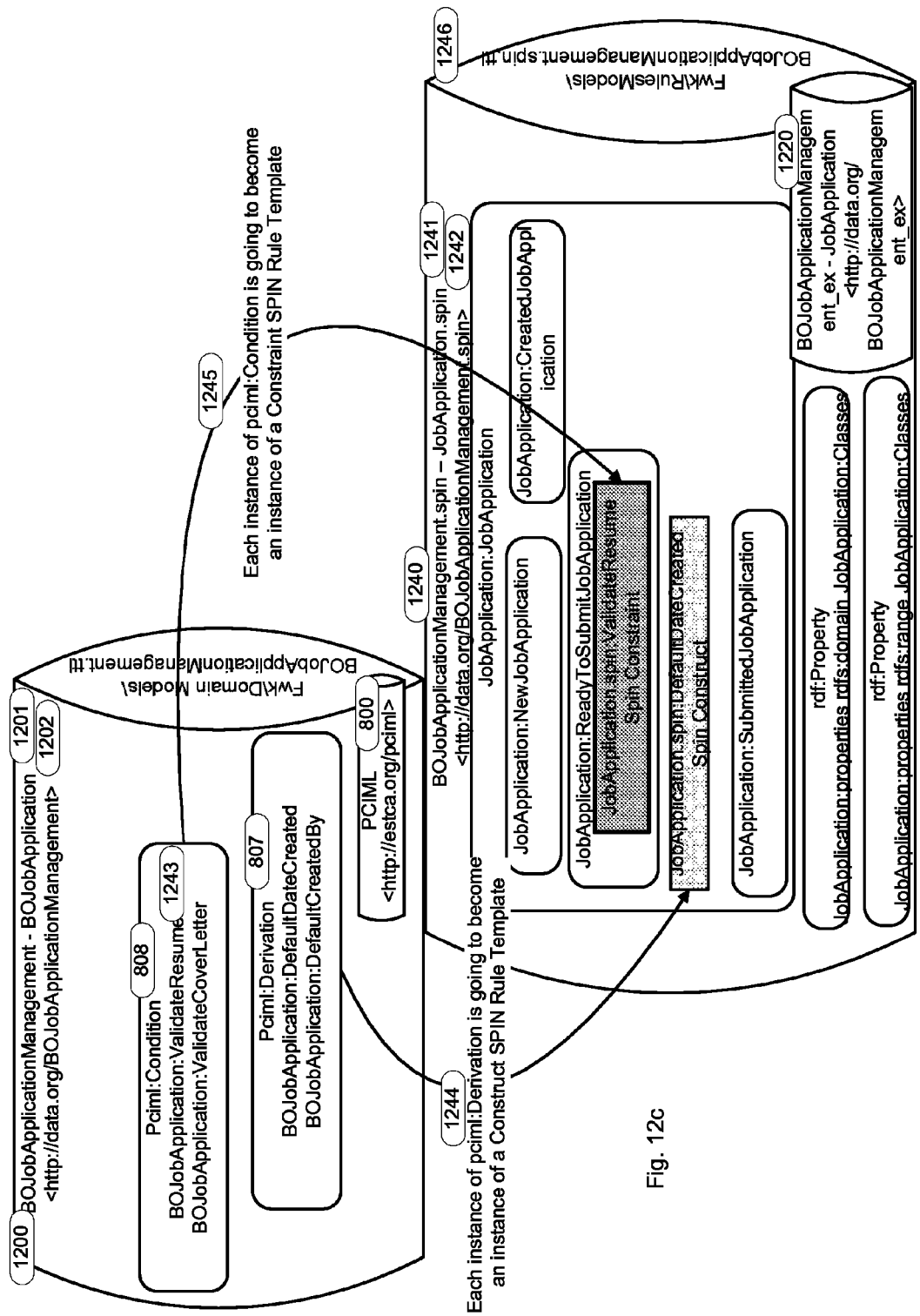
FIG. 12c shows the full transformation from PCIML Definition Model to Domain Rule model graphically using the Job Application Object PCIML Model example in accordance with an embodiment of the present invention.

FIG. 12c shows the example of the PCMIL Definition for Job Application that is stored in the following file Fwk\DomainModels\BOJobApplicationManagement.ttl 1204.

The PCIML Model BOJobApplicationManagement 1200 have the prefix BOJobApplication 1201 which is equivalent to the base URI <http://data.org/BOJobApplicationManagement> 1202.

The condition BOJobApplication:ValidateResume 1243 which is the same of <http://data.org/BOJobApplicationManagement#ValidateResume> is an instance of the pciml:Condition Class Construct that is instantiated into a Rules Model BOJobApplicationManagement.spin 1240 with Prefix JobApplication.spin 1241 and Base URI <http://data.org/BOJobApplicationManagement.spin> 1242

During the instantiation the JobApplication.spin:ValidateResume 1243 SPIN Constraint Rule which is the same of <http://data.org/BOJobApplicationManagement.spin#ValidateResume> is created.

The transformation from PCIML Model to Rule models is also detailed in FIG. 12c where the BOJobApplicationManagement 1200 is detailed with instances examples defined inside each PCIML class constructs represented by the round rectangles.

The instances of class constructs such as pciml:Condition 808 and pciml:Derivation 807 will be used to create a new Rules Model that holds Construct and Constraint SPIN Rules connected to the adequate classes defined in the Schema Graph.

On the diagram there are 2 lines with arrows connecting the PCIML instances of the Job Application PCIML Object Model BOJobApplicationManagement 1200 to the instantiated Construct and Constraint SPIN Rules on the new Job Application Rules Model BOJobApplicationManagement.spin 1240.

i. Each instance of pciml:Derivation is going to become an instance of a Construct SPIN Rule Template 1244 related to the appropriated Class.

ii. Each instance of pciml:Condition is going to become an instance of a Constraint SPIN Rule Template 1245 related to the appropriated Class.

The diagram also shows that the Rules models imports the BOJobApplicationManagement_ex 1220 Schema Graph model The generated Rules Model also respect the hierarchy defined for PCIML, keeping the Component and Universe models separated from the Object models, etc.

By keeping the Rules also separated, the entire Domain Rules is kept in small specialised rules repository that can be federated when appropriated. This embodiment enables enormous performance gains, since ESTCA uses in most cases only the rules of the Objects A and B when reasoning via an inference engine in calculating a valid state transition.

If we compare to a Rules Engine World, each Object Rules model contain rules that can be used separately by object or federated via a Component or Universe.

The Rules Model for Job Application is then stored in the Fwk\RulesModels\BOJobApplicationManagement.spin.ttl 1246 file.

Creating the Data Instance Model

After the Schema Graph is created, the Data Instance models that are used to store instances of Domain classes is also created.

In order for the Web Server 210 to display the GUI 600 self-service portal www.ABCjobapplication.com 605 and the GUI 660 portal www.ABCHumanResources Management.com 661 displayed in FIG. 6 using the ESTCA Web server 240, the A and B Data Instance Graphs 261 and the Domain (Component or Universe) Data Instance Graphs 260 models containing the data instances or objects of the A and B classes or the domain respectively for Job Application, Person and Recruitment Management respectively are also required to be created.

The Data Instance models are created as a new OWL model with the new Base URI <http://data.org/BOJobApplicationManagement_data> 1260 with the prefix JobApplication_data 1261 and the base URI <http://data.org/BOJobApplicationManagement_data> that imports the respective Schema Graph model BOJobApplicationManagement_ex 1220 which imports the respective Rules Model BOJobApplicationManagement.spin 1240.

The Data Instance models also respect the hierarchy defined for PCIML, keeping the Component and Universe Data Instance models separated from the Object Data Instance models, etc.

By keeping the Data Instance Models also separated, the entire Domain Data is kept in small data sources that are based on small specialised schemas that can be connected anytime for Model data Federation.

This embodiment enables the deployment of cloud applications where data can spread across many different servers.

Figure 12D:
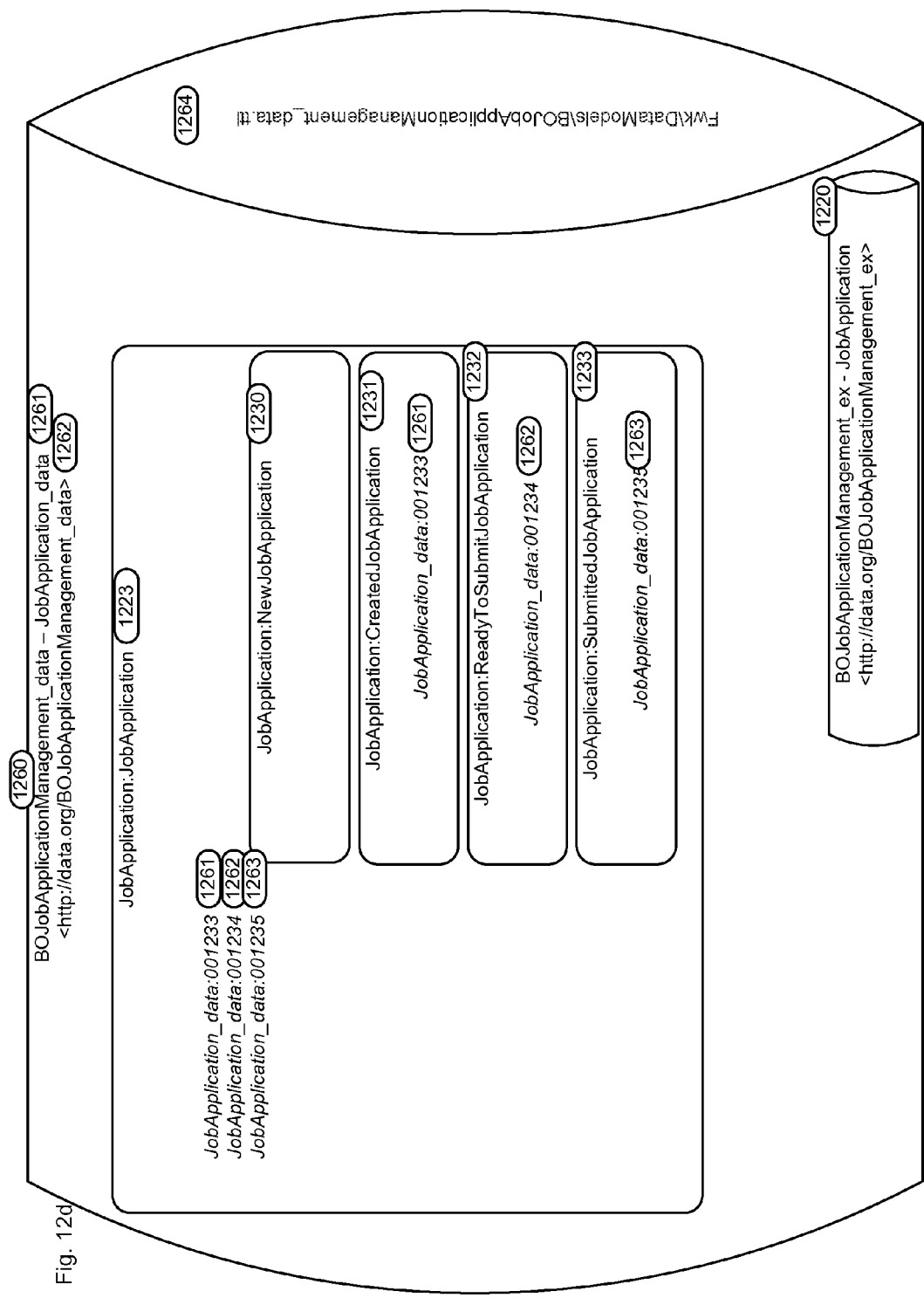
FIG. 12d shows the Job Application Object Data Instance Model example graphically in accordance with an embodiment of the present invention.

In the example in FIG. 12d the Job Application Object Data instance Models hierarchy is displayed.

In the diagram the BOJobApplicationManagement_data 1260—JobApplication_data 1261 Model is displayed.

The diagram also displays the JobApplication:JobApplication 1289 Classes. Each Class has three different instances in italic representing 3 different Job Applications that are stored in the Job Application model.

JobApplication_data:001233
JobApplication_data:001234
JobApplication_data:001235

From a component perspective, BDRecruitmentManagement_data—Recruitment_data model has some triples linking the Persons (Candidate, Worker) as Subject to the Job Applications as Object via the predicate Person:hasJobApplication using RDF Triples.

Person_data:Paul Person:hasJobApplication JobApplication_data:001233
Person_data:John Person:hasJobApplication JobApplication_data:001234
Person_data:Guil Person:hasJobApplication JobApplication_data:001235

Since the BOJobApplicationManagement_data 1260—JobApplication_data 1261 model has a property called JobApplication:hasCandidate that is pciml:inversePropertyOf the Predicate Person:hasJobApplication, the inferred triples linking the Job Applications as Subject to the Candidate as Object via the predicate JobApplication:hasCandidate are also stored in the BDRecruitmentManagement_data—Recruitment_data Model using RDF Triples. JobApplication_data:001233 JobApplication:hasCandidate Person_data:Paul JobApplication_data:001234 JobApplication:hasCandidate Person_data:John JobApplication_data:001235 JobApplication:hasCandidate Person_data:Guil By keeping the relationship triples at the Federated Component Model, allows to be able to keep data separated and federated as it is suited in different situations.

The Data Instances Model for Job Application is then stored in the Fwk\DataModels\BOJobApplicationManagement_data.ttl 1264 file.

After the PCIML data instances model creation, it is possible to validate the data structure and the rules defined in the PCIML models. This model also enables the work of data migration since the data repository will be created.

The embodiment provides a SPARQL Motion web service that creates the data instance model that is an OWL model with suffix (_data) that import the Schema Domain Ontology (_ex)

The embodiment also provides many different methods of data import, from xml to database connection.

The embodiment also provides a frame-based view for editing the data instance models which provides a tree with the resources taxonomy (Classes) with all its properties. The data instance frame-based view offers the ability to insert real data into the model with the ability to infer the results that will apply the rules defined in the rules model (.spin) returning constraints on the data inserted.

At this stage all structure, behaviour and rules of PCIML can be tested. The frame-based view cannot control the Agents, Events and Authorization definitions of PCIML because the access is external to the Domain and so the Agents, the Events and the authorization are not described on the Ontology. They are going to be defined by the method for design and deployment of domain recursive state machines defined next.

The Method for Design Domain Recursive State Machines

After the Business PCIML models are defined and the Schema, Rules and Data models are created, the next step is capturing in a platform-independent manner the first and second object and component design foundation ontology data for use in calculating a first and second object and component platform specific model data in accordance with the first and second object and component design foundation ontology data 760 that is about defining the Business PPIML Design Models or Business design foundation ontology data for each object, component and universe that is constituent of a particular business domain.

Each Business PPIML Design model contains one of the business domains constituent design captured using the Parametric Platform Independent Model Language (PPIML). In the example the Business Component PPIML Design Model for the Recruitment Management and the Business Object PPIML Design models for Job Application and Person Management are created in order to have their technical design captured using the Parametric Platform Independent Model Language (PPIML) which in this example is specialised for the SPARQL Web Pages (SWP) Technical Platform running on the web server 210.

The PPIML Design Model

This embodiment proposes the construction of a mechanism to manage the concept-to-design discrepancies by declaring semantic interconnections between the business systems definition (Business PCIML Domain Definition Models 1330) and a defined structure and dynamics of automation (Technical PCIML Domain Definition Models 1331) which is intended as the basis of design. The Technical PCIML Domain Definition Models 1331 are grouped in a Technical Specification 1332 that is most suited for each particular Domain Design enabling the Business and Technical Interoperability 1333. The PPIML Design model is the bridge between Business Domain Decomposition and the Technical Domain Decomposition responsible for managing the discrepancies.

Figure 13A:
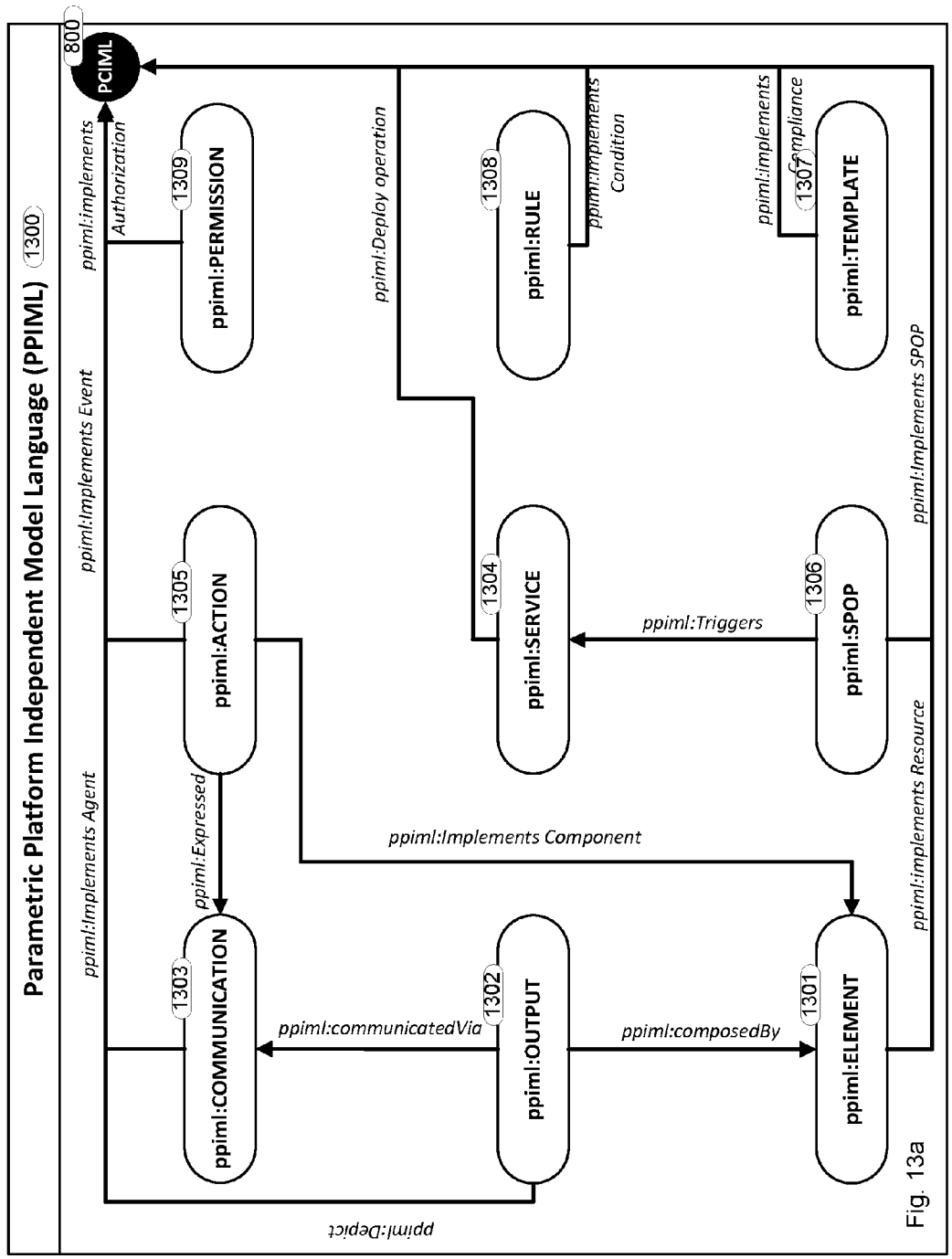
FIG. 13a shows the Parametric Platform Independent Model Language (PPIML) Class Relationship Diagram in accordance with an embodiment of the present invention.
Figure 13B:
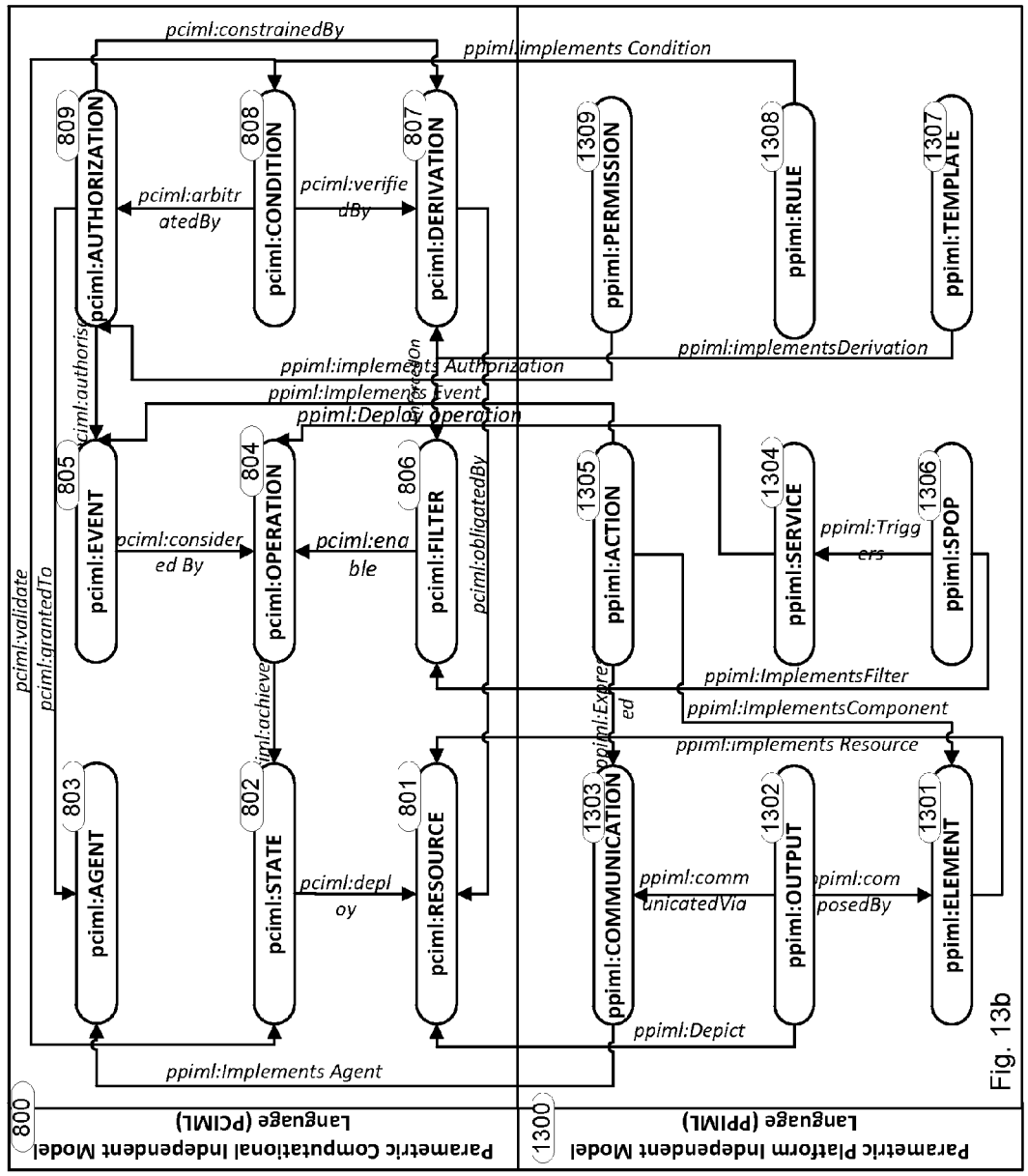
FIG. 13b shows the Parametric Platform Independent Model Language (PPIML) connected with Parametric Computation Independent Model Language (PCIML) Class Relationship Diagram in accordance with an embodiment of the present invention.
Figure 13C:
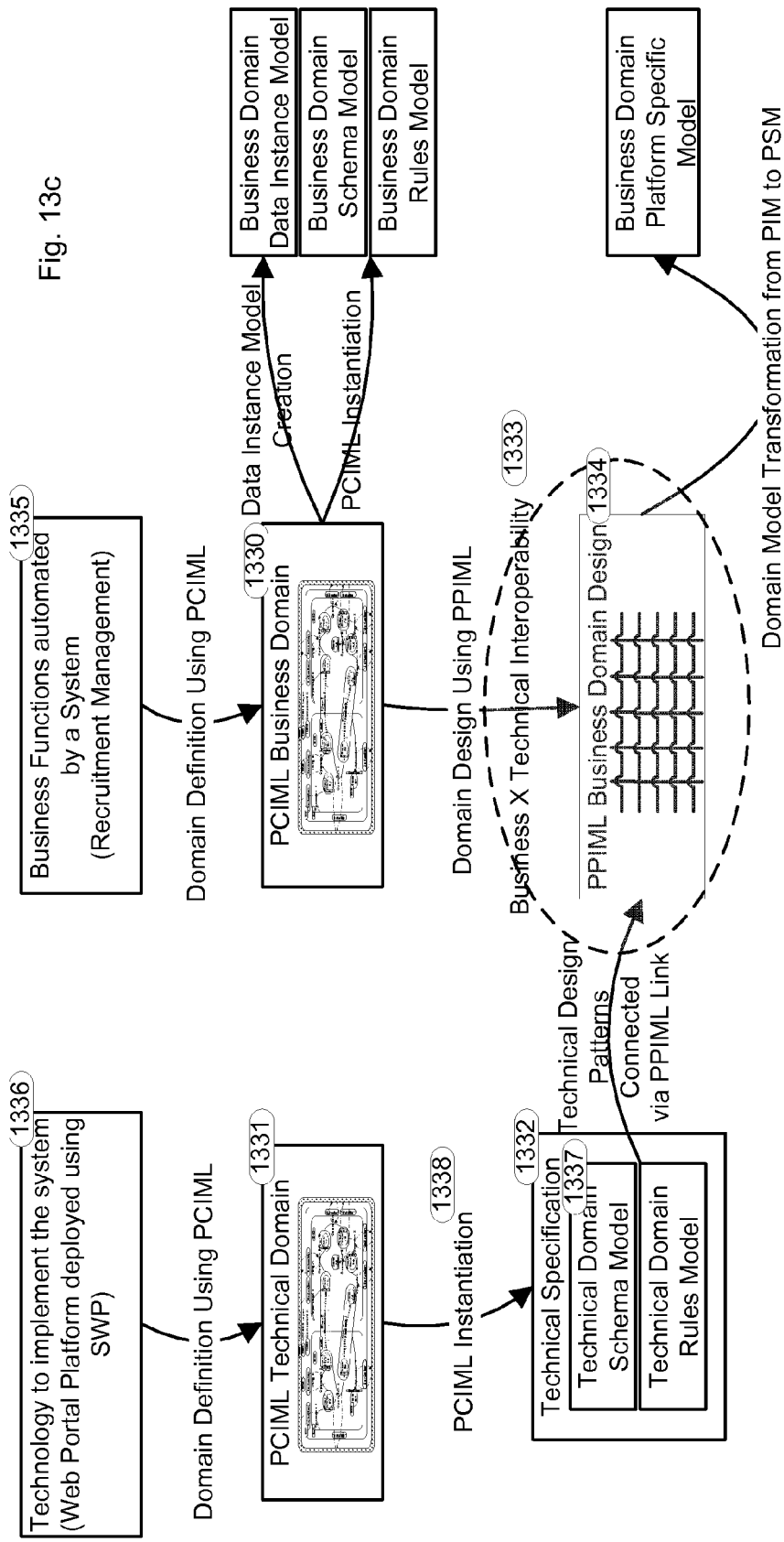
FIG. 13c shows an the Parametric Platform Independent Model Language (PPIML) enabling the Business and Technical Interoperability in accordance with an embodiment of the present invention.

FIG. 13c shows the map between PCIML Business Domain Logic Definitions 1330 to its PPIML Domain Design 1334, with the intend to map Business Functions 1335 to Technical Implementations 1336 or with the intention to deploy Applications using the Web Technical Specification which describes the web application running on web server 210.

The Business PPIML design models 1334 connect then business meta-models M1-models (Business PCIML Models 1330) to technical schema models M0-models 1337 (Instantiated 1338 from Technical PCIML Models 1331).

Each domain has a form, for example we can have a domain that defines a TV. This domain will have the TV that can have the States On, Off, display menu, display channel, etc. The TV will also have the events that are represented by every button on its remote control and some conditions on what functionality required a different state to be available, etc.

This same TV has not only a definition but a design, which is what we see. It has a screen that is x inches large, that has y kg, that is z cm deep and that has w number of HDMI connectors, etc.

The PPIML Design model 1334 is about the design of the Business Domain 1335 using a Web Portal that is the best method for interacting with Business Domains 1335 which are hosted as Web page templates 213 within the web service 210. In this example we need to define the Job Application page that is x pixels large, that is divided in z sessions, each sessions has y components that have w buttons, etc.

The design is about defining the way the Business Domain wants to present itself when communicating to different Agents on the external world. Another example, the domain can communicate with Agents via messages and with other agents via a Portal and with others via Rest Web services.

The main extension provided by this embodiment is the addition of the Parametric Platform Independent Model Language (PPIML) 1300 used to capture the design of the domain based on different Technical Specifications 1332 that in the example is the Technical domain called Web Design Specification 1336 that is instantiated 1338 into the Technical Specification for Web Technical Design Schema Graph Models 1337 that are responsible for providing the Specific Technical Design Patterns classes that are used to capture the Business Domain Design 1334 with intent to provide web portals.

Technical Specification

The technical specification is designed using the semantic web by providing a SWP Platform portal which can natively integrate to the schema, rules and data graph models by querying using SPARQL to read from all triple store models. However a technical specification could be designed to simulate application frameworks like Sales Force or PeopleSoft or SAP. In case the behaviour of the designed application framework are changed to be pure service oriented by using only one state transition engine, this applications could have their process orchestrated by ESTCA.

This is only possible because the Technical Specification 1332 is composed of Technical Design Schema Graph Models 1337 instantiated from 1337 Technical Component PCIML Model 1331 that in this example represents the Web Design Specification implemented using SWP.

As part of the Recruitment Management development in the example, was decided that the application must be provided via the Web, so the design patterns required to implement a Web Application were defined in many Technical Object PCIML Models grouped in a Technical Component PCIML Model called TCTechnicalServices.

The Technical Models are the models which describe the technical abstractions of the applications that can be implemented by a Technical Specification.

The ability to define different types of domains such as Business, Framework, Aspect, Technical and Platform enables the content invariance.

Taking the Web Design Specification as an example that is described using the Technical Component TCTechnicalServices and the fact that PCIML is build using approaches to software modularization and composition, the technical components used in this example will be defined in many Technical Object PCIML Models that are then grouped by the TCTechnicalServices Component via the property owl:imports, exactly the same way the Business models (Recruitment, Person and Job Applications) are connected, which was described previously.

The ability to create schemas and rules models from Technical Domain PCIML Models plus the structure provided by the Parametric Platform Independent Model Language (PPIML) 1300 with constructs that link the high level design and its subclasses to the definition of a business domain defined using PCIML is the key for building bridges between business and technical domains, which is required for componentization of any Framework Architecture.

This is achieved by using the property subclass of PPIML construct that links each Technical Object PCIML Model to a PPIML Construct 226, what allow the embodiment to integrate the classes of the schema models generated from a Technical Object PCIML Model as a subclass of a PPIML construct that are then linked with the PPIML Ontology that is going to be used to capture the design abstractions and specifications in the PPIML Models.

This is achieved by the creation of the PPIML link to a Technical Specification WebTechnicalSpec 1463 ontology model, which has the base URl http://estca.org/PPIML/WebTechnicalSpec 1464.

Figure 14A:
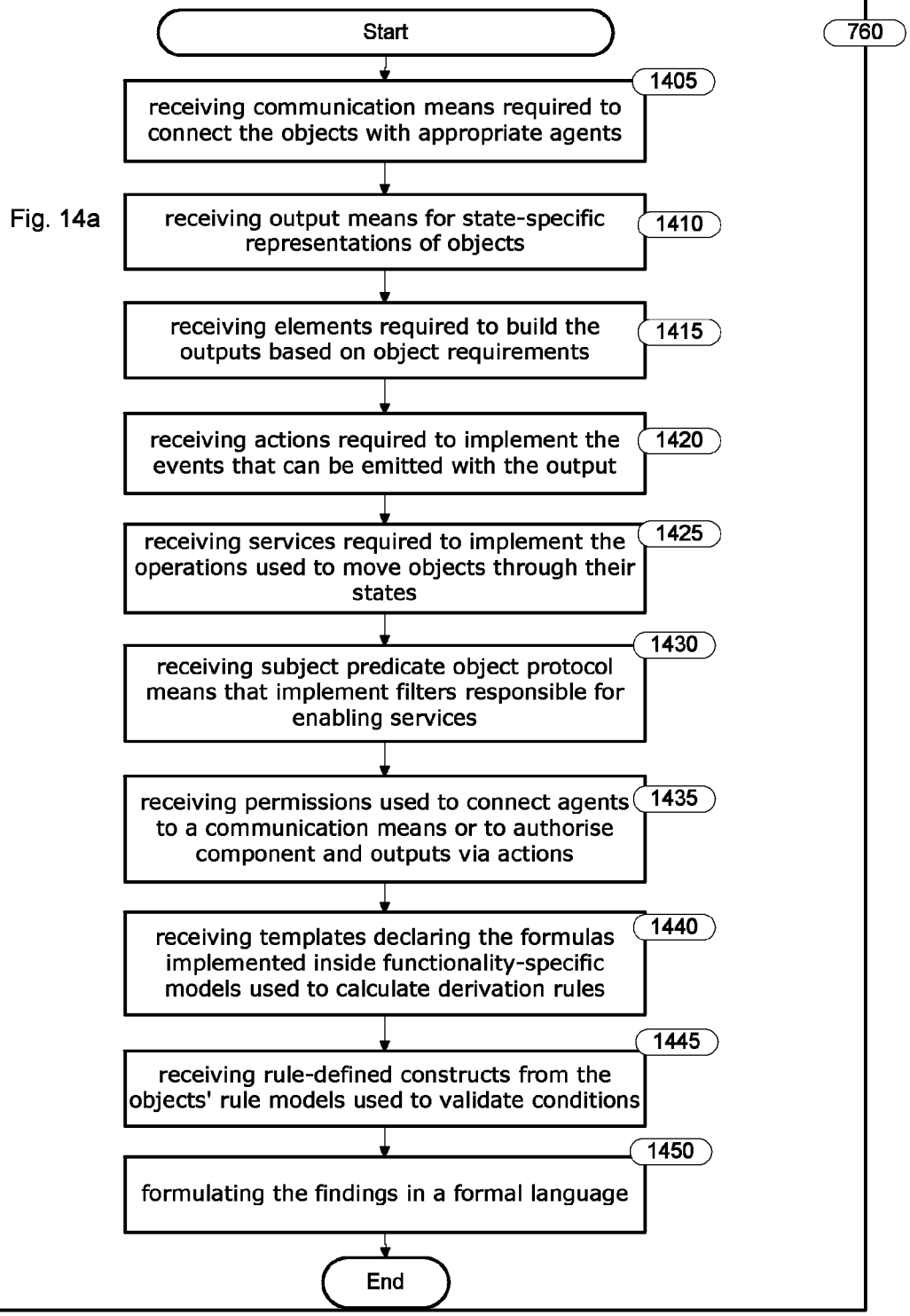
FIG. 14a shows the part of the computer-implemented method for the design of domain recursive state machines for computing devices for State Transitions of Recursive State Machines ESTCA (Event, State, Transition, Condition and Action) responsible for building the design foundation ontology data for use in generating interface data in accordance with an embodiment of the present invention.
Figure 14B:
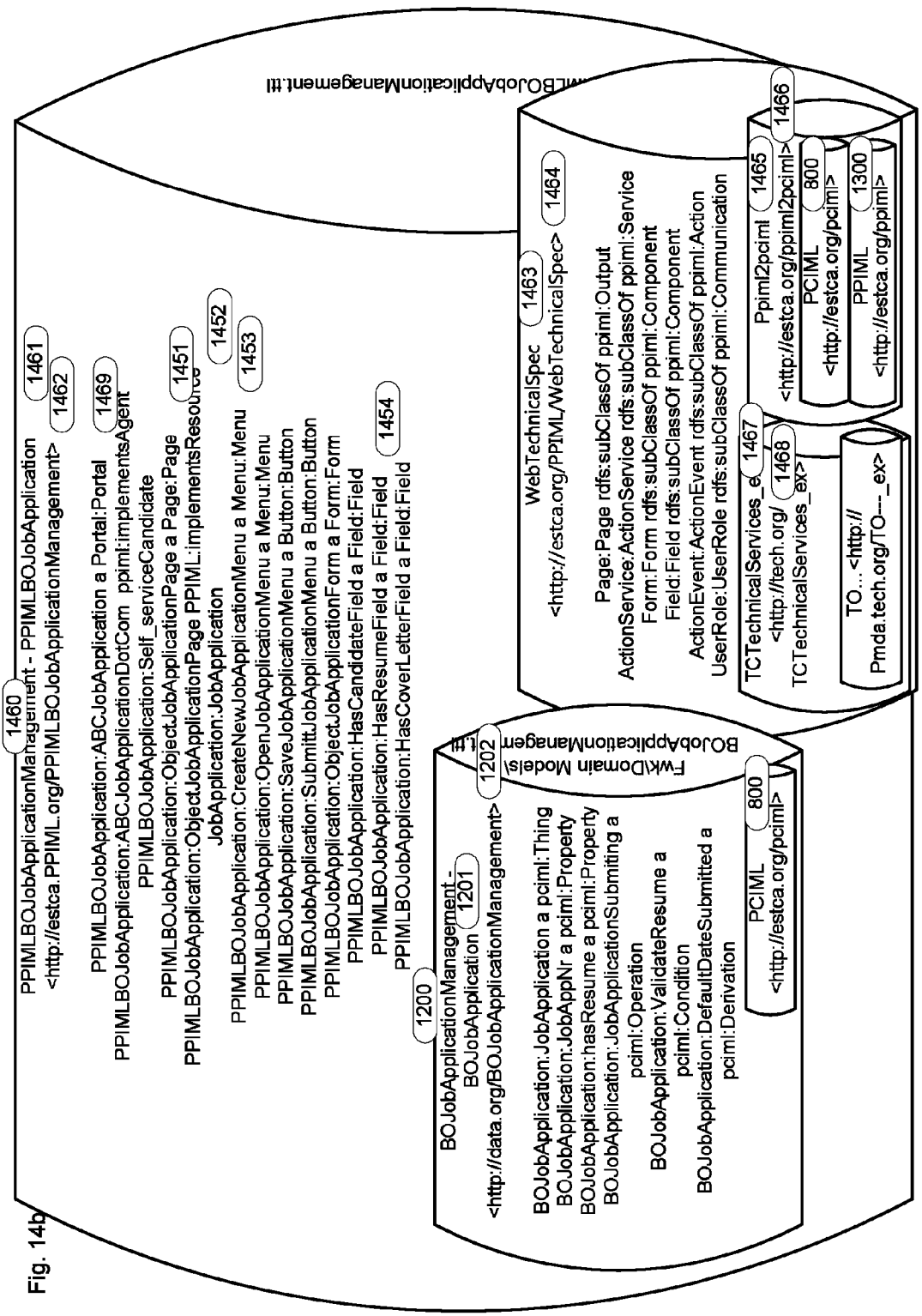
FIG. 14b shows the Job Application Object PPIML Design Model example graphically in accordance with an embodiment of the present invention.

Refer to FIG. 14*b* for the PPIMLBOJobApplicationManagement 1460 model diagram.

The Technical Specification schema model imports then the two following models that form the Web Specification PPIML link:
  i. The PPIML2PCIML Ontology 1465—<http://estca.org/ppiml2pciml> 1466 composed of:
    a. PCIML Ontology 800—<http://estca.org/pciml>
    b. PPIML Ontology 1300—<http://estca.org/ppiml>
  ii. The TCTechnicalServices_ex Schema Graph Model 1467—<http://tech.org/TCTechnicalServices_ex> 1468 composed of all Technical Schema Graph for its Technical Object PCIML elements.

The Job Application PPIML Design Model is used as an example for the description of the step capturing in a platform-independent manner the first and second object and component design foundation ontology data for use in calculating a first and second object and component platform specific model data in accordance with the first and second object and component design foundation ontology data 760. The Model imports the Web Technical Specification as the selected Technical Specification, so the PPIML Design Model will import the model defined above connecting the PPIML Constructs described below to the instantiated technical schema model classes, like in the example below using RDF Triples.

Page:Page rdfs:subClassOf ppiml:Output
  ActionService:ActionService rdfs:subClassOf ppiml:Service
  Form:Form rdfs:subClassOf ppiml:Element
  Field:Field rdfs:subClassOf ppiml:Element
  ActionEvent:ActionEvent rdfs:subClassOf ppiml:Action
  UserRole:UserRole rdfs:subClassOf ppiml:Communication The Parametric Platform Independent Model Language (PPIML)

Another embodiment of the invention delivers the Parametric Platform Independent Model Language (PPIML) 1300 ontology, which the class relationship diagram is represented graphically in FIG. 13*a* which defines the view of a system from the platform independent viewpoint which is captured in the design foundation ontology data. The PPIML has constructs that exhibit a specified degree of platform independence so as to be suitable for use with a number of different platforms of similar type (OMG, 2003).

The PPIML describes the construction of a system on an ontological level, meaning that the construction of the system is specified without implementation details. It is important to say that a PPIML depends on a PCIML Definition Model to exist in order to enable the design.

PPIML is then a domain design language that captures domain design from a PIM view point connecting business PCIML models to technical schemas generated from technical PCIML models building a bridge between definition and design creating the Business and Technical Interoperability.

PPIML is an incomplete meta-model that defines 9 main constructs mainly used as bridge between Business PCIML models and the technical domain components that are specific for a technical requirement defined as Technical PCIML models that could be specific to Web, Client Server, Mobile, etc.

As explained before, the final PPIML will be configured for each need, based on the specific design required to deliver a business domain. The configuration is done by creating a Technical Component PCIML that would describe a particular technical specification. In this example is the SWP web application running on web server 210. After the technical domain schema is generated, it will provide the technical abstractions required by defining the technical design that is attached to PPIML in order to extend the Business PCIML Domain Definition.

The final PPIML is then responsible in defining the design that will enable the business domain to interact with the external World. At the same time PCIML defines the domain logic, the PPIML designs the way the external world can picture the same Domain in order to communicate with it.

As an example, a Business Domain Logic Definition that require data input and output which enable a Human Resources Domain can be designed to be used in a Web Browser, or a client server application or also a mobile device, etc, so the look and feel will be specific to a design type chosen. The same Business Domain can communicate also with other agents via messages and the information contained on these messages will have to comply with some specific standards.

There is also a PCIML-PPIML link ontology that is composed only by the Property rdfs:range definitions linking the properties of PPIML ontology to classes of PCIML ontology. This link ontology creates a neural connection between PCIML and PPIML. The Graphical representation of the PPIML and PCIML Link is represented graphically in FIG. 13*b*.

The meta-model is an example of a layer 2 MOF (Meta Object Facility) model: the model that describes PPIML ontology itself. These M2-models describe elements of the M1-layer, and thus M1-models. These would be, for example, models written using the PPIML ontology. The last layer is the M0-layer or data layer. It is used to describe real-world objects and in this case is composed of the particular technical component schema models generated from the M1-layer and Technical Domain instances.

The ontology is built using the web ontology language (OWL) and SPARQL Inference Notation (SPIN).

On FIG. 14*a*, the step capturing in a platform-independent manner the first and second object and component design foundation ontology data for use in calculating a first and second object and component platform specific model data in accordance with the first and second object and component design foundation ontology data 760 is subdivided in sub-steps used to capture the Object or Component or Universe PPIML Design foundation ontology data models of interest. The sub-steps are used to define the Design of a Business PCIML Model defined before.

By performing the sub-steps on FIG. 14*a*, The PPIML Design foundation ontology data is going to enable the design of any Business PCIML Object that can be person, company, location, party, invoice, sales order, product, job application, schedule, accounts, service, purchase order, manufacture order using Technical PCIML Objects like page, form, menu, buttons, actions, transactions, events, users etc.

In order to illustrate the steps some examples are defined using the Job Application Business Object PPIML Design foundation ontology data Model 1460 that is used in the GUI 600, 630 and 660 on FIG. 6 implemented using the Web Design Specification 1463 Technical specification that describes the components stored as Web page templates 213 used by a portal application that is hosted in the web service 210.

All Job Application Business Object PPIML Model 1460 together represent the Job Application canonical model by connecting the enterprise definition of Job Application with each Technical Application used to deploy Job Application type services. This enables the integration between capabilities to be defined at the Computation Independent viewpoint and not in the Platform Independent viewpoint as it is the case with the current technologies.

The first three PPIML constructs are responsible for describing what is required to design technically a Domain defined in PCIML. It defines the elements, the possible output forms and the communication methods to deliver the design.

Communication

The first step is about receiving communication means required to connect the objects with appropriate agents 1405 using the PPIML Construct Communication (ppiml:Communication) 1303 which groups the Technical PCIML instantiated schema models that deploy Communication type objects for the technical specification such as TOUserRoleCommunication, TOGatewayManagement, TOPortalManagement.

For the Job Application PPIML Design Model 1460 definition of PPIML Construct Communication refer to FIG. 14*b* for some examples using RDF Triples like: PPIMLBOJobApplication:ABCJobApplicationDotCom a Portal:Portal 1469 PPIMLBOJobApplication:ABCJobApplicationDotCom ppiml:implementsAgent PPIMLBOJobApplication:Self_serviceCandidate Communication has implements agent (ppiml:implementsAgent) property. Each instantiated technical PCIML model class that is subclass of ppiml:Communication is going to have the above properties as part of their domains.

The implements agent (ppiml:implementsAgent) defines a relationship with the PCIML construct Agent (pciml:Agent) and defines the agent that is implemented using the communication creating the link between Design and Definition.

Output

The next step is about receiving output means for state-specific representations of objects 1410 using the PPIML Construct Output (ppiml:Output) 1302 which groups the Technical PCIML instantiated schema models that deploy Output type domains for the technical specification such as TOMessageManagement, TOPageManagement, TOPageSectionManagement.

For the Job Application PPIML Design Model 1460 definition of PPIML Construct Output refer to FIG. 14*b* for some examples using RDF Triples like: PPIMLBOJobApplication:ObjectJobApplicationPage a Page:Page 1451 PPIMLBOJobApplication:ObjectJobApplicationPage PPIML:implementsResource JobApplication:JobApplication 1452

The Output defined is used for the Web Server 210 to display the GUI 600 self-service portal www.ABCjobapplication.com 605 and the GUI 660 portal www.ABCHumanResourcesManagement.com 661 displayed in FIG. 6 using the ESTCA Web server 240.

Output has communicated via (ppiml:communicatedVia), composed by (ppiml:composedBy) and depict (ppiml:depict) properties. Each instantiated technical PCIML model class that is subclass of ppiml:Output is going to have the output properties as part of their domains.

The property communicated via (ppiml:communicatedVia) defines a Communication (ppiml:Communication) method that delivers the output.

The property composed by (ppiml:composedBy) defines a Element (ppiml:Element) that composes this output.

The property depict (ppiml:depict) defines a relationship with the PCIML construct Thing (pciml:Thing) in order to define what thing is depicted by the particular output creating the link between Design and Definition.

Element

The next step is about receiving elements required to build the outputs based on object requirements 1415 using the PPIML Construct Element (ppiml:Element) 1301 which groups the Technical PCIML instantiated schema models that deploy Element type domains for the technical specification such as TOFormManagement, TOFieldManagement, TOButtonManagement, TOMenuManagement and TOStyleSheetComponent.

For the Job Application PPIML Design Model 1460 definition of PPIML Construct Element refer to FIG. 14*b* for some examples using RDF Triples like: PPIMLBOJobApplication:CreateNewJobApplicationMenu a Menu:Menu 1453 PPIMLBOJobApplication:OpenJobApplicationMenu a Menu:Menu PPIMLBOJobApplication:SaveJobApplicationMenu a Button:Button PPIMLBOJobApplication:SubmittJobApplicationMenu a Button:Button PPIMLBOJobApplication:ObjectJobApplicationForm a Form:Form PPIMLBOJobApplication:HasCandidateField a Field:Field PPIMLBOJobApplication:HasResumeField a Field:Field 1454 PPIMLBOJobApplication:HasCoverLetterField a Field:Field Element has implements resource (ppiml:implementsResource) property. Each instantiated technical PCIML model class that is subclass of ppiml:Element is going to have the Element properties as part of their domains.

The property implements resource (ppiml:implementsResource) defines a relationship with the PCIML construct Resource (pciml:Resource) in order to define what resource is implemented by this particular element creating the link between Design and Definition.

The next three constructs are responsible for describing the behaviour of outputs and elements. This evolution is represented in a finite state machine that is triggered when SPOP is matched, enabling actions or transactions services that trigger actions responsible for delivering outputs. It defines the way the elements are executed or demonstrated as part of the domain behaviour, it also drives the communication to the external world.

Action

The next step is about receiving actions required to implement the events that can be emitted with the output 1420 using the PPIML Construct Action (ppiml:Action) 1305 that groups the Technical PCIML instantiated schema models that deploy Action type technical domains for the technical specification such as TOActionEventComponent.

Below are some examples of the Job Application PPIML Design Model 1460 definition of PPIML Construct Action using RDF Triples: PPIMLBOJobApplication:SubmitJobApplicationActionEvent a ActionEvent:ActionEvent PPIMLBOJobApplication:SubmitJobApplicationActionEvent ppiml:implementsEvent BOJobApplication:SubmitJobApplicationButton PPIMLBOJobApplication:SubmitJobApplicationActionEvent ppiml:implementsElement PPIMLBOJobApplication:SubmitButton Action has implements element (ppiml:implementsElement) and implements event (ppiml:implementsEvent) Properties. Each instantiated technical PCIML model class that is subclass of ppiml:Action is going to have the action properties as part of their domains.

The property implements element (ppiml:implementsElement) defines an element (ppiml:Element) that is implemented by this Action.

The property implements event (ppiml:implementsEvent) defines a relationship with the PCIML construct Event (pciml:Event) in order to link the Event that is computation independent to the action that is the technical implementation creating the link between Design and Definition.

Service

The next step is about receiving services required to implement the operations used to move objects through their states 1425 using the PPIML Construct Service 1304 (ppiml:Service) which groups the Technical PCIML instantiated schema models that deploy Service type technical domains for the technical specification such as TOActionServiceComponent, TOTransactionServiceComponent Below are some examples of the Job Application PPIML Design Model 1460 definition of PPIML Construct Service using RDF Triples: PPIMLBOJobApplication:JobApplicationSubmitingService a ActionService:ActionService PPIMLBOJobApplication:JobApplicationSubmittingService ppiml:deployOperation BOJobApplication:JobApplicationSubmitting Service has deploy operation (ppiml:deployOperation) property. Each instantiated technical PCIML model class that is subclass of ppiml:Service is going to have the service properties as part of their domains.

The property deploy operation (ppiml:deployOperation) defines a relationship with the PCIML construct Operation (pciml:Operation) in order to link the Operation that is computation independent to the Service that is the technical implementation creating the link between Design and Definition.

SPOP

The next step is about receiving subject predicate object protocol means that implement filters responsible for enabling services 1430 when receiving events using the PPIML Construct SPOP 1306 (ppiml:SPOP) which groups the Technical PCIML instantiated schema models that deploy SPOP type technical domains for the technical specification such as TOStatePatternService.

Below are some examples of the Job Application PPIML Design Model 1460 definition of PPIML Construct SPOP using RDF Triples: PPIMLBOJobApplication:SubmittedJobApplicationPattern a StatePattern:StatePattern PPIMLBOJobApplication:SubmittedJobApplicationPattern ppiml:implementsFilter BOJobApplication:HasSubmittedJobApplication SPOP has implements Filter (ppiml:implementsFilter) and trigger (ppiml:trigger) properties. Each instantiated technical PCIML model class that is subclass of ppiml:SPOP is going to have the status properties as part of their domains.

The property trigger (ppiml:trigger) defines a Service (ppiml:Service) that is triggered by the ppiml:SPOP.

The property implements Filter (ppiml:implementsFilter) defines a relationship with the PCIML construct Filter (pciml:Filter) in order to link the Filter that is computation independent to the SPOP that is the technical implementation creating the link between Design and Definition.

The next three PPIML constructs are responsible for describing how the technical configuration is going to control the Permissions and also the definition of Rules and Templates used to deliver domain specific rules functionality.

Permission

The next step is about receiving permissions used to connect agents to a communication means or to authorise elements and outputs via actions 1435 using the PPIML Construct Permission 1309 (ppiml:Permission) which groups the Technical PCIML instantiated schema models that deploy Permission type of technical domains for the technical specification such as TOPermissionListManagement Below are some examples of the Job Application PPIML Design Model 1460 definition of PPIML Construct Permission using RDF Triples: PPIMLBOJobApplication:SubmitJobApplicationPL a PermissionList:PermissionList PPIMLBOJobApplication:SubmitJobApplicationPL ppiml:implementsAuthorization BOJobApplication:SubmitJobApplicationAuthorization Permission has implements authorization (ppiml:implementsAuthorization) property. Each instantiated technical PCIML model class that is subclass of ppiml:Permission is going to have the permission properties as part of their domains.

The property implements authorization (ppiml:implementsAuthorization) defines a relationship with the PCIML construct Authorization (pciml:Authorization) in order to link the Authorization that is computation independent to the Permission that is the technical implementation creating the link between Design and Definition.

Rule

The next step is about receiving rule-defined constructs from the objects' rule models used to validate conditions 1445 using the PPIML Construct Rule 1308 (ppiml:Rule) which groups the Technical PCIML instantiated schema models that deploy Rules type technical domains for the technical specification such as TOSPINConstraintManagement.

Below are some examples of the Job Application PPIML Design Model 1460 definition of PPIML Construct Rule using RDF Triples: PPIMLBOJobApplication:ValidateResumeConstraint a SPINConstraint:SPINConstraint PPIMLBOJobApplication:ValidateResumeConstraint ppiml:implementsCodition BOJobApplication:ValidateResume Rule has implements condition (ppiml:implementsCondition) property. Each instantiated technical PCIML model class that is subclass of ppiml:Rule is going to have the rule properties as part of their domains.

The property implements condition (ppiml:implementsCondition) defines a relationship with the PCIML construct Condition (pciml:Condition) in order to link the Condition that is computation independent to the Rule that is the technical implementation creating the link between Design and Definition.

Template

The next step is about receiving templates declaring the formulas implemented inside functionality-specific models used to calculate derivation rules 1440 using the PPIML Construct Template 1307 (ppiml:Template) which groups the Technical PCIML instantiated schema models that deploy Template type of technical domains for the technical specification such as TOSPINConstructManagement Below are some examples of the Job Application PPIML Design Model 1460 definition of PPIML Construct Template using RDF Triples: PPIMLBOJobApplication:dateSubmittedDefaultValueFormulaTemplate a SPINConstruct:SPINConstruct PPIMLBOJobApplication:dateSubmittedDefaultValueFormulaTemplate ppiml:implementsDerivation BOJobApplication:dateSubmittedDefaultValue Template has implements derivation (ppiml:implementsDerivation) property. Each instantiated technical PCIML model class that is subclass of ppiml:Template is going to have the template properties as part of their domains.

The property implements derivation (ppiml:implementsDerivation) defines a relationship with the PCIML construct Derivation (pciml:Derivation) in order to link the Derivation that is computation independent to the Template that is the technical implementation creating the link between Design and Definition.

At the end of the PPIML design, the Objects Job Application and Person and the Component Recruitment Management have their design patterns defined. PPIML is then responsible for formulating the findings in a formal language 1450, defining the domain design foundation ontology data used to communicate with ESTCA.

PPIML is deployed in 1 ontology file that is ppiml.owl—Base URl: <http://estca.org/ppiml> 1300 and also one spin file that is ppiml.spin.ttl—Base URl: <http://estca.org/ppiml.spin>.

PPIML also delivers a model that is built to link the Design PPIML and Definition PCIML that is ppiml2pciml.owl 1465—Base URl: <http://estca.org/ppiml2pciml> 1466

The embodiment also provides the Technical Designer and Technical Domain Expert the Design frame-based view currently developed using Top Braid Ensemble delivered by Top Quadrant like the frame-based definition view shown in FIG. 10c. Like the frame-based definition view the header of the Application displays name of the model been edited is displayed. e.g. PPIMLBOPersonManagement with PPIML in front to highlight that the edited model is a PPIML Model.

The header also displays the hyperlink to navigate to the other views provided by the embodiment in order to support the Design. The different views are used for Hierarchy and Relationship Visualization provided in the same environment as different Tabs. These views are provided in order for the Technical Designer and Technical Domain Expert to be capable to analyse the definitions from a design perspective.

Below the header, like in the definition view, on the left side of the frame-based Design View there is the PCIML menu tree formed by the PCIML respective constructs provide by PCIML in order to access the Domain Logic Definitions for reference.

And below the PCIML Menu tree, there is the PPIML menu tree formed by the PPIML respective constructs provide by PPIML.

In order to navigate between the different instances of each construct, the user only need to select one of the constructs desired like in the frame-based Definition view.

By selecting any PCIML and PPIML construct, in the centre side of the view there is a grid that will display the instances of the construct selected on the left side.

Creating the Platform Specific Model

Another embodiment is responsible for Interpreting the PPIML Design Model in the form of Domain Platform Specific Template Instances 250.

This embodiment is highly coupled with the Platform that is going to support the Design. The current deployed Interpreter is focus in generating interpreted instances of SWP Elements that is deployed by the SWP Platform.

When defining the Technical Domain PCIML Model, there are extra parameters captured in order to enable the automatic mapping between definition and design used for automatically loading most of the design:

i. Loadable by PCIML Construct (This attribute defines the PCIML Construct that will be used to load the instances of this model when using load to the PPIML.)
  ii. Loaded PCIML Construct With Property (This attribute defines the PCIML Construct that will be used to load the instances of this model when using load to the PPIML by constraining the PCIML Construct by the selecting one property it most have)
  iii. Loaded from PCIML Construct With Property With Value (This attribute complements the last attribute by constraining the PCIML Construct by the selecting one property that most have this value)

In case the Definition is deployed using a different Platform such as SAP or PeopleSoft, the above properties must be configured to generate the mappings. In case it is desired that the meta-data that drives the Events in PeopleSoft and SAP to be automatically generated, then this embodiment can be used as a start point. The entire logic in converting the design to a deliverable format that could then be uploaded in one of the Platforms need to be build from the scratch.

These elements implement HTML Pages, Action Events, AJAX Menus and Trees, etc. This step is responsible in generating the Domain Platform Specific Template Instances 250 containing the meta-data which relates a business domain that in this example is the Recruitment Management to a Technical Specification design pattern used to describe applications like in the example of the www.ABCjobapplication.com 605 and www.ABCHumanResourcesManagement.com 661 implemented as web applications using the SWP Platform.

The Method for Deployment of Domain Recursive State Machines

After the Business PPIML Design models are defined and after the Business PCIML Definition models are defined and the Schema 270 and 271, Rules 272 and 273 and Data models 260 and 261 and Domain Platform Specific Template Instances 250 Models are created. The next step is capturing in a platform-specific manner the first and second object and component deployment foundation ontology data for use in selecting a first and second object schema data and a first and second object rules model data in accordance with the first and second object data 770 for use in selecting a first object schema data and a first object rules model data in accordance with the first object data 420. It is about defining the Application PPSML Deployment Models 290 for each model that is constituent of a particular business domain.

Each Business PPSML Deployment model contain one of the domain business deployment captured using the Parametric Platform Specific Model Language (PPSML). In the example the Business Component PPSML Deployment Model for the Recruitment Management and the Business Object PPSML Deployment model for Job Application and Person Management are created in order to have their deployment configuration captured using the Parametric Platform Specific Model Language (PPSML). This example is specialised for the Semantic Web Platform. Some configurations are used to define the web server 210 where the Portal application is running and the ESTCA web server 240 where the ESTCA Computing device is running.

The PPSML Deployment Model

This embodiment proposes the construction of a mechanism to manage the design-to-implementation discrepancies by declaring semantic interconnections between the business systems design (PPIML Business Domain Design 1334) and a defined structure and dynamics of machinery (PCIML Platform Domain 1531) which is intended as the platform for deployment. The PCIML Platform Domain 1531 are instantiated in a Platform Specification 1532 that is most suited for each particular Domain Deployment enabling the Business Design and Platform Interoperability 1533. The PPSML Deployment model is the bridge between Business Domain Design Decomposition and the Platform Domain Decomposition responsible for managing the discrepancies.

Figure 15A:
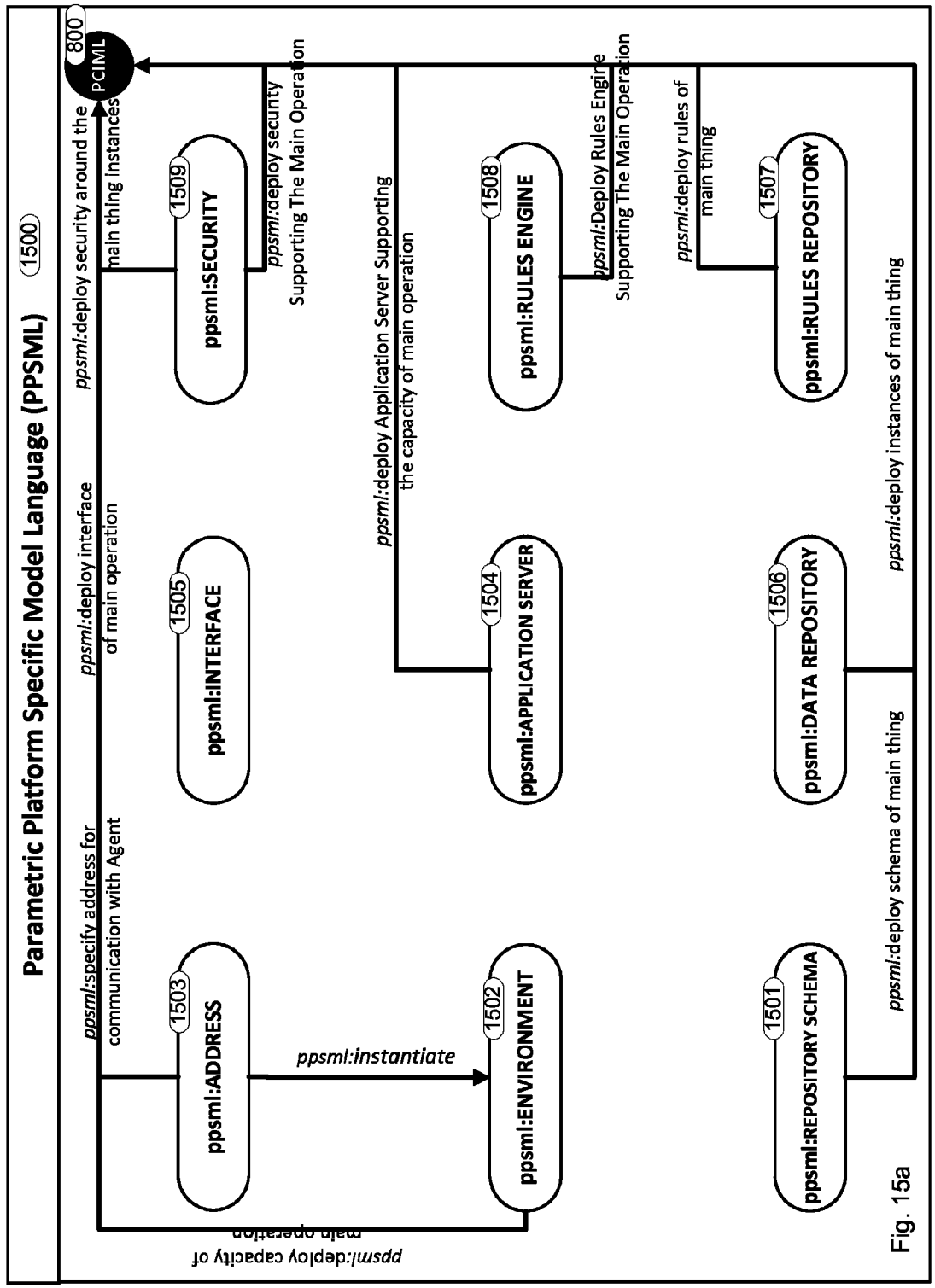
FIG. 15a shows the Parametric Platform Specific Model Language (PPSML) Class Relationship Diagram in accordance with an embodiment of the present invention.
Figure 15B:
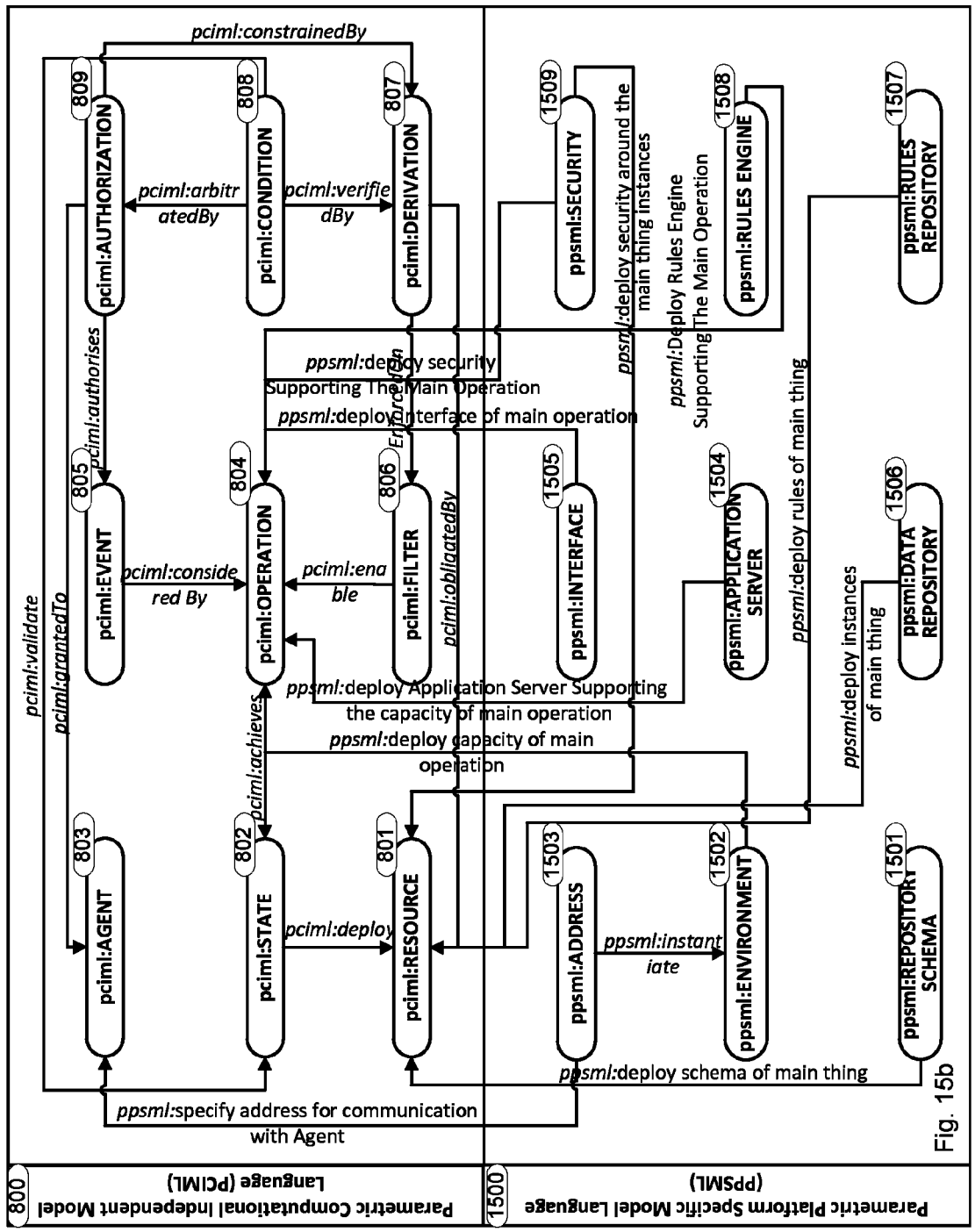
FIG. 15b shows the Parametric Platform Specific Model Language (PPSML) connected with Parametric Computation Independent Model Language (PCIML) Class Relationship Diagram in accordance with an embodiment of the present invention.
Figure 15C:
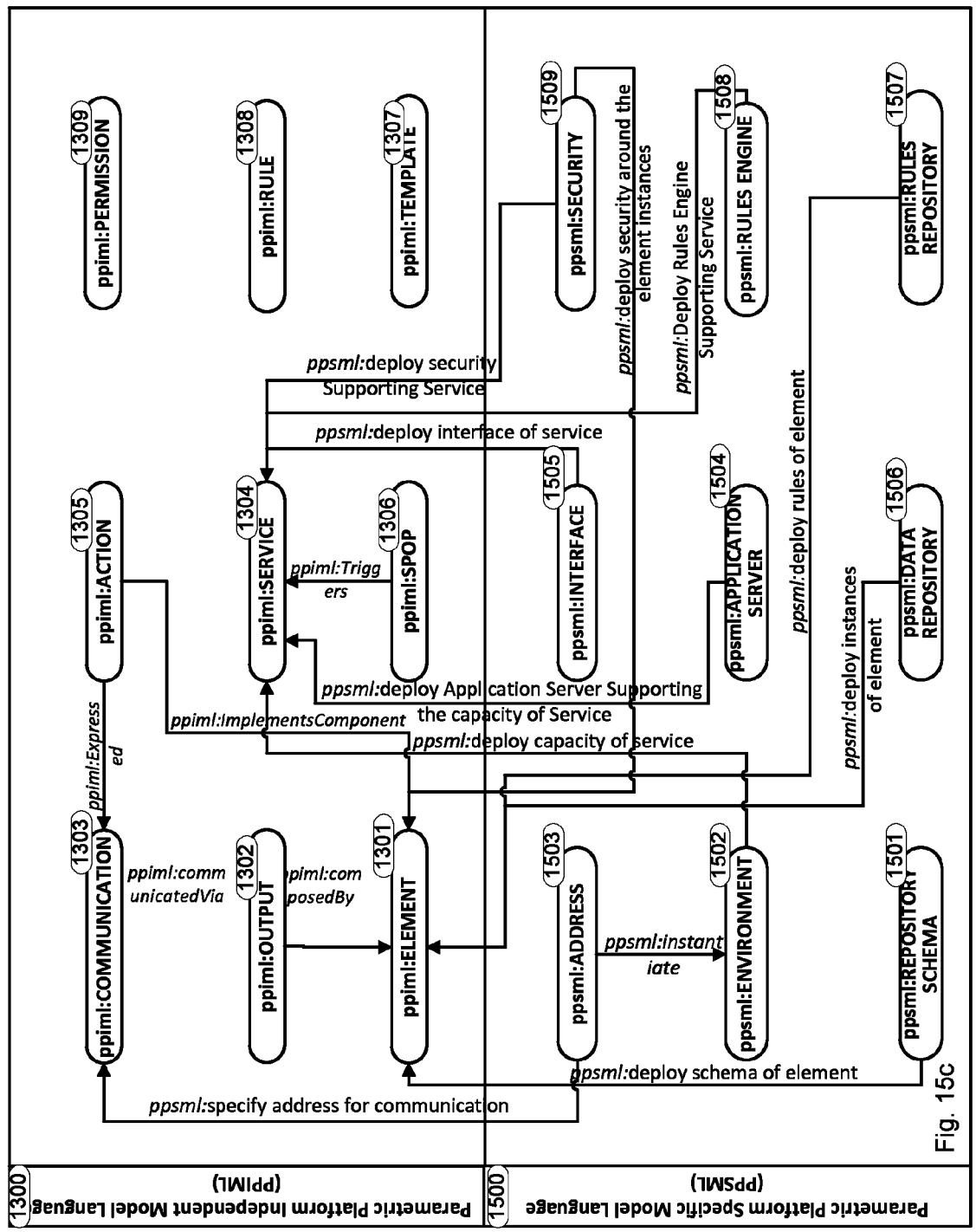
FIG. 15c shows the Parametric Platform Specific Model Language (PPSML) connected with Parametric Platform Independent Model Language (PPIML) Class Relationship Diagram in accordance with an embodiment of the present invention.
Figure 15D:
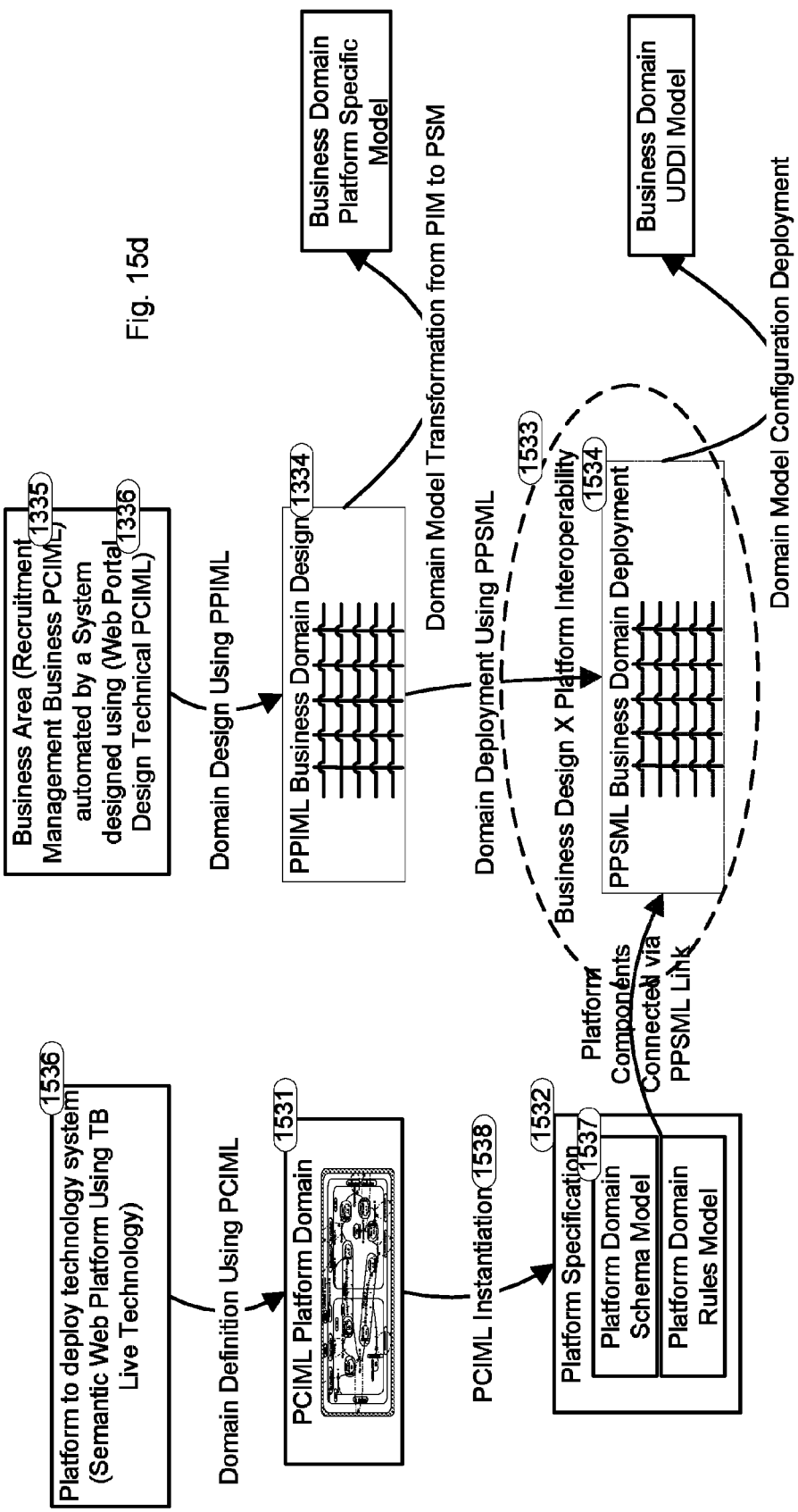
FIG. 15d shows an the Parametric Platform Specific Model Language (PPSML) enabling the Business Design and Platform Interoperability in accordance with an embodiment of the present invention.

FIG. 15*d* shows the map between PPIML Business Domain Design 1334 to its PPSML Domain Deployment 1534, with the intent to map Business Functions 1335 designed using a particular technical pattern 1336 to Platform Specific Deployment 1536. In this example it deploys Applications using the Semantic Web Platform Specification that describes the web application deployed on web server 210.

The Business PPSML deployment models 1534 connect then business design meta-models M1-models (Business PPIML Models 1334) to platform schema models M0-models 1537 (Instantiated 1538 from Platform PCIML Models 1531).

The PPSML Deployment model 1534 is about the deployment of the Business Domain 1535 using a Web Portal that is the best method for interacting with Business Domains 1535. The Portal is hosted somewhere that is configured. In this example it uses the Web page templates 213 within the web service 210.

The deployment is about defining which platform components support the Business Domain Design in order to execute and communicate with different Agents on the external world. Another example, the domain can communicate with Agents via messages and with other agents via a Portal and with others via Rest Web services and this components need also to be defined.

The main extension provided by this embodiment is the addition of the Parametric Platform Specific Model Language (PPSML) 1500 used to capture the deployment of the domains based on different Platform Specifications 1532. In the example a Platform domain called Semantic Web Specification 1536 that is instantiated 1538 into the Specific Semantic Web Platform Schema Graph Models 1537 is used to provide the Specific Platform Component classes that are used to capture the Business Domain Deployment 1534 with intent to deploy semantic web applications.

Platform Specification

This platform specification example is designed using the semantic web as platform by defining the semantic web components. However a platform specification could be defined to be implemented using application frameworks like Sales Force cloud or PeopleSoft or SAP.

This is only possible because the Platform Specification 1532 is composed of Platform Schema Graph Models 1537 instantiated from 1538 Platform Domain PCIML Models 1531. In this example they represents the Semantic Web Specification implemented using Top Braid Live.

The Platform Domain Models are the models that describe the platform abstractions of the component used to deploy a particular Platform Specification.

As part of the Recruitment Management deployment example, was decided that the application must be deployed using Semantic Web and the fact that PPSML is build using approaches to software modularization and composition, the platform components required by this example in order to deploy a full application will be defined as many Platform Object PCIML Models that are then grouped by the PCPlatformServices Component PCIML model via the property owl:imports.

The ability to create schema models from Platform Domain PCIML Models plus the structure provided by the Parametric Platform Specific Model Language (PPSML) 1500 with constructs that link the high level design and its subclasses to the definition of a business domain defined in PCIML and the design of business domain designed in PPIML is the key for componentization of any Architecture Deployment.

This is achieved by using the property subclass of PPSML construct that links each Platform Object PCIML Model to a PPSML Construct 226, what allow the embodiment to integrate the instantiated schema model classes from a Platform Object PCIML Model as a subclass of a PPSML construct that are then linked with the PPSML Ontology. This is going to capture the abstractions and specifications in the PPSML Models.

This is achieve by the Creation of the PPSML link to a Platform Specification SemanticWebPlatform 1663 ontology model, which has the base URl http://estca.org/PPSML/SemanticWebPlatform 1664.

Figure 16A:
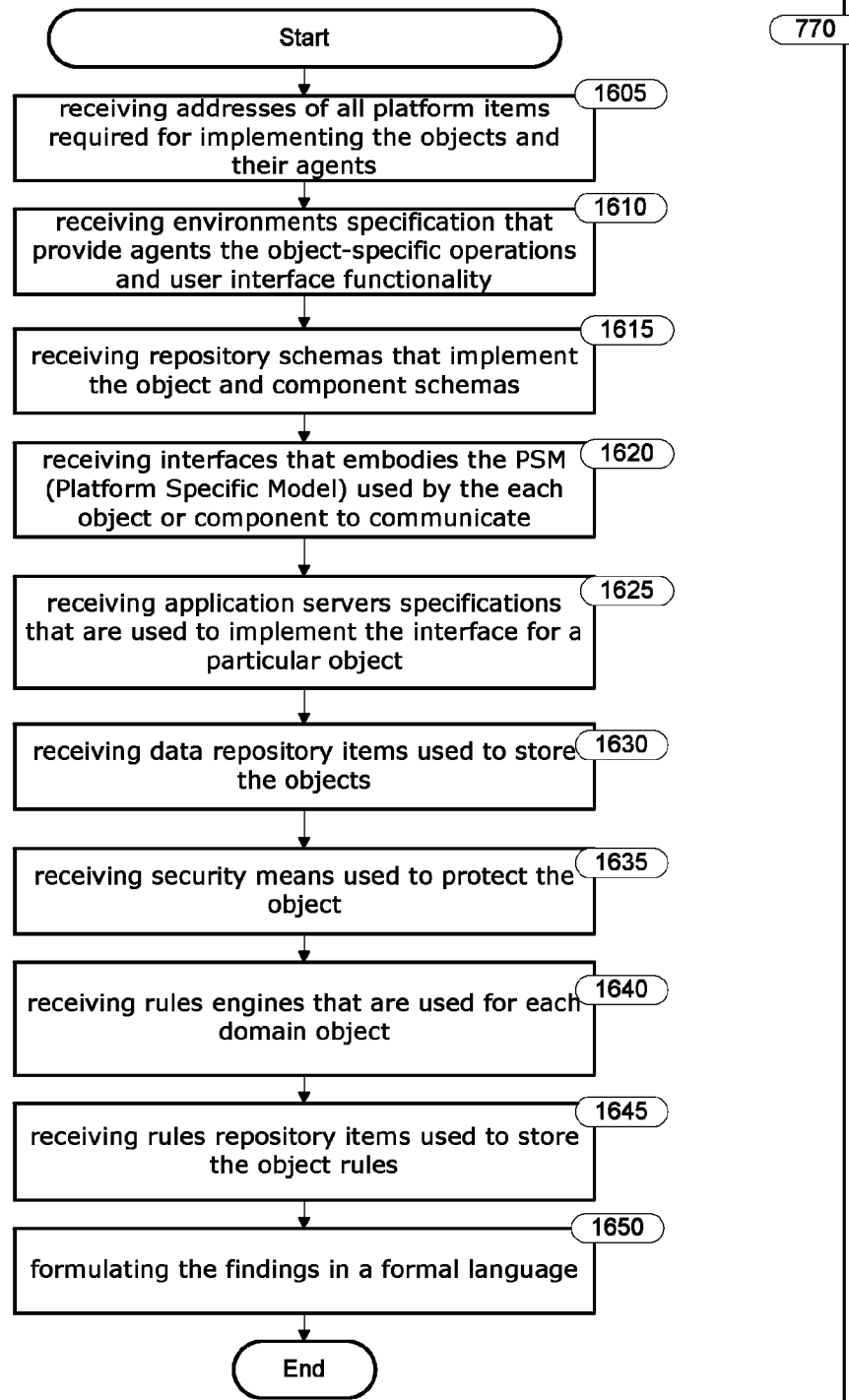
FIG. 16a shows part of the computer-implemented method for the deployment of domain recursive state machines for computing devices for State Transitions of Recursive State Machines ESTCA (Event, State, Transition, Condition and Action) responsible for Building the deployment foundation ontology data for use in select first object ontology data and rules model data in accordance with an embodiment of the present invention.
Figure 16B:
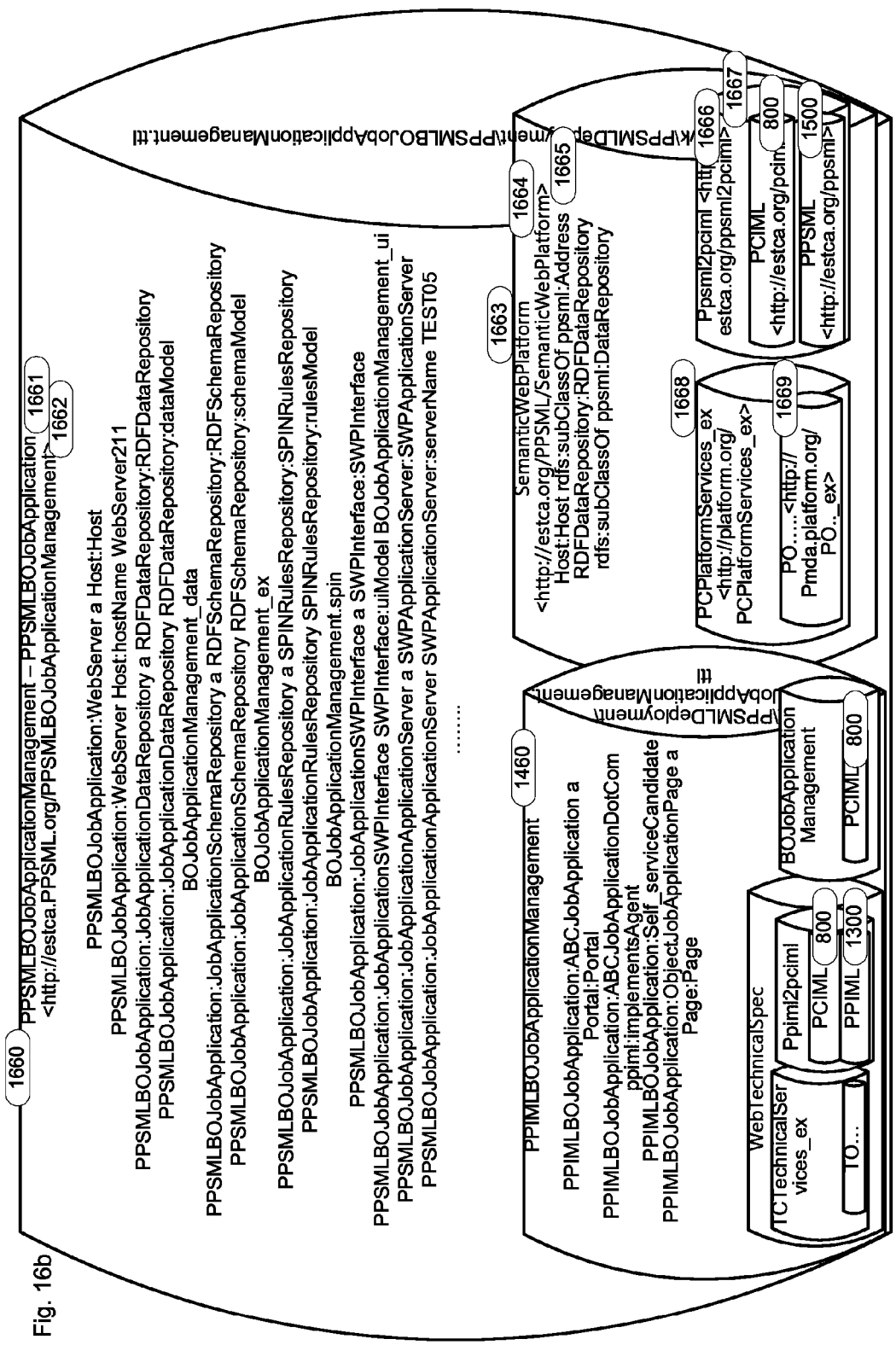
FIG. 16b shows the Job Application Object PPSML Deployment Model example graphically in accordance with an embodiment of the present invention.

Refer to FIG. 16*b* for the PPSMLBOJobApplicationManagement model diagram.

The Platform Specification ontology model imports then two models that form the SemanticWebPlatform PPIML link:
 i. The PPSML2PCIML Ontology 1666—<http://estca.org/ppsml2pciml> 1667 composed of:
  a) PCIML Ontology 800—<http://estca.org/pciml>
  b) PPSML Ontology 1500—<http://estca.org/ppsml>
 ii. The PCPlatformServices_ex Schema Graph Model 1668—<http://platform.org/PCPlatformServices_ex> composed of all Platform Schema Graph for its Platform Object PCIML Components PO . . . <http://estca.platform.org/PO . . . _ex> 1669

So when defining the Job Application PPSML Deployment Model used below for the description of the step capturing in a platform-specific manner the first and second object and component deployment foundation ontology data for use in selecting a first and second object schema data and a first and second object rules model data in accordance with the first and second object data 770, it will import the Semantic Web Specification as Platform Specification, so the PPSML Deployment Model will import the Ontology defined above connecting the PPSML Constructs described below to the instantiated platform schema model classes, like in the RDF triples example below.

Host:Host rdfs:subClassOf ppsml:Address
RDFDataRepository:RDFDataRepository rdfs:subClassOf ppsml:DataRepository The Parametric Platform Specific Model Language (PPSML)

Another embodiment delivers the Parametric Platform Specific Model Language (PPSML) 1500 class relationship diagram represented graphically in FIG. 15*a* which defines the view of a system from the platform specific viewpoint.

The PPSML 1500 extends the specifications defined in the PPIML 1300 with the details required to specify how that system uses a particular type of platform (OMG, 2003). In other words: the PPSML 1500 is a more detailed version of the PPIML 1300.

PPSML is a domain deployment language that captures domain deployment foundation ontology data from a PSM view point connecting business PPIML models to platform schema models generated from platform PCIML models building a bridge between definition, design and deployment creating the Business and Platform Interoperability.

PPSML 1500 is an incomplete meta-model that defines 9 main constructs mainly used as bridge between Business PCIML models designed using Business PPIML models and the platform domain components that are specific for a platform requirement defined as Platform PCIML models that could be specific to Data Base, Host Servers, Applications, Middleware, RDF Stores, Data Schemas, etc.

The final PPSML 1500 will be customised for each need, based on the specific platform required to deliver a domain. The customization is done by creating a Platform PCIML 800 domain that would describe a particular platform specification domain that in this example is the Semantic Web Platform. After the platform specification is instantiated providing the platform abstractions required by deploying such platform that is attached to PPSML 1500 in order to deploy the PPIML 1300 Design defined.

The final PPSML is then responsible in defining the chosen platform to deploy such a design provide by PPIML and defined by PCIML to the external World. At the same time PCIML defines the domain, the PPIML designs the way the external world can picture the same Domain, the PPSML define the physical components that enable the design.

As an example, a design that enable Web Components can be implemented using Java or JSP or PHP or SWP. The same design enable the Data to be stored in Relational DB that can be implemented using Oracle, SQL Server or Sybase or triple stores like Oracle, Jena or only RDF models.

There are also two link ontologies, one PCIML-PPSML link ontology that is composed only by the Property Range definitions linking the properties of PPSML ontology to classes of PCIML ontology and other PPIML-PPSML link ontology that is composed only by the Property Range definitions linking the properties of PPSML ontology to classes of PPIML ontology. These link ontologies create a neural connection between PCIML 800, PPIML 1300 and PPSML 1500. The Graphical representation of the PPSML and PCIML Link is represented graphically in FIG. 15*b*

An example is by linking a pciml:Thing to a Data Repository or linking a pciml:Thing to a Rules Repository or a pciml:Operation to an Application Server item.

The meta-model is an example of a layer 2 MOF (Meta Object Facility) model: the model that describes PPSML ontology itself. These M2-models describe elements of the M1-layer, and thus M1-models. These would be, for example, models written using the PPSML ontology. The last layer is the M0-layer or data layer. It is used to describe real-world objects and in this case is composed of the particular platform domain schema model generated from the M1-layer and Platform data-instances models.

The ontology is built using the web ontology language (OWL) and SPARQL Inference Notation (SPIN).

On FIG. 16*a*, the capturing in a platform-specific manner the first and second object and component deployment foundation ontology data for use in selecting a first and second object schema data and a first and second object rules model data in accordance with the first and second object data 770 step is subdivided in sub-steps used to capture the Object or Component or Universe PPSML Definition models of interest. The sub-steps are used to define the Deployment of a Business PCIML Model defined before.

By performing the sub-steps on FIG. 16*a*, The PPSML Deployment ontology for any domain, it is going to enable the deployment of any Business Object that can be person, company, location, party, invoice, sales order, product, job application, schedule, accounts, service, purchase order, manufacture using Platform Objects like RDF Stores, Application Server, Host, SPARQL Rules Engine, etc grouped in a Platform Specification used to describe the Semantic Web Platform components used to implement the portal application that in this example is hosted in the web service 210 and ESTCA Web Service 240.

In order to illustrate the steps some examples are defined using the Job Application Business Object PPSML Model 1660 that is used in the GUI 600, 630 and 660 on FIG. 6 implemented using the Semantic Web Specification 1463 Platform specification that describes the platform components used to store Web page templates 213.

In the example, the server that runs the portal application that in this example is hosted in the web service 210, the ESTCA computing device for state transitions of recursive state machines server is hosted in the ESTCA web server 240, and all the other required domain models such as: the domain specific source models, including A Schema Graphs 270, A Rules Models 272, B Schema Graphs 271, B Rules Models 273, A and B Data Instance Graphs 261 are going to be defined inside the Application PPSML Deployment Models 290.

Address

The first step is about receiving addresses of all platform items required for implementing the objects and their agents 1605 using the PPSML Construct Address 1503 (ppsml:Address) which groups the Platform PCIML instantiated schema models that deploy Address type of platform domains for the platform specification such as POHostManagement.

For the Job Application PPSML Deployment Model 1660 definition of PPSML Construct Address refer to FIG. 16*b* for some examples using RDF triples:

PPSMLBOJobApplication:WebServer a Host:Host
PPSMLBOJobApplication:WebServer Host:hostName WebServer211
PPSMLBOJobApplication:ESTCAWebServer a Host:Host
PPSMLBOJobApplication:ESTCAWebServer Host:hostName WebServer240

Address has instantiate (ppsml:instantiate), specify address for communication with agent (ppsml:specifyAddressForCommunicationWithAgent) and specify address for communication (ppsml:specifyAddressForCommunication) properties. Each instantiated platform PCIML model class that is subclass of address is going to have the address properties as part of their domains.

The property instantiate (ppsml:instantiate) defines an environment (ppsml:Environment) that is instantiated on that respective address.

The property specify address for communication with agent (ppsml:specifyAddressForCommunicationWithAgent) defines a relationship with the PCIML construct Agent (pciml:Agent) and specify address for communication (ppsml:specifyAddressForCommunication) defines a relationship with the PPIML construct Communication (ppiml:Communication) in order to create the link between Deployment, Design and Definition.

Environment

The next step is responsible for receiving environments specification that provide agents the object-specific operations and user interface functionality 1610 using the PPSML Construct Environment 1502 (ppsml:Environment) which groups the Platform PCIML instantiated schema models that deploy Environment type of platform domains for the platform specification such as POApplicationManagement.

For the Job Application PPSML Deployment Model 1660 definition of PPSML Construct Environment refer to FIG. 16*b* for some examples using RDF triples:

PPSMLBOJobApplication:ABCjobapplicationdotcom a Application:Application
PPSMLBOJobApplication:ABCjobapplicationdotcom Application:portalName www.ABCjobapplication.com
PPSMLBOJobApplication:ABCHumanResourcesManagementdotcom a Application:Application
PPSMLBOJobApplication:ABCHumanResourcesManagementdotcom Application:portalName www.ABCHumanResourcesManagement.com Environment has deploy capacity of main operation (ppsml:deployCapacityOfMainOperation) and deploy capacity of service (ppsml:deployCapacityOfService) properties. Each instantiated platform PCIML model class that is subclass of ppsml:Environment is going to have the Environment properties as part of their domains.

The property deploy capacity of main operation (ppsml:deployCapacityOfMainOperation) defines a relationship with the PCIML construct Operation (pciml:Operation) and deploy capacity of service (ppsml:deployCapacityOfService) defines a relationship with the PPIML construct Service (ppiml:Service) in order to create the link between Deployment, Design and Definition.

Repository Schema

The next step is about receiving repository schemas that implement the object and component schemas 1615 using the PPSML Construct Repository Schema 1501 (ppsml:RepositorySchema) which groups the Platform PCIML instantiated schema models that deploy Repository Schema type of platform domains for the platform specification such as PORDFSchemaRepositoryManagement.

For the Job Application PPSML Deployment Model 1660 definition of PPSML Construct Repository Schema refer to FIG. 16b for some examples using RDF triples:
PPSMLBOJobApplication:JobApplicationSchemaRepository a
RDFSchemaRepository:RDFSchemaRepository
PPSMLBOJobApplication:JobApplicationSchemaRepository
RDFSchemaRepository:schemaModel BOJobApplicationManagement_ex
PPSMLBOJobApplication:JobApplicationSchemaRepository
RDFSchemaRepository:fileName Fwk\ExecutableModels\BOJobApplicationManagement_ex.ttl Repository Schema has deploy schema of main thing (ppsml:deploySchemaOfMainThing) and deploy schema of element (ppsml:deploySchemaOfElement) properties. Each instantiated platform PCIML model class that is subclass of ppsml:RepositorySchema is going to have the repository schema property as part of their domains.

The property deploy schema of main thing (ppsml:deploySchemaOfMainThing) defines a relationship with the PCIML construct Thing (pciml:Thing) and deploy schema of element (ppsml:deploySchemaOfElement) defines a relationship with the PCIML construct Thing (ppiml:Element) in order to create the link between Deployment, Design and Definition.

The next three constructs of PPSML are responsible for describing the location of Platform behaviour components.

Interface

The next step is about receiving interfaces that embodies the PSM (Platform Specific Model) used by the each object or component to communicate 1620 using the PPSML Construct Interface 1505 (ppsml:Interface) which groups the Platform PCIML instantiated schema models that deploy Interface type of platform domains for the platform specification such as PODomainSpecificInterfaceManagement.

For the Job Application PPSML Deployment Model 1660 definition of PPSML Construct Interface refer to FIG. 16b for some examples using RDF triples:
PPSMLBOJobApplication:JobApplicationSWPInterface a
SWPInterface:SWPInterface
PPSMLBOJobApplication:JobApplicationSWPInterface
SWPInterface:uiModel BOJobApplicationManagement_ui
PPSMLBOJobApplication:JobApplicationSWPInterface
SWPInterface:fileName Fwk\PSM\BOJobApplicationManagement_ui.ttl Interface has deploy interface of main operation (ppsml:deployInterfaceOfMainOperation) and deploy interface of service (ppsml:deployInterfaceOfService) properties. Each instantiated platform PCIML model class that is subclass of ppsml:Interface is going to have the Interface properties as part of their domains.

The property deploy interface of main operation (ppsml:deployInterfaceOfMainOperation) defines a relationship with the PCIML construct Operation (pciml:Operation) and deploy interface of service (ppsml:deployInterfaceOfService) defines a relationship with the PPIML construct Service (ppiml:Service) in order to create the link between Deployment, Design and Definition.

Application Server

The next step is about receiving application servers specifications that are used to implement the interface for a particular object 1625 using the PPSML Construct Application Server 1504 (ppsml:ApplicationServer) which groups the Platform PCIML instantiated schema models that deploy Server type of platform domains for the platform specification such as POSWPApplicationServerManagement.

For the Job Application PPSML Deployment Model 1660 definition of PPSML Construct Application Server refer to FIG. 16b for some examples using RDF triples:
PPSMLBOJobApplication:JobApplicationApplicationServer a
SWPApplicationServer:SWPApplicationServer
PPSMLBOJobApplication:JobApplicationApplicationServer
SWPApplicationServer:serverName WebServer211

Application Server has deploy Application Service Supporting the capacity of main operation (ppsml:deployASSupportingTheCapacityOfMainOperation) and deploy Application Service Supporting the capacity of Service (ppsml:deployASSupportingTheCapacityOfService) properties. Each instantiated platform PCIML model class that is subclass of ppsml:ApplicationServer is going to have the Application Server properties as part of their domains.

The property deploy Application Service Supporting the capacity of main operation (ppsml:deployASSupportingTheCapacityOfMainOperation) defines a relationship with the PCIML construct Operation (pciml:Operation) and deploy Application Service Supporting the capacity of Service (ppsml:deployASSupportingTheCapacityOfService) defines a relationship with the PPIML construct Service (ppiml:Service) in order to create the link between Deployment, Design and Definition.

Data Repository

The next step is about receiving data repository items used to store the objects 1630 using the PPSML Construct Data Repository 1506 (ppsml:DataRepository) which groups the Platform PCIML instantiated schema models that deploy Data Repository type of platform domains for the platform specification such as PORDFDataRepositoryManagement.

For the Job Application PPSML Deployment Model 1660 definition of PPSML Construct Data Repository refer to FIG. 16b for some examples using RDF triples:

PPSMLBOJobApplication:JobApplicationDataRepository a RDFDataRepository:RDFDataRepository
PPSMLBOJobApplication:JobApplicationDataRepository RDFDataRepository:dataModel BOJobApplicationManagement_data
PPSMLBOJobApplication:JobApplicationDataRepository RDFDataRepository:fileName Fwk\DataModels\BOJobApplicationManagement_data.ttl Data Repository has deploy instances of main thing (ppsml:deployInstancesOfMainThing) and deploy instances of element (ppsml:deployInstancesOfElement) properties. Each instantiated platform PCIML model class that is subclass of ppsml:DataRepository is going to have the Data Repository properties as part of their domains.

The property deploy instances of main thing (ppsml:deployInstancesOfMainThing) defines a relationship with the PCIML construct Thing (pciml:Thing) and deploy instances of element (ppsml:deployInstancesOfElement) defines a relationship with the PCIML construct Thing (ppiml:Element) in order to create the link between Deployment, Design and Definition.

The last three constructs of PPSML are responsible for describing the location of Platform rules components.

Security

The next step is about receiving security means used to protect the object 1635 using the PPSML Construct Security 1509 (ppsml:Security) which groups the Platform PCIML instantiated schema models that deploy Security type of platform domains for the platform specification such as POLDAPServerManagement.

For the Job Application PPSML Deployment Model 1660 definition of PPSML Construct Security refer to FIG. 16b for some examples using RDF triples:

PPSMLBOJobApplication:EnterpriseLDAPServer a LDAPServer:LDAPServer
PPSMLBOJobApplication:EnterpriseLDAPServer LDAPServer:ServerName LDAPProd Security has deploy security around the main thing instances (ppsml:deploySecurityAroundTheMainThingInstances) and deploy security supporting the main operation (ppsml:deploySecuritySupportingTheMainOperation) and deploy security around the element instances (ppsml:deploySecurityAroundTheElementInstances) and deploy security supporting the Service (ppsml:deploySecuritySupportingTheService) Properties. Each instantiated platform PCIML model class that is subclass of ppsml:Security is going to have the Security properties as part of their domains.

The property deploy security around the main thing instances (ppsml:deploySecurityAroundTheMainThingInstances) defines a relationship with the PCIML construct Thing (ppiml:Element) and deploy security supporting the main operation (ppsml:deploySecuritySupportingTheMainOperation) defines a relationship with the PPIML construct Service (ppiml:Service) and deploy security around the element instances (ppsml:deploySecurityAroundTheElementInstances) defines a relationship with the PCIML construct Thing (ppiml:Element) and deploy security supporting the Service (ppsml:deploySecuritySupportingTheService) defines a relationship with the PPIML construct Service (ppiml:Service) in order to create the link between Deployment, Design and Definition.

Rules Engine

The next step is about receiving rules engines that are used for each domain object 1640 using the PPSML Construct Rules Engine 1508 (ppsml:RulesEngine) which groups the Platform PCIML instantiated schema models that deploy Rules Engine type of platform domains for the platform specification such as POSPARQLMotionTransitionEngineManagement.

For the Job Application PPSML Deployment Model 1660 definition of PPSML Construct Rules Engine refer to FIG. 16b for some examples using RDF triples:

PPSMLBOJobApplication:JobApplicationRulesEngine a SPINRulesEngine:SPINRulesEngine
PPSMLBOJobApplication:JobApplicationRulesEngine SPINRulesRepository:rulesEngine ESTCAWebServer Rules Engine has deploy Rules Engine Supporting the main operation (ppsml:deployRESupportingTheMainOperation) and deploy Rules Engine Supporting the service (ppsml:deployRESupportingTheService) properties. Each instantiated platform PCIML model class that is subclass of ppsml:RulesEngine is going to have the Rules Engine properties as part of their domains.

The deploy Rules Engine Supporting the main operation (ppsml:deployRESupportingTheMainOperation) defines a relationship with the PCIML construct Operation (pciml:Operation) and deploy Rules Engine Supporting the service (ppsml:deployRESupportingTheService) defines a relationship with the PPIML construct Service (ppiml:Service) in order to create the link between Deployment, Design and Definition.

Rules Repository

The next step is about receiving rules repository items used to store the object rules 1645 using the PPSML Construct Rules Repository 1507 (ppsml:RulesRepository) which groups the Platform PCIML instantiated schema models that deploy Rules Repository type of platform domains for the platform specification such as POSPINRulesRepositoryManagement.

For the Job Application PPSML Deployment Model 1660 definition of PPSML Construct Rules Repository refer to FIG. 16b for some examples using RDF triples:

PPSMLBOJobApplication:JobApplicationRulesRepository a SPINRulesRepository:SPINRulesRepository
PPSMLBOJobApplication:JobApplicationRulesRepository SPINRulesRepository:rulesModel BOJobApplicationManagement.spin
PPSMLBOJobApplication:JobApplicationRulesRepository SPINRulesRepository:fileName Fwk\RulesModels\BOJobApplicationManagement.spin.ttl Rules Repository has deploy rules of main thing (ppsml:deployRulesOfMainThing) and deploy rules of element (ppsml:deployRulesOfElement) properties. Each instantiated platform PCIML model class that is subclass of ppsml:RulesRepository is going to have the Rules Repository properties as part of their domains.

The property deploy rules of main thing (ppsml:deployRulesOfMainThing) defines a relationship with the PCIML construct Thing (pciml:Thing) and deploy rules of element (ppsml:deployRulesOfElement) defines a relationship with the PCIML construct Thing (ppiml:Element) in order to create the link between Deployment, Design and Definition.

At the end of the PPSML deployment, the Objects Job Application and Person and the Component Recruitment Management have their deployment components defined.

PPSML is then responsible for formulating the findings in a formal language 1650, defining the objects deployment platform components that can implement ESTCA.

PPSML is deployed in 1 ontology file that is ppsml.owl—Base URI: <http://estca.org/ppsml> 1500 and also one spin file that is ppsml.spin.ttl—Base URI: <http://estca.org/ppsml.spin>.

PPSML also delivers a model that is built to link the Deployment PPSML and Design PPIML and Definition PCIML that are ppsml2pciml.owl 1465—Base URI: <http://estca.org/ppsml2pciml> 1466 and ppsml2ppiml.owl 1465—Base URI: <http://estca.org/ppsml2ppiml> 1466

The embodiment also provides the Platform Specialists or Infrastructure Specialist with the frame-based Deployment View. This view enables the editing of the Domain Deployment PPSML Models.

The frame-based Deployment view is currently developed using Top Braid Ensemble delivered by Top Quadrant the same way the frame-based definition (FIG. 10c) and frame-based design views are built. Like the definition view the header of the Application displays name of the model been edited is displayed. e.g. PPSMLBOJobApplicationManagement with PPSML in front to highlight that the edited model is a PPSML Model The header also display the hyperlink to navigate to the other views provided by the embodiment in order to support the Deployment. The different views are used for Hierarchy and Relationship Visualization provided in the same environment as different Tabs. These views are provided in order for the Platform Specialists or Infrastructure Specialist be capable to analyse the definitions from a deployment perspective.

Below the header, on the left side of the frame-based Deployment View there is the PCIML menu tree formed by three nodes representing the PCIML Columns constructs provide by PCIML in order to access the Domain Logic Definitions for reference.

Right below the PCIML Menu tree, there is the PPIML menu tree formed by nodes representing the PPIML Columns constructs provide by PPIML also for reference.

And for the end, there is the PPSML menu tree formed by nodes representing the PPSML respective constructs provide by PPSML.

In order to navigate between the different instances of each construct, the user only need to select one of the constructs desired like in the frame-based Definition and Design view.

By selecting any PCIML, PPIML and PPSML construct, the right side of the view the grid will display the instances of the construct selected on the left side.

Creating the Application PPSML Deployment Model

Another embodiment is responsible for generating the Application PPSML Deployment Model 290 using the Business PPSML deployment models 1534.

After defining the Business PPSML deployment models 1534 the Application PPSML Deployment Model 290 connecting the Physical Platform Components and the technical designs that support a Particular Domain is created.

In this example the domain is accessed by applications hosted in 210 that is composed of many models for all objects constituents of the domain, the Application PPSML Deployment Model 290 is used to map the object A (First Object) and subject B (Second Object) involved in a transition with:

the right permission for the transition execution;
the right Schema Graph Model and its location;
the right Rule Model and its location;
the right Data Instance Model and its location;

the platform independent SPOP, services, outputs and actions that are executed and triggered as a response;
the platform specific Addresses of Computing devices that interact with the domain such as: Application Server, Services, Interfaces, etc. (e.g Web server 210 for Agent and Webserver 240 for ESTCA Engine)

When the definition, design and deployment of the Recruitment Management Domain recursive state machine is completed. The executable models in the form of Domain Specific Models 295 are calculated via transformations and its behaviour can be automated by the ESTCA Engine which is used to implement the GUI 600, 630 and 660 that is the Recruitment Management domain where the object A is the Job Application and Object B the Person class. The models are also defining the Recruitment Management domain's integration with applications such as the two examples provided based in a particular technology www.ABCjobapplication.com 605 and www.ABCHumanResourcesManagement.com 661 running in the web server 210.

The Parametric Model Driven Framework (PMDA) Framework—Deployed Using the Computer-Implemented Method for the Definition, Design and Deployment of Domain Recursive State Machines Orchestrated Using the Computing Device for State Transition of Recursive State Machines (ESTCA).

In order to prove the efficiency of the computer-implemented method for the Definition, Design and Deployment of domain recursive state machines and the orchestration capability of the computing device for state transition of recursive state machines (ESTCA), and also extending the embodiment with Enterprise Architecture requirements the PMDA Framework is defined, designed, developed, deployed and orchestrated using recursive state machines defined using the Subject Predicate Object Protocol SPOP.

When executing the computer-implemented method for the Definition, Design and Deployment of domain recursive state machines 700, the Subject Predicate Object Protocol SPOP is captured during the domain definition using the PCIML construct Filter 806 (pciml:Filter) to capture and relate the objects 1010 finite state machines recursively to form components 1020 and universes 1030 behaviour which is then implemented by the PPIML Construct SPOP 1306 (ppiml:SPOP) which is then deployed using the PPSML Construct Rules Engine 1508 (ppsml:RulesEngine) which accesses the schema data, rules model data, data instances data and platform Specific Template Instances of objects configured using the PPSML Construct Repository Schema 1501 (ppsml:RepositorySchema) and the PPSML Construct Rules Repository 1507 (ppsml:RulesRepository) and the PPSML Construct Data Repository 1506 (ppsml:DataRepository) and the PPSML Construct Interface 1505 (ppsml:Interface) respectively. The Subject Predicate Object Protocol SPOP becomes then the protocol of communication via events received and sent by the computing device for state transition of recursive state machines (ESTCA) 300.

Since the Framework proposes an Architecture formed by a finite number of Models based on MDA 1723 (CIM 800, PIM 1300 and PSM 1500) abstraction views, the Framework is called Parametric Model Driven Architecture (PMDA) Framework and the models are called PMDA Models.

Didactically, the embodiment was described using the example of a Business Domain which defines, designs and deploys the Recruitment Management Models which is composed by the Person and Job Application Management. In reality the Framework Domain Models were captured earlier in order to provide the proper Enterprise Architecture tool for capturing the Definition, Design and Deployment of business type domain recursive state machines.

Figure 17A:
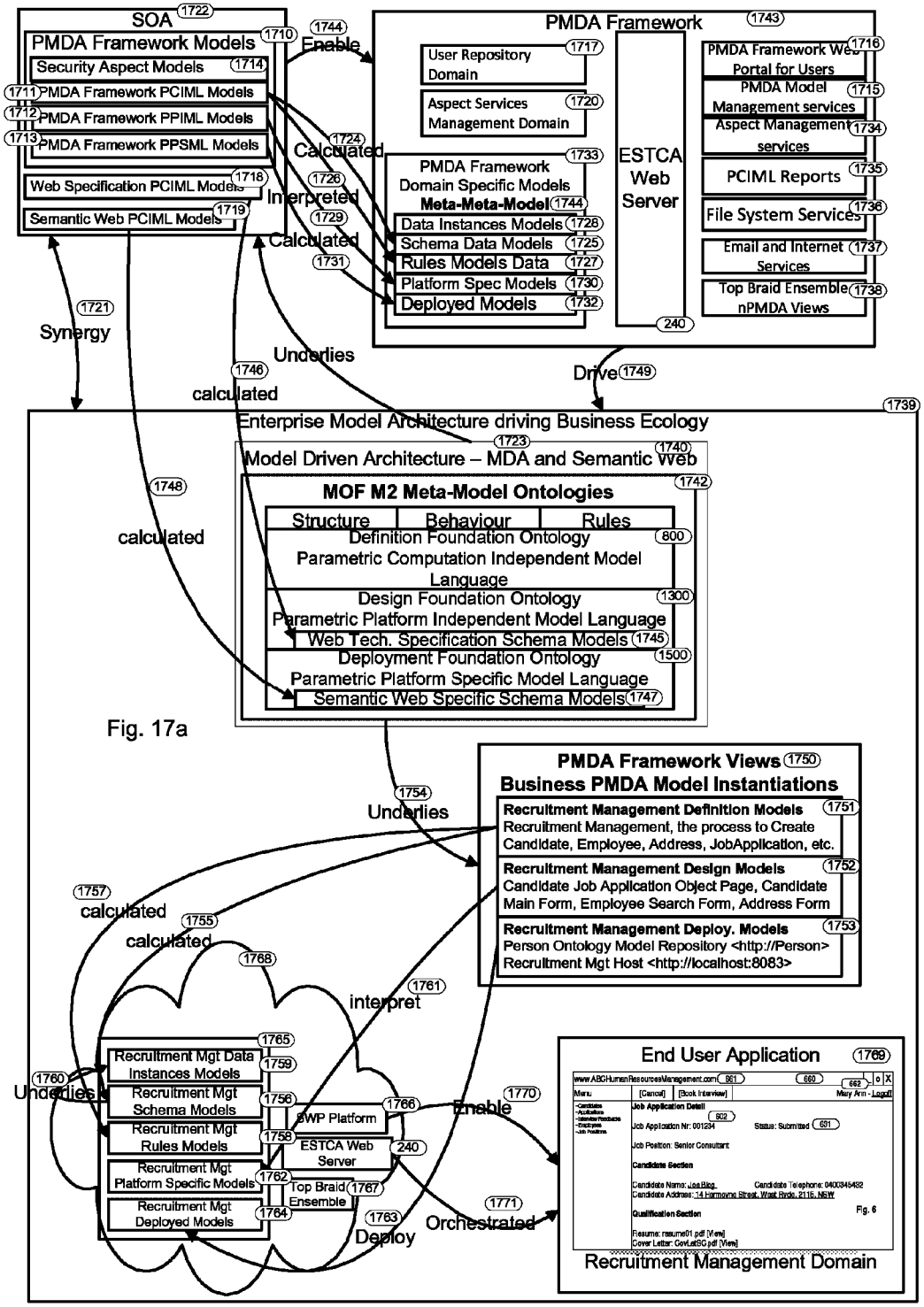
FIG. 17a shows the Parametric Model Driven Architecture Framework implementation in accordance with an embodiment of the present invention.

Based on the fact that the PMDA framework is build using the meta-model foundation ontologies and the fact that the Framework is designed to deliver a model architecture, the following domains (Component and Object) are defined (using PCIML), designed (using PPIML) and deployed (using PPSML) to enable the PMDA framework. All these models are the PMDA Framework Models 1710 and they are:

FUPMDAFrameworUniverse
FCPMDAFrameworkManagement
    FOModelManagement
    FOTechnicalSpecificationManagement
    FOPlatformSpecificationManagement
    FOCapabilityManagement
    FOImplementedServiceManagement
    FODeplyedServiceManagement
    FOConstructsManagement The FIG. 17a shows the PMDA Framework implemented using the embodiment.

The PMDA Framework Models 1710 have a particular prefix FU which stands for Framework Universe PCIML Model (Universe definition foundation ontology data), FC for Framework Component PCIML Model (Component definition foundation ontology data) and FO for Framework Object PCIML Model (Object definition foundation ontology data).

The FOModelManagement Framework Object PCIML Model defines the structure, behaviour and rules around Models in order to enable a Parametric Model Driven Architecture Framework to manage the definition, design and deployment of Models.

The same as the Recruitment Management Domain needs a Person and Job Application; the PMDA Framework domain needs an infrastructure to manage Models and their lifecycle to deliver Enterprise Applications. These models are the model types required to deliver an Executable Enterprise Architecture. This Framework PCIML Definition Model describes then the Models types that are required in order to provide the required Model Architecture Framework. This 9 Framework models types are called PMDA Models, and are:

1. PCIML Model (Definition foundation ontology data)
2. PPIML Model (Design foundation ontology data)
3. PPSML Model (Deployment foundation ontology data)
4. PCIML Schema Ontology Model (Schema Data 270 and 271)
5. Data Instance Model (Data Instance 260 and 261)
6. PCIML Rules Model (Rules Model Data 272 and 273)
7. PCIML Mark Model (Templates and functionality defined using Platform Specific functionality which are not behaviour related)
8. Platform-Specific Model (Domain Platform-Specific Template Instances 250 interpreted from PPIML)
9. Deployed Model (Application PPSML Deployment Model 290 calculated from PPSML)

These 9 Framework models types, are then subdivided in hierarchical model types which define the model scope (Universe 1030, Component 1020 and Object 1010) and also in domain types (Business, Aspect, Framework, Technical and Platform) which are defined in the FOModelManagement Framework Object PCIML Model as things (pciml:Thing) 810 which are connected using the property pciml:subClassOf 813 to form the proper model structure. There are a total of 75 models types defined as things that represent all model types that support the Framework.

Using the PCIML Model as an example, for each different Domain type, there are different model types, like:
Business PCIML Model
Aspect PCIML Model
Framework PCIML Model
Technical PCIML Model
Platform PCIML Model The PCIML domain models are then subdivided based on different scopes, like in the example for Framework models below:
Framework Universe PCIML Model
Framework Domain PCIML Model
Framework Object PCIML Model The Framework defines the evolution of any domain model by its relationship with other models.

It is important to remember that any instance of these model types are about defining, designing or deploying Business, Aspects and Framework models using technical specifications defined by Technical Domain models and platform specifications defined by platform Domain models forming the Enterprise domain formed by a hierarchy of Universe, Component and Object Models.

As an example, there is a Person Management Object PCIML Model 1146 that defines the Person Management Object captured using the PCIML 800 or in a computation-independent manner the definition foundation ontology data; and a Job Application Management Object PPIML Model which defines the Job Application Management Object captured using the PPIML or in a platform-independent manner the design foundation ontology data.

The FOModelManagement Object PCIML Model defines the entire definition of the Model Object using PCIML 800. As an example the properties the models have are defined using the PCIML Construct pciml:Property 811, the relationships that connect the model types to other model types by defining the pciml:Filter 806 Subject predicate Object patterns, and also the rules that manage these relationships based on their state which are defined as conditions (pciml:Condition 808), etc.

Since the Framework models define the evolution from Definition to Design and Deployment, this means that the relationship between a PCIML Definition Model to a PPIML Design Model already define the stage of the evolution of the Domain from Definition to Design.

For example: if the Recruitment Management Component PCIML Model 1145 has the relationship "has PPIML Design Model" with the Recruitment Management PPIML Design Model, one can infer the Recruitment Management has its design already started.

The Models Types are related to other Model Types and/or to any other object class defined in any of the PCIML Framework Universe constituent models such as Capability, Technical Specification 1332, Platform Specification 1532, Implemented Services or Deployed Services via the pciml:Filter 806 predicate inside the PMDA Framework Component or any other new object class that is included as part for the PCPMDAFrameworkManagement. This means that the relationships between models provided by PMDA can be extended by the addition of new PCIML Framework object models, like the Recruitment Management Component could be extended with other functionality such as Job Offer, Interview Forms, etc.

The relationships currently delivered by PMDA Framework are defined below as Subject Predicate Object Relationships using pciml:Filter PCIML Schema Ontology Instantiated from PCIML Model PCIML Rules Model Ontology generated from PCIML Model Data Instances Ontology holds Data Instances Of PCIML Model PCIML Model has PPIML Design Model PPIML Model PPIML Model is Based on Technical Specification Technical Specification is Composed By Technical Domain PCIML Model Platform-Specific Model interpreted from PPIML Model PPIML Model has PPSML Deployment Model PPSML Model PPSML Model is Based on Platform Specification Platform Specification is Composed By Platform PCIML Model Deployed Model deployed from PPSML Model Core Capability deploy Universe or Component PCIML Model Implemented Services implement Core Capability Implemented Services is implemented using Technical Specification Deployed Services deploy Implemented Services Deployed Services are deployed using Platform Specification Based on the fact that all functionality provided by the PMDA Framework is enabled by the defined PMDA Framework models 1710, all models from Definition (PMDA Framework PCIML models 1711) to Design (PMDA Framework PPIML models 1712) and Deployment (PMDA Framework PPSML models 1713) are defined for all Object and Component models that are part of the PMDA Framework Models 1710.

By making the PMDA Framework Models 1710 available, PMDA allows the customisation of the framework also, enabling the deployment of new functionality required. The potential of configuration and extension of the framework is unlimited, and the ability to create the extensions is also enabled by the embodiment.

The PMDA Framework also requires Aspect models for Security management, Authentication Management, etc which form the Security Aspects Models 1714 which are also part of the PMDA Framework Models 1710:

ACAspectServices
AOUserAuthenticationService
AOSessionManagement
AOSecurityManagement
AOUserManagement The Aspect Models have a particular prefix AU which stands for Aspect Universe PCIML Model (Universe definition foundation ontology data), AC for Aspect Component PCIML Model (Component definition foundation ontology data) and AO for Aspect Object PCIML Model (Object definition foundation ontology data).

Based on the fact that all framework is authenticated and enabled by the defined Aspect Domains, all models from Definition (PCIML) to Design (PPIML) and Deployment (PPSML) are defined for all Object and Component models that are part of the Security Aspects Models 1714.

By making the Security Aspect Models 1714 available, PMDA allows the customisation of the aspects also, enabling the deployment of new functionality required.

PMDA is also supported by a series of Services implemented using SPARQL Motion Scripts (Agent Computing Devices), which execute specific functionality required by a model driven architecture that are used for Instantiation, Simulation, Transformation, loading of identified patterns of data, Interpretation and file management. These Services are provided as REST Web services by the PMDA Model Management Services 1715 which is implemented using devices such as the Web Services 210 and are defined as external agents which provides model development architecture specific functionality. This services are not smart, and they depend on ESTCA for orchestrations. The Framework Services are:

1. Creation of a physical PCIML Model
2. Insert of a model inside another model
3. Removal of a model inside another model
4. Load a model as a template, used for cloning model definitions
5. Calculation of a schema data and Rules Model Data Ontology based on a PCIML Model stored in physical models.
6. Creation of the Data Instances physical Model that imports the schema data and rules model data ontology
7. Inference simulation based on Operation, States or transitions of the Finite State Machine Behaviour
8. Inference for creation of a Report with the full definition of the domain
9. Creation of the physical PPIML link model to a Technical Specification
10. Creation of a physical PPIML Model from a PCIML Model and a Technical Specification
11. Load of the PPIML model following Identified Patterns of PCIML to PPIML transformation
12. calculation of a physical platform specific template instances model.
13. Creation of the physical PPSML link model to a Platform Specification
14. Creation of a physical PPSML Model from a PPIML Model and a Platform Specification
15. Load of the PPSML model following Identified Patterns of Framework Model Library to PPSML Platform Description.
16. Calculation of the physical Deployed Model (Application PPSML Deployment Model) platform specification based on the PPSML Model.

Supported by the scripts, PMDA would use the Synergy 1721 between Service Oriented Architecture 1722 decoupling Framework dynamics (PMDA Framework Models 1710) from Technology dynamics (Web Specification PCIML Models 1718 and Semantic Web PCIML Models 1719) and MDA 1723, to transform the definitions captured for the PMDA Framework Definition 1711, Design 1712 and Deployment 1713.

The same the Synergy 1721 enable 1744 the creation of an Architecture Framework such Parametric Model Driven Architecture (PMDA) Framework 1743 delivered in the form of meta-meta-model 1744. The reason PMDA Framework 1743 is meta-meta-model is because it manages an architecture of models that are themselves meta-models.

Using the Script number 4 with the PMDA Framework PCIML Definition Models 1710 as parameter the Framework will calculate 1724 the PMDA Framework Schema Data Ontology 1725 and also calculate 1726 the PMDA Framework Rules Model Data 1727

Using the Script number 5 using the PMDA Framework PCIML Models 1711 the Framework will create a PMDA Framework Data instance models 1728 that imports the PMDA Framework Schema Data models 1725

Using the Script number 12 using the PMDA Framework PPIML Design Models 1712 the Framework will interpret 1729 in PMDA Framework Platform Specific Models 1730

Using the Script number 16 using the PMDA Framework PPSML Model 1713 the Framework will calculate 1731 a PMDA Framework Deployed model 1732

The PMDA Framework Domain Specific Models 1733 can be deployed as an Appliance which can be implemented using Web server 210.

With the PMDA Framework Models 1710, the Security Aspects Models 1714 and the PMDA Model Management Services 1715 functionality implemented, the PMDA Framework still needs a mechanism that allows the communication of the Services available in the External World to and from the Internal Domain Services.

Taking the PMDA Framework as an example, the Framework Domain Models needs to communicate to some agents in order to perform specific Framework Model Services.

The PMDA Framework Design Models are designed using the Technical Specifications 1332 called WebTechnicalSpec 1463 defined by Web Specification PCIML Technical Models 1718 used for Web, which is also used to design the Recruitment Management Domain. The PMDA Framework Deployment Models are deployed using the Platform Specification 1532 called SemanticWebPlatform 1663 used for Semantic Web which is also used to deploy the Recruitment Management Domain. The WebTechnicalSpec 1463 Technical Specification and the SemanticWebPlatform 1663 Platform Specification defined by the Semanctic Web PCIML Platform Models 1719 describe the SWP Platform which is a Web Application implemented and deployed using the Semantic Web. The SWP Platform sits between the PMDA Framework and the Agents that interact with the Framework.

The Web Specification PCIML Models 1718 are models which describe the web technical Specification Domain from PCIML perspective, used to represents the Web Interface design pattern.

The Semantic Web Platform PCIML Models 1739—are models which describe the Semantic web Platform Specification Domain from PCIML perspective, used to define the platform component types required by the Semantic Web Platform.

With the functionality required by the Framework, and looking for a platform that could provide native connections to SPARQL Motion Scripts, SPARQL Queries, SPIN Templates, function and Magic Properties that could be easily connected using Rest Web Services.

SWP Platform is delivered using SPARQL Web Pages (SWP)

The SWP Platform is the application, that implements a method of communication with the external world via Pages, Menus, Messages, Buttons, Action Events, web services, xml exports, etc stored as Web Pages Templates 213. This templates are required by the PMDA Framework functionality and also to be able to enforce Aspects of Security like login pages, authentication, etc.

SPARQL Web Pages (SWP) is an RDF-based framework to describe user interfaces for rendering Semantic Web data. Dedicated properties such as ui:view are used to link RDFS/OWL resources with user interface descriptions. User interface components are described with the help of a declarative object model that may contain SPARQL queries to dynamically insert data-driven content. These object models can be defined either in terms of RDF structures, or with XML files similar to JSP and Flex documents. The resulting UI object model can then be rendered into various target platforms, in particular HTML and SVG.

Since SWP is provided by the Top Braid Live Platform, it has also access to Rest Web Services that is the PMDA method used to communicate with agents via messages.

The SWP Platform follows the SWP recommendations and deploys SWP elements that would implement each one of the TDTechnicalServices Domain that are the basis for the Web Technical Specification WebTechnicalSpec 1463 defined by Web Specification PCIML Technical Models 1718.

In other words, the SWP Platform implements the Communication methods that can be used to communicate Events between the Domain Services and the external World. The SWP Platform provides Web page Templates 213 which can be filled with Domain Platform Specific Templates 250

With the platform decided and with the focus in provide a portal to communicate with Users the following Components were build:

Create Session (Web Service Script that creates a Model as a session and imports all domain models that represents the user session);

Login Form (Page defined on the PPIMLAOAuthorizationServices that implements a page template that is a SWP Element;

Portal capability to provide the menu, pages, buttons, Radio Buttons, Check Boxes, etc. (There are a dozen of web page templates 213 which provide Pages, menu, buttons filed types, cascade sheets, etc developed using HTML 5 and JavaScript providing AJAX type of functionality; and Web Services to connect to the ESTCA Web Server 240 (There are many update SWP Elements that call rest web services and there are other SWP elements called back asynchronous from the ESTCA Web Server 240)

For example a component for creating AJAX Pages, another that implements and AJAX Tree, another implements an Update Action Service that will make calls to the ESTCA Web Server 240 and other implements Specific Domain Functions that will make calls to the Platform Agents via web services. This connects the following agent roles to the Technology agents define next:

The Business Modeller or Business Domain Expert
The Technical Designer or Technical Domain Expert
The Domain Designer or Technical Consultants
The Platform Specialists or Infrastructure Specialist
The Solution Modeller or Solution Architect
The Enterprise Modeller or Enterprise Architect
The Project Manager
The Framework Administrator The PMDA Framework is deployed using 9 main logically separated Technology Agents which need access to the Domain and also are accesses by the Domain. These Agents are:

1. PMDA Framework Web Portal for Users 1716—Implemented using the SWP Platform used to communicate with Business Modellers, Technical Specialists, Solution Modellers, etc via a Transition Engine.
2. PMDA Model Management Web services 1715—This agent provides manu services deployed by PMDA via Rest WebServices. This Agent represents the PMDA Specific Model Functionality. This functionality can be extended by the creation of any other scripts that can be accessed through this agent via an Event type web service.
3. A User Repository Domain 1717—To Store the Users separated from the Domain, keeping the aspect services outside the Framework Domain.
4. Aspect Services Management Domain 1720—To Store Sessions and Permissions separated from Users, keeping the aspect services outside the Domain.
5. Aspect Management Web services 1734—This agent provides all scripts deployed by as aspect services via Rest WebServices. This Agent represents the Aspects (Session, Login, etc) Specific Functionality. This functionality can be extended by the creation of any other scripts that can be accessed through this agent via an Event type web service.
6. PCIML Reports 1735—To provide HTML Type Report Functionality required by the Framework to print Domain Definition Models, Capability Reports, WBS Reports, etc.
7. File System Services 1736—To Store, Backup, and manage access to physical PMDA Models.
8. Email and Internet Services 1737—To communicate via email with Agents and also to access open standard ontologies that can be used by different Domains.
9. Top Braid Ensemble—PMDA Views 1738—To provide the PMDA Views.

Now, with the PMDA Framework Models 1710, the Security Aspects Models 1740, the Framework Services functionality implemented and a mechanism that allows the communication of the Services available in the External World to and from the Internal Domain Services, the PMDA Framework needs a platform to orchestrate the Appropriate Events that should be enabled in order to access Domain Services based on the State of Models Managed by the Domain.

The PMDA Framework uses then ESTCA State Transition Engine implemented as ESTCA Web Server 240 for the Events orchestration based on the State of the Instance of the Framework domain such as PCIML Models, PPIML Models, PPSML Models, Schema Data Models, Rules Data Models, Capabilities, Technical Specifications, etc that are changed by an event or internal action that is going to interact with the PMDA Framework Agents driven by the PMDA Framework Web Portal for Users 1716 agent implemented using SWP Platform as an event Maestro.

The ESTCA Web Server 240 computing Device is deployed as a SPARQL Motion Script that uses Top Spin Inference Engine that is enabled by the Top Braid Live Server technology that enable the delivery of Services via a Rest web services that delivers the engine responsible to coordinate the sequence of events to be communicated from and to the external world, based on the state of the models defined as PCIML 800, designed as PPIML 1300 and deployed as PPSML 1500 by PMDA Framework.

The ESTCA Web Server 240 computing Device uses the PMDA Framework Domain Specific Models 1733 to know where to locate the PMDA Framework Schema Data Models 1725, PMDA Framework Rules Models Data 1727 and PMDA Framework Data Instance Models 1728 models required to provide the instructions (structure, behaviour and rules) required by the ESTCA Web Server 240 computing Device to process state transitions based in an inbound event.

By selecting only the right instances, schemas and rules models that are appropriate to each transition based on the state to be achieved using the pcimlFilter via the SPO pattern, the pciml:Condition and the pciml:Derivation definitions before executing the Inference Engine in order to infer only on the right data from the subject and object involved in the transition is a key element in order to deliver a good performance during each transition.

Many techniques can be used in order to connect this infrastructure to any other platform available on the market, by only describing a different Technical Specification also using the PMDA Framework.

The ESTCA is also used to Orchestrate Applications like the Agent services which are integrated to PMDA only by describing their Technical Specification.

The engine could be used as an orchestration engine that could update any system at any time anywhere. It is just necessary an input of data from the master of data, and then update the target system with enough information to move to the next event and then communicate again and so on.

The Components defined in the architecture could be deployed in the cloud as separated or federated appliances.

The FIG. 17*a* shows the way PMDA Framework is implemented using the embodiment. The PMDA Framework brings together several recent technical developments and trends to create a practical tool that will drastically simplify the design, development and deployment of Enterprise Information Systems, which are:
Model-Driven Architecture 1723
Semantic Web Technology 1740
Enterprise Architecture 1739
Service-Oriented Architecture 1722
Cloud Computing 1741

The embodiment and consequently the PMDA Framework are built using the infrastructure currently provided by the Semantic Web Technology 1740, applying a Model Driven Architecture (MDA) 1723 perspective. In this way, the 3 model layers representing distinct stakeholder views (CIM, PIM and PSM) from MDA are implemented using the following features provided by the Semantic Web Technology 1740:
Semantic expressivity and formal precision enables reliable aggregation of models using a consistent approach.
The ability to capture and relate distributed models at multiple levels and from multiple viewpoints supports the appropriate use of local vocabularies while preserving integrity of the chosen framework.
Rigorous typing, categorization and consistency checking ensures conformance to the reference frameworks and makes it possible to break large models into smaller interconnected modules.
Reuse, substitution and extension become possible using the web as an integration and knowledge discovery platform.
Industry standard inference engines offload significant portions of the business logic and its processing needed to implement management reports and analytics.

This combination enables the creation of the following 3 separated MOF M2 Meta-model Ontologies 1742 used for definition, design and deployment which can be easily interconnected when required:
Parametric Computation Independent Model Language (PCIML) 800—Definition Foundation Ontology;
Parametric Platform Independent Model Language (PPIML) Ontology 1300—Design Foundation Ontology;
Parametric Platform Specific Model Language (PPSML) Ontology 1500—Deployment Foundation Ontology.

The Parametric Platform Independent Model Language (PPIML) Ontology 1300—Design Foundation Ontology in this example uses the Web Specification Schema models 1745—These many models are the schema data ontologies calculated 1746 by the Web Specification PCIML Models 1718, used to capture the Web Design Specifications.

The Parametric Platform Specific Model Language (PPSML) Ontology 1500—Deployment Foundation Ontology in this example uses the Semantic Web Platform Schema Ontology models 1747—These many models are the schema ontologies calculated 1748 by the Semantic Web Platform PCIML Models 1719, used to capture the Semantic Web Platform Specifications.

Using the MOF M2 Meta-model Ontologies 1742 as the foundation, the PMDA Framework 1743 drive 1749 the Ecology of the Enterprise Architecture that is composed of a finite number of models that will be transformed into an application. In this way the PMDA Framework captures the three different model types (PCIML 800, PPIML 1300 and PPSML 1500) used to capture Business Domain Definition, Design and Deployment data using the respective PMDA Framework views 1750 provided by the PMDA Framework Web Portal for Users 1716.

Each Model will import the respective foundation ontology that will define the schema structure of the data captured in each model. In this way, the MOF M2 meta-model ontologies 1742 underlies 1754 the Framework Views and model instantiations 1750 which are used to capture the Requirement Management and its constituents Definition 1751, Design 1752 and Deployment 1753 foundation ontology data defined below:

Recruitment Management Definition Models e.g. 1751—Definition View

Recruitment Management Design Models e.g. 1752—Design View

Recruitment Management Deployment Models e.g. 1753—Deployment View

These Model Instantiations 1750 are going to hold the Definition, Design and Deployment foundation ontology data of a particular domain using the structure dictated by one of the three foundation ontologies.

With the infrastructure provided by the PCIML 800, PPIML 1300 and PPSML 1500 Models, the next step in designing the Framework is creating an architecture which is modular and ecologic when connecting models by applying the concept of Enterprise Architecture 1739 that is to pursue optimisation, not at the traditional fragmented level of individual business processes, but in the context of the whole enterprise, and to seek to best balance of automation and human work to make the enterprise agile and strategically flexible.

By ecology one mean the best way to connect, remove, transform and merge different model types that compose the Enterprise. It is about been able to separate models that should be separated and link models that should be linked. It is about defining each models responsibility for contributing to the Enterprise ecosystem, without waist and lack of resources. It is about been able to remove easily a model that is not more required. Models are used to store objects (first and second) and component definition foundation ontology data.

The PMDA Framework provides a frame and method for driving 1749 the Enterprise Architecture semantically integrating its Domains Access Services and Information layers using the definition, design and deployment foundation ontology data models. In this way the Enterprise will be modular enough for providing the flexibility required to keep evolving with the business changes required by growth.

This will also drive 1749 the Ecology of the Enterprise Architecture that is composed of a finite number of models that will be transformed into an application.

As demonstrated, the PMDA Framework also introduces the concept of executable models, which are composed of Schema data and Rules Model data that have their own behaviour defined.

Taking the previously defined Recruitment Management as an example:

The Recruitment Management PCIML Model 1751, contains the definition of the Recruitment Management Component and its constituent objects such as Person and Job Application Management from a Computation-Independent viewpoint perspective, becoming then the definition foundation ontology data for Recruitment Management.

The Recruitment Management PPIML Model 1752, contains the design of the Recruitment Management Component and its constituent objects such as Person and Job Application Management from a Platform-Independent viewpoint perspective, becoming then the design foundation ontology data used to implement the Recruitment Management Domain.

The Recruitment Management PPSML Model 1753, contains the deployment of the Recruitment Management Component and its constituent objects such as Person and Job Application Management from a Platform-Specific viewpoint perspective, becoming then the deployment foundation ontology data required for deploying the definition and design which enable Recruitment Management.

Supported by the Framework model types and scripts, like in the example using the Framework Models, the Recruitment Management Models are transformed.

Using the Script number 4 with the Recruitment Management PCIML Definition Model 1751 as parameter the Framework will calculate 1755 the Recruitment Management Schema Data Ontology 1756 and also calculate 1757 the Recruitment Management Rules Model 1758

Using the Script number 5 using the Recruitment Management PCIML Model 1751 the Framework creates a Recruitment Management Data instance model 1759 that have the Recruitment Management Schema Data Ontology 1756 under it 1760.

Using the Script number 12 using the Recruitment Management PPIML Design Model 1752 the Framework will interpret 1761 a Recruitment Mgt Platform Specific Model 1762

Using the Script number 16 using the Recruitment Management PPSML Model 1753 the Framework will deploy 1763 a Recruitment Mgt Deployed model 1764.

The deployed Domain Specific Models 295 represented in the diagram as Recruitment Mgt Domain Specific Models 1765 can be deployed as an Appliance which can be implemented using the Web server 210 in FIG. 2 or in the cloud 1768 like in the example. The PMDA Framework claims to a be a platform independent Framework, however as an example and proof of concept PMDA deliver a SWP Platform 1766 using SPARQL Web Pages (SWP), TopBraid Ensemble 1767 which can be implemented using a web server 210 connected to the ESTCA Web Server 240 that combined with the Domain Specific Models 295 that in the example are the Recruitment Mgt Domain Specific Models 1765 deployed as an Appliance on the Cloud 1768. Any other platform such as Java, JSP, ASP and PHP would be also valid platforms that would access Inference and SPIN via a Java API.

After the Recruitment Mgt Deployed models 1764 are deployed, the Recruitment Management Domain is already available to be orchestrated using a different implementation of ESTCA 240 and deployed as an end-user application 1769 like the www.ABCHumanResourcesManagement.com 661 examples in FIG. 6 that is enabled by 1770 another instance of the SWP Platform Implementation 1766 and orchestrated 1771 by the ESTCA Web Server 240 computing Device.

Benefits and Functionality Provided by the Parametric Model Driven Framework (PMDA) Framework The Parametric Model Driven Architecture Framework is an enterprise modelling framework developed to provide IT and business stakeholders with a tool which enables the propagation of business definition changes into design, development and deployment of services in a simplified way. It enables the management of the executable enterprise blueprint defined from a Computation-Independent viewpoint and enables the technical structure and dynamics of automation and those of business systems to evolve independently.

The PMDA Framework brings together several recent technical developments and trends, such as Enterprise Architecture, Service-Oriented Architecture, Model-Driven Architecture, Cloud Computing, Appliances, Business Orchestration and Semantic Technology, to create a practical tool that drastically simplifies the design, development and deployment of Enterprise Information Systems.

While the technical means are well understood individually, their synergy has not been generally perceived.

PMDA leverages this synergy by enabling a systems development life cycle (SDLC) that is founded on modelling the Executable Enterprise Business Architecture definition which is captured by the steps capturing in a computation-independent manner the structure of a first object definition foundation ontology data and a second object definition foundation ontology data 710, capturing in a computation-independent manner the behaviour of the first object definition foundation ontology data and the second object definition foundation ontology data 720 and capturing in a computation-independent manner the rules of the first object definition foundation ontology data and the second object definition foundation ontology data 730 and capturing in a computation-independent manner a component definition foundation ontology data creating a relationship between the second object definition foundation ontology data and the first object definition foundation ontology data 740. The Executable Enterprise Business Architecture definition is delivered and governed using Capabilities.

The PMDA Framework provides:

A formal, consistent method and a modular, flexible tool to capture business definitions (business definition foundation ontology data) and allow them to evolve with frequent business changes. The tool also provides the ability to extract reports in different formats.

A tool for business stakeholders, which does not require programming knowledge to execute automated consistency checking and business activity simulation. It also generates data schemas (first and second objects and component schema data), rules (first and second objects and component rules model data) and data repository models that can be used for prototyping, usability and data migration tests.

A formal notation for technical specialists, which links business definitions and design patterns within a unique design model which is captured in the step capturing in a platform-independent manner the first and second object and component design foundation ontology data for use in calculating a first and second object and component platform specific model data in accordance with the first and second object and component design foundation ontology data 760. This ensures that any changes in business definitions or design patterns can be checked for inconsistencies and automatically propagated into the design that becomes an extension of the definition.

A formal notation for platform specialists, which links business definitions, designs and deployment components within a unique deployment model which is captured in the step capturing in a platform-specific manner the first and second object and component deployment foundation ontology data for use in selecting a first and second object schema data and a first and second object rules model data in accordance with the first and second object data 770. This ensures that any changes in definitions or designs or platform components can be checked for inconsistencies and automatically propagated into the deployment that also becomes an extension of the definition.

A tool for architects, which makes it possible to easily connect and disconnect models which are used to deliver Enterprise capabilities. The tool also enables the separation of viewpoints (business, aspect, framework, technical and platform), and restricts the way they may be connected. In this way, architects will be able adequately manage the capabilities of the enterprise on the basis of its Executable Business Architecture (PCIML Model or definition foundation ontology data); this supports interoperability with the Information Systems Architecture (PPIML Model or design foundation ontology data) and the Technology Architecture (PPSML Model or deployment foundation ontology data) by means of a unified meta-grammar (syntax & semantics).

A tool for project Managers, which makes it possible to easily report on the status of the project based on the status of each artefact or model from definition to design, development and deployment. This tool can provide an overview of the Work Breakdown Structure (WBS) by phases. Each model which is part of the capability scope represents a WBS item.

The PMDA Framework functionality enables a flexible management of different model types which are used to define, design, develop and deploy Enterprise capability services. Each model is classified based on domain-related information from different viewpoints (business, aspects, framework, technical and platform), scope (universe, component and object), levels of abstraction (CIM—definition foundation ontology, PIM design foundation ontology and PSM deployment foundation ontology).

To enable the technical structure and dynamics of automation and those of business systems to evolve independently, the framework classifies and separates models of different viewpoints into five different domain types, which are:

Business Models used to describe the Business Architecture. Examples of Business Models are models which define Banking, Pharmaceutical, Customer Relationship Management, Billing Management, Human Resources Management, Person, Sales Order, Job Application, Party, Organisational Structure, etc.

Aspect Models used to describe Aspect Architecture, that is, those concerns which cut across business domains and are generally applicable to business systems. Examples of Aspect concerns are Security, Reliability, Scalability, Resilience, etc.

Technical Models used to describe the technical design patterns used to implement Capabilities Services. Technical Models define technical concerns. Examples are SAP, PeopleSoft, Mainframe, Pages, Menus, Buttons, Actions, Services, Records, Objects, Components, etc.

Platform Models used to describe the platform-specific components used to deploy Capability Services that have been implemented using Technical Models. Platform Models define platform domain components. Examples are NetWeaver, PeopleTools, Oracle Relational DB, Oracle Triple-Store, Application Server, ILOG Rules Engine, Hosting Server, etc.

Framework Models used to describe the PMDA Framework Architecture Domain. Examples of Framework Domain Models are models such as Model, Capability, Technical Specification, platform specification and others proposed by Enterprise Architecture Frameworks like TOGAF, Archimate and Zachman. These models implement the PMDA Framework.

The PMDA framework addresses the progressive decomposition required when defining a domain, enabling domain models to be contained within other domain models of the same type. The framework recognises three different types corresponding to three different scopes, namely:

Universe Models 1030, representing the maximum scope of a domain, for instance the whole extended Enterprise. The universe models establish a common language for a particular industry model. A universe defines the enterprise behaviour in terms of constituent components and required interfaces.

Object Models 1010 representing objects, i.e., atomic units of structure and behaviour, such as: Person, Company, Location, Party, Invoice, Product, Job Application, Schedule, Accounts, Page, Form, Host, Menu, Buttons, Data Repositories, etc.

Component Models 1020 representing intermediate scopes, with recursive embedding/composition (Functional Domains). The component models define domain structure by the way in which they are composed of other component or object models and their relationships. Examples of Component models are (for Business) Human Resources Management, Customer Relationship Management, Billing Management, Financial Management, (for Aspect) Security Services, (for Technology) PeopleSoft, (for Platform) Oracle Platform Components, etc.

Using the classification and segmentation described above, the PMDA Framework enables the Systems development life cycle (SDLC) delivered as Enterprise Capability Services.

Core Capability represents the actions which an endeavour could not thrive without. Core Capabilities are defined by definition models or definition foundation ontology data (CIMs). Core Capabilities are implemented using Implemented Services defined by Design Models or design foundation ontology data (PIMs) and deployed using Deployed Services defined by Deployment Models or deployment foundation ontology data (PSMs).

Implemented Service represents the mapping between a Core Capability and an Implementation Capability which is the same thing of a Technical Specification (using Technical CIM) captured using Design Models (PIMs).

Deployed Service represents the mapping between an Implemented Service and a Deployment Capability which is the same thing of a platform Specification (using Platform CIM) captured using Deployment Models (PSMs).

Figure 17B:
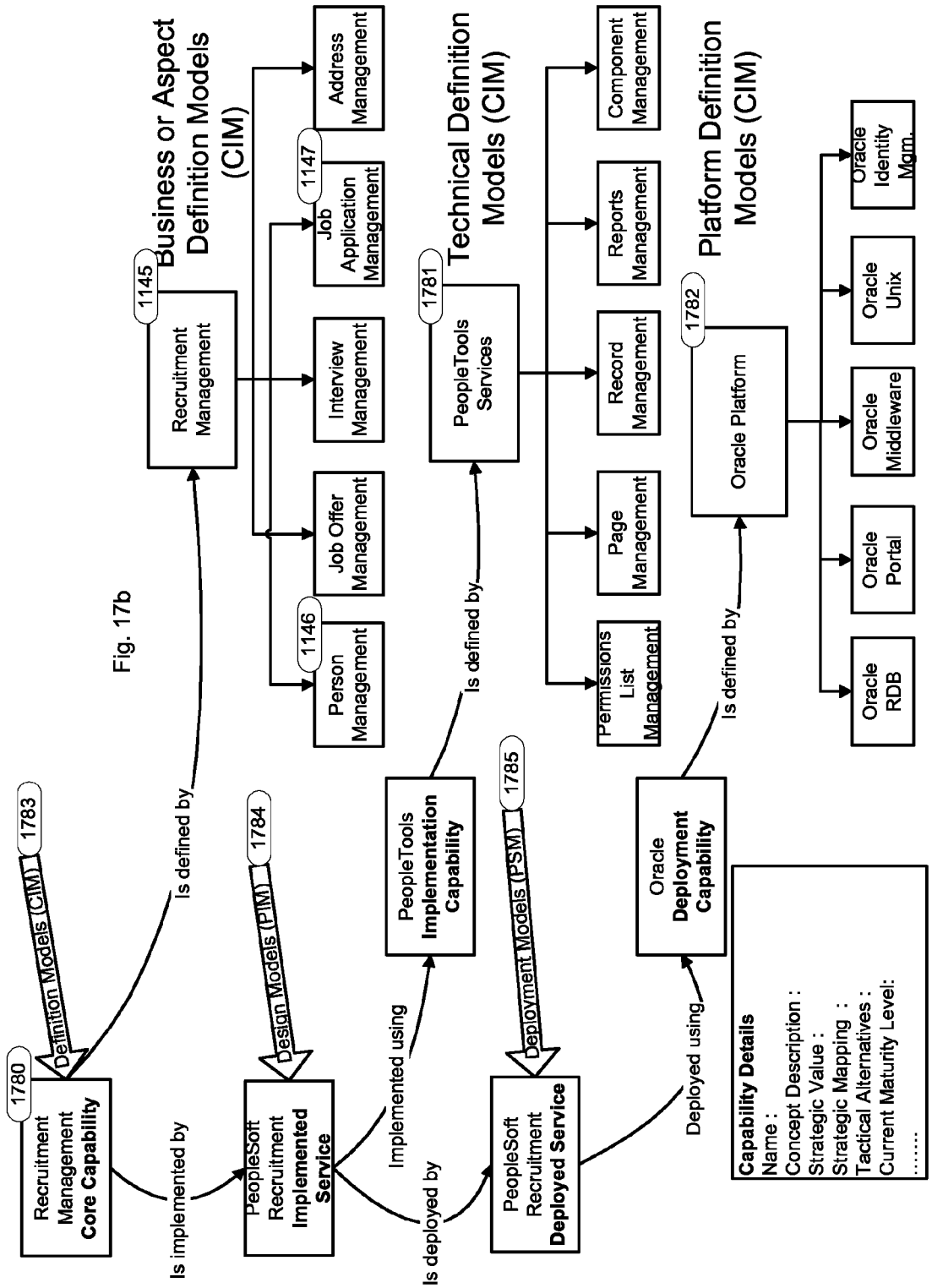
FIG. 17b shows an the Core Capability life-cycle (Functional Scope, Implemented Service and Deployed Service) example diagram in accordance with an embodiment of the present invention.

FIG. 17*b*. shows the example of the PeopleSoft Recruitment Core Capability 1780 which delivers functions of the Recruitment Management Business Component CIM 1145, which are implemented using the PeopleTools Implementation Capability (or Technical specification) based on the PeopleTools Services Technical Component CIM 1781 as a different example then the Technical Component PCIML Model called TCTechnicalServices used as example in the section Technical Specification defined earlier, which are deployed using the Oracle Deployment Capability (or platform Specification) based on the Oracle Platform Component CIM 1782 as a different example then the Platform Component PCIML Model called PCPlatformServices used as example in the section Platform Specification defined earlier.

Based on the Core Capability, the PMDA Definition phase delivers the definition of Business Objects and Components that are used to deliver the equivalent of TOGAF's Business Architecture using the Business Definition Models (CIM), Design Patterns required to create the TOGAF Information Systems Architecture during the design phase using the Technical Definition Models (CIM) and Platform Devices required to create the TOGAF Technology Architecture during the deployment phase using the Platform Definition Models (CIM).

Definition Models (CIMs) (definition foundation ontology data) 1783 specify the logic of a system without showing constructional details using the Parametric Computation Independent Modelling Language (PCIML) 800. A CIM captures a domain's structure, its behaviour in terms of Finite-state machines (FSM) representing the lifecycles of objects and components, and rules. The Definition Model plays an important role in bridging the gap between subject matter experts (i.e., business experts) and experts in the design and construction of the system (i.e., IT experts). For example, the Business CIMs define the business structure, business lifecycles (statecharts) and business rules, captured using PCIML 800.

FIG. 17*b*. shows the Business Architecture defined using a top-down approach, where the Business Universe CIM representing the Energy Utility Universe is at the top. The next level decomposes the energy utility universe into Organization, Party Relationship Management (Target Group), Value Chain and External Influences Management Business Component CIM which represent some of the main concepts of this industry.

Figure 17C:
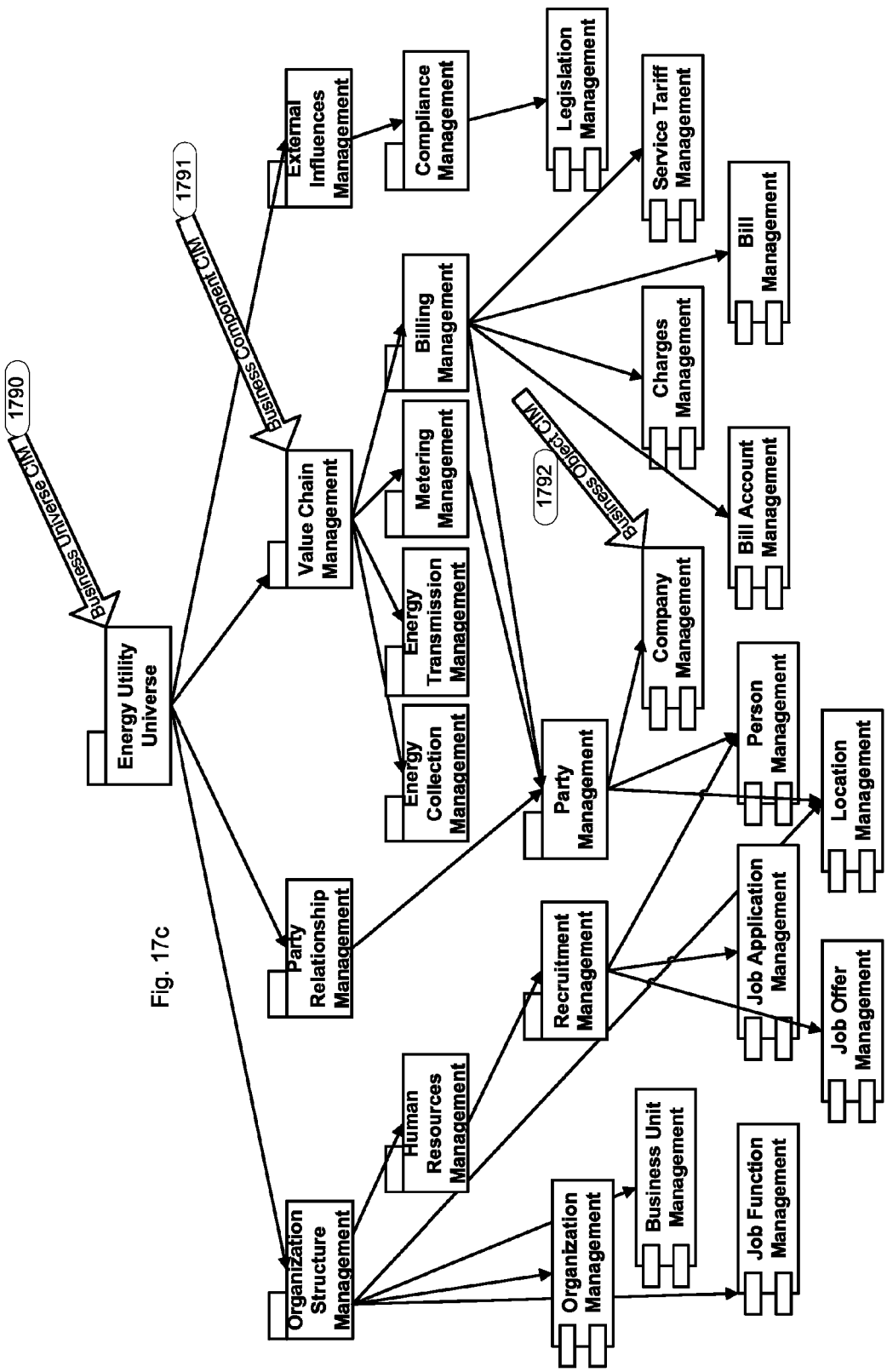
FIG. 17c shows the example of part of the Energy Utility Business Architecture connecting Business Definition Models (CIM)

FIG. 17*c*. also shows each sub-domain decomposed into more specialised component or object CIMs. For example, the Organization Management Component CIM is decomposed into the Business Unit, Job Function, Person, Company, Location Management Object CIMs. The Party Relationship Management Component CIM is decomposed into Company, Person and Location Management Object CIMs, etc.

Each CIM is defined using PCIML 800. The definition follows a bottom-up approach where the first CIMs to be defined are the Business Object CIMs 1792 which capture the object's structure, behaviour and rules. Building on this first step, Business Component CIMs 1791 capturing the structure, behaviour and rules of components can be defined. Component Finite-State Machines (FSM) are constructed recursively by connecting the previously defined Object FSMs. Finally the Business Universe CIM 1790 represents the "maximal component" model.

Using the Definition Models (CIM) (definition foundation ontology data), the Framework provides views and functionality around:

- domain activity statecharts simulation from States, Actions and Transitions perspectives based on inferred domain resources, services and states taxonomies represented using SKOS;
- graphical relationships diagram of objects;
- definition reporting;
- WBS Definition reporting based on the status of each CIM covered by the Core Capability;
- generation of executable models (Schemas (Schema Data), Rules (Rules Model Data) and Data Models) used for prototyping, usability and data migration tests.

The Business Component CIMs 1721 for example, can be defined incrementally over time by different projects, implementing different Business Components delivered by different Core Capabilities.

From a Core Capability perspective, the Business CIMs capture the agents that are responsible for delivering the capability and also the taxonomy of services and resources provided by each capability, as well as the associated business value, business goals and business requirements. The Implemented and deployed services related to the Core Capability are captured in the Business PIM (design foundation ontology data) and Business PSM (deployment foundation ontology data) built in the next PMDA phases described below.

The PMDA Design phase delivers Implemented Services, the equivalent of TOGAF's Information Systems Architecture. It starts by mapping a Core Capability with a particular Implementation Capability; the Implementation Capability is defined by a technical component CIM also delivered in the PMDA Definition phase.

Continuing the example of FIG. 17b, the PMDA Design phase extends each Recruitment Management Business Component constituent CIM 1145 with a design specification captured using the respective Business Design Model (PIM).

Design Models (PIMs) (design foundation ontology data) 1784 capture the design using the Parametric Platform Independent Modelling Language (PPIML) 1300. A Platform-Independent Model (PIM) captures the construction of a system on an ontological level, meaning that the construction of the system is specified without implementation details. A PIM serves to extend the definition of Core Capabilities captured in a CIM which is mapped to an Implementation Capability with the design that best implements the Core Capability using PPIML 1300. Each CIM can have multiple PIMs, enabling a Core Capability to have many Implemented Services.

When creating a Business PIM, an Implementation Capability (or technical specification) must be selected in order to define the design pattern to be used.

Implementation Capability (Technical Specification) are used during the creation of a new PIM which maps Core Capabilities using a CIM with design patterns defined by a Technical Component CIM. Each Implementation Capability is based on one Technical Component CIM which is composed of several Technical Object CIMs used to define individual elements provided by a particular type of design pattern. In the example of FIG. 17b, the same method used to create the Recruitment Management Business CIM is applied to create a Technical Component CIM called PeopleTools Services, with its constituent Technical Object CIMs which define the Peopletools-specific Pages, Records, Permissions Lists, Reports, Forms, Messages, etc.

When the Implementation Capability is created, the schema and rules are instantiated from the PeopleTools Services Technical Component CIM and its constituent Object CIMs. The PeopleTools Services Component Schema and rules models are then imported by the PPIML meta-model ontology connecting each model to the appropriate PPIML Construct. For example, the Page is to be connected to the Output PPIML construct, while the Record is going to be connected to the Element PPIML construct.

Figure 17D:
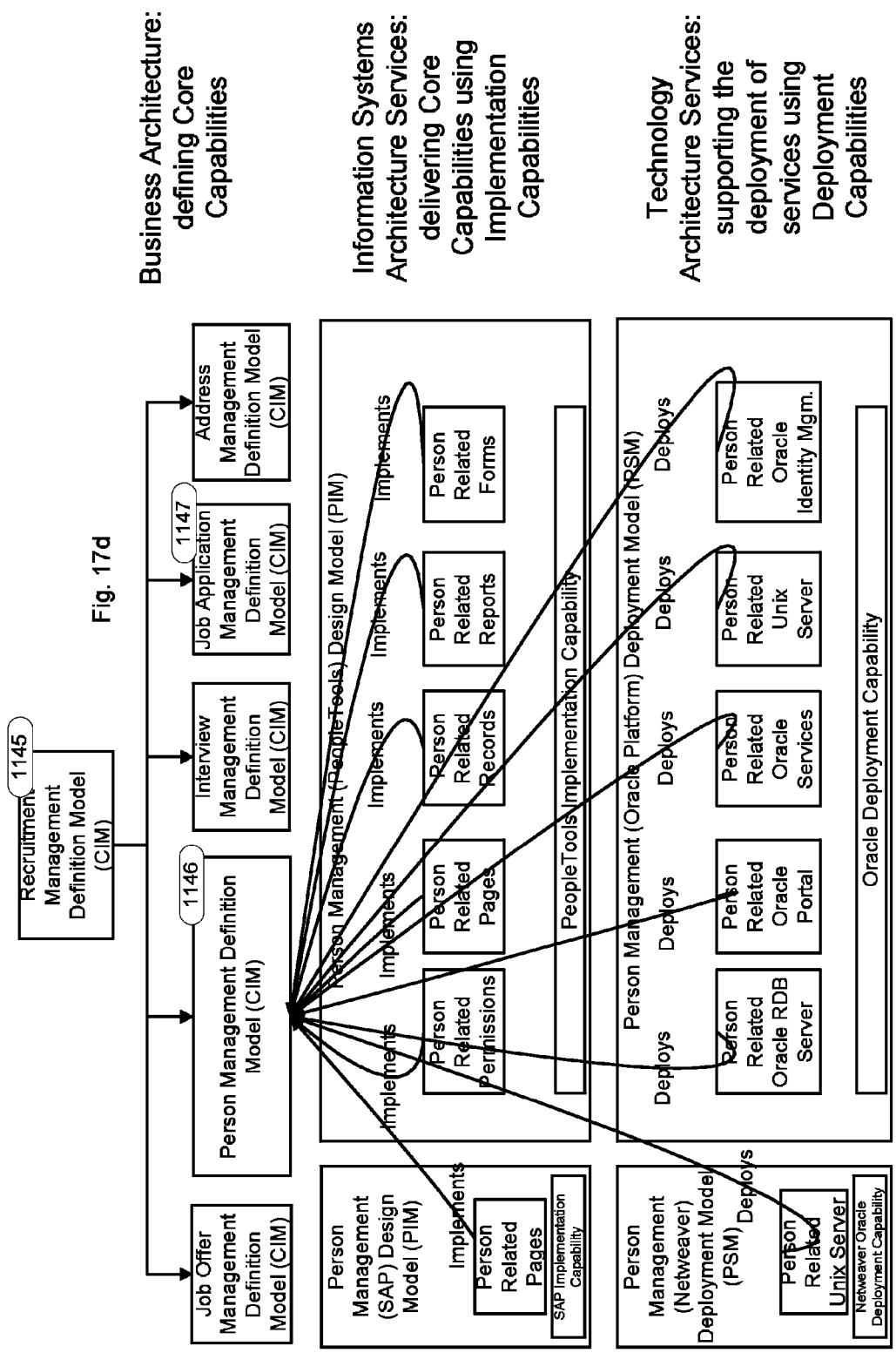
FIG. 17d shows the Person relationship between Business CIM, Business PIM and Business PSM Models example diagram in accordance with an embodiment of the present invention.

FIG. 17d shows the example of the Person Management PIM created based on the Person Management CIM using the PeopleTools Implementation Capability. The Person Application Architecture is then defined, where PeopleTools Record and Page of Person is connected with the Person business object definition inside the Person Management PIM. Each Person Technical PIM defines the person canonical model by connecting the business object definition of Person with each Technical Application used to deploy Person type services in the Data Architecture. This enables the integration between Core Capabilities to be defined in the CIM viewpoint and not in the PIM viewpoint as is the case with most integrations.

Using the Business Design Models (PIM) as an example, the Framework provides functionality around:
- Core Capability reporting based on the relationship of Business Architecture to Information Systems Architecture;
- graphical representation of data and application architecture by Core Capability;
- WBS design reporting based on the status of each PIM used to implement the service;
- Generation of application-specific configuration metadata.

The PMDA Deployment phase delivers a Deployed Service the equivalent of TOGAF's Technology Architecture. It starts by mapping an Implemented Service (PIM) with a particular Deployment Capability (Platform Specification) used for deployment; this Deployment Capability is defined by a platform definition (CIM) also delivered in the PMDA Definition phase.

Continuing the example of FIG. 17b, the PMDA Deployment phase extends each Recruitment Management Business Component constituent PIM with a Deployment Capability captured using the respective Business Deployment Models (PSM).

Deployment Models (PSMs) (deployment foundation ontology data) 1785 capture the deployment configuration using the Parametric Platform Specific Modelling Language (PPSML) 1500. A Platform-Specific Model (PSM) extends the Implemented Services captured in a PIM which is mapped to a Deployment Capability that best deploys the Implemented Service using PPSML 1500. Each PIM can have multiple PSMs, enabling a Implemented Service to have many Deployed Services. When creating a Business PSM, a Deployment Capability (Platform Specification) must be selected in order to define the deployment components to be used.

Deployment Capability (Platform Specification) are used during the creation of a new PSM which maps an Implemented Service using a PIM with deployment components defined by Platform Component CIMs. Each Deployment Capability is based on a Platform Component CIM which is composed of several Platform Object CIMs used to define individual services provided by a particular type of platform. When the Deployment Capability is created, the schema and rules are instantiated from the Oracle Platform Component CIM and its constituent Object CIMs. The Oracle Platform Component Schema and rules models are then imported by the PPSML meta-model ontology connecting each device to the appropriate PPSML Construct.

FIG. 17d shows the example of a Person Management PSM based on the Person Management PIM using the Oracle Deployment Capability. The Person Technology Architecture is then defined, where the Oracle DB which has the Person Table Schema will be mapped to the Person business object definition inside the Person Management PSM. As an example, the set of Person PSMs defines the enterprise database in which Person data is deployed.

Each CIM, PIM and PSM also has properties used for Project Management, such as Allocated Resource, Estimated Effort, Percentage Completed, Target Date, etc used to measure the effort of Deployment.

Using the Business Deployment Model (PSM) as an example, the Framework provides functionality around:
- Core Capability reporting based on the relationship of Business Architecture and Information Systems Architecture to the Technology Architecture;
- graphical representation of the Technology Architecture by Core Capability;
- WBS Deployment reporting based on the status of each PSM required to deploy the service;
- Generation of platform configuration meta-data models.

Interpretation

Wireless

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Implementation

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium.

The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Furthermore, some of the embodiments are described herein as a computer-implemented method or combination of elements of a method that must necessarily be implemented by a processor of a processor device, computer system, or by other computational device. Thus, a processor with the necessary instructions for carrying out such a method or element of a method forms a means for carrying out the method or element of a method.

Generally the invention comprises a computing device for state transitions of recursive state machines and a computer-implemented method for the definition, design and deployment of domain recursive state machines for computing devices of that type; such devices are intended for the simulation of large systems involving human and automated components, particularly the type generally called "Enterprise Applications"; such devices are also applicable to a much wider range of fields, such as cognitive modelling or robotics. The commonality between the computing device and the computer-implemented method is the Subject Predicate Object Protocol (SPOP) which is used to capture instructions using the computer-implemented method for the definition, design and deployment of recursive state machines and also is the protocol used by the computing device for state transitions of recursive state machines to communicate inbound and outbound events based on the captured instructions. When executing the computer-implemented method for the Definition, Design and Deployment of domain recursive state machines 700, the Subject Predicate Object Protocol SPOP is captured during the domain definition using the PCIML construct Filter 806 (pciml:Filter) to capture and relate the objects 1010 finite state machines recursively to form components 1020 and universes 1030 behaviour which is then implemented by the PPIML Construct SPOP 1306 (ppiml: SPOP) which is then deployed using the PPSML Construct Rules Engine 1508 (ppsml:RulesEngine) which accesses the schema data, rules model data, data instances data and platform Specific Template Instances of objects configured using the PPSML Construct Repository Schema 1501 (ppsml:RepositorySchema) and the PPSML Construct Rules Repository 1507 (ppsml:RulesRepository) and the PPSML Construct Data Repository 1506 (ppsml:DataRepository) and the PPSML Construct Interface 1505 (ppsml:Interface) respectively. The Subject Predicate Object Protocol SPOP becomes then the protocol of communication via events received and sent by the computing device for state transition of recursive state machines (ESTCA) 300.

Coupled

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

TERMINOLOGY

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any example definition given above are merely representative of procedures that may be use representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

The present invention is applicable to the definition, design and deployment of recursive state machines in support of any state-defined process. Consequently it is applicable to the delivery and orchestration of event-driven applications in any industry such as telecommunications, banking, utilities, retail, manufacturing etc. The applicable domains may also be subdomains common to many industries, such as Human Resources Management, Customer Relationship Management, Billing Management, Procurement Management, etc.

The example of Recruitment Management which is a subdomain of Human Resources Management is used to describe the invention.

The present invention is also applicable to the definition, design and deployment and orchestrations of framework-type applications. The Framework constructed to maintain the domain models in accordance with the invention is also defined, designed and deployed using the present invention.

The invention claimed is:

1. A computing device for state transitions of recursive state machines, the computing device comprising:
a processor for processing digital data;
a memory device for storing the digital data including computer program code coupled to the processor;
a data interface for sending and receiving data coupled to the processor, wherein the processor is controlled by the computer program code to:
receive via the data interface, event data representing an event in relation to a first object;
receive via the data interface, first object data representing the first object;
receive via the data interface, second object data representing a second object;
receive via the data interface, data representing a predicate relationship between the second object and the first object;
calculate a first state in relation to the first object;
calculate a second state in relation to the second object; and
calculate a valid state transition in accordance with the predicate relationship between the second state and the first state by:
selecting the first object schema data and the first object rules model data in accordance with the first object data;
selecting the second object schema data and the second object rules model data in accordance with the second object data; and
calculating the valid state transition further in accordance with the first object schema data and the first object rules model data and the second object schema data and the second object rules model data related by the predicate relationship;
wherein selecting the first object schema data and the first object rules model data in accordance with the first object data and selecting the second object schema data and the second object rules model data in accordance with the second object data, comprises defining, designing and deploying domain recursive state machines comprising the steps of:
capturing in a computation-independent manner structure of a first object definition foundation ontology data and a second object definition foundation ontology data;
capturing in a computation-independent manner behaviour of the first object definition foundation ontology data and the second object definition foundation ontology data;
capturing in a computation-independent manner rules of the first object definition foundation ontology data and the second object definition foundation ontology data;
capturing in a computation-independent manner a component definition foundation ontology data creating a relationship between the second object definition foundation ontology data and the first object definition foundation ontology data;
calculating schema data and rules model data;
capturing in a platform-independent manner design foundation ontology data; and
capturing in a platform-specific manner deployment foundation ontology data.

2. The computing device as claimed in claim 1, wherein calculating the valid state transition involves:
validating the first object data in accordance with a condition from the first object rules model data and/or the first object schema data.

3. The computing device as claimed in claim 2, wherein, if the condition is untrue the valid state transition is not valid and the processor is controlled by the computer program code to perform sending condition constraint data representing the untrue condition.

4. The computing device as claimed in claim 2, wherein, if the condition is true the valid state transition is valid and the processor is controlled by the computer program code to perform:
storing the first object data in the memory device; and
storing optionally the second object data in the memory device.

5. The computing device as claimed in claim 4, wherein, in storing the first object data in the memory device, the processor is controlled by the computer program code to perform calculating a valid action for the valid state transition.

6. The computing device as claimed in claim 5, wherein, in calculating the valid action, the processor is controlled by the computer program code to perform sending valid event data representing the valid action.

7. The computing device as claimed in claim 6, wherein the valid event data further comprises the first object data, the second object data and the data representing the predicate relationship between the second object data and the first object data.

8. A computer-implemented method for definition, design and deployment of domain recursive state machines comprising the steps of:
capturing in a computation-independent manner structure of a first object definition foundation ontology data and a second object definition foundation ontology data;
capturing in a computation-independent manner behaviour of the first object definition foundation ontology data and the second object definition foundation ontology data;
capturing in a computation-independent manner rules of the first object definition foundation ontology data and the second object definition foundation ontology data;
capturing in a computation-independent manner a component definition foundation ontology data creating a relationship between the second object definition foundation ontology data and the first object definition foundation ontology data;
calculating schema data and rules model data;
capturing in a platform-independent manner design foundation ontology data; and
capturing in a platform-specific manner deployment foundation ontology data.

9. The computer-implemented method as claimed in claim 8 wherein the step of capturing in a computation-independent manner the structure of the first object definition foundation ontology data and the second object definition foundation ontology data comprises:
receiving structure data for a first object, the structure data including at least one of class data representing a class for the first object and receiving structure data for a second object, the structure data including at least one of class data representing a class for the second object;
receiving property data representing at least one property for the first object and receiving property data representing at least one property for the second object;
receiving state data representing at least one state of the first object and receiving state data representing at least one state of the second object;
receiving data relating to agents that can manipulate the first object and receiving data relating to agents that can manipulate the second object; and
formulating findings in a formal language.

10. The computer-implemented method as claimed in claim 8, wherein the step of capturing in a computation-independent manner the behaviour of the first object definition foundation ontology data and the second object definition foundation ontology data comprises:
receiving behaviour data for a first object, the behaviour data including first object finite state machine data comprising data relating to at least one operation that changes a state of the first object and receiving the behaviour data for a second object, the behaviour data including second object finite state machine data comprising data relating to at least one operation that changes a state of the second object;
receiving an event considered by the at least one operation to communicate with agents;
receiving a filter qualifying an applicability of the at least one operation on the first object's finite state machine and receiving a filter qualifying an applicability of the at least one operation on the second object's finite state machine; and
formulating findings in a formal language.

11. The computer-implemented method as claimed in claim 8, wherein the step of capturing in a computation-independent manner the rules of the first object definition foundation ontology data and the second object definition foundation ontology data comprises:
receiving rules data for a first object and a second object, the rules data including at least one object-specific, rule-constrained authorization connecting agents to events;
receiving object-specific derivation rules to be applied for a particular authorization;
receiving object-state-specific condition rules which validate the first object and second object state transitions; and
formulating findings in a formal language.

12. The computer-implemented method as claimed in claim 8, wherein the step of capturing in a computation-independent manner the component definition foundation ontology data creating a relationship between the second object definition foundation ontology data and the first object definition foundation ontology data comprises:
receiving a reference of the first object definition foundation ontology data defining a first object; and
receiving a reference of the second object definition foundation ontology data defining a second object;
receiving behaviour data comprising creation of a predicate relationship between second object finite state machine data and first object finite state machine data by at least one filter qualifying a recursive aggregation of quasi-orthogonal object state machines into components of wider scope; and
formulating findings in a formal language.

13. The computer-implemented method as claimed in claim 8, wherein capturing in a platform independent manner the design foundation ontology data comprises:
capturing in a computation-independent manner first object design foundation ontology data and second object design foundation ontology data; and
capturing in a platform-independent manner component design foundation ontology data.

14. The computer-implemented method as claimed in claim 8 wherein the step of capturing in a platform-specific manner the deployment foundation ontology data is comprised of the following steps:
capturing in a platform-specific manner a first object deployment foundation ontology data and a second object deployment foundation ontology data; and
capturing in a platform-specific manner a component deployment foundation ontology data.

15. The computer-implemented method as claimed in claim 13 wherein the step of capturing the first object design foundation ontology data and the second object design foundation ontology data and the component design foundation ontology data comprises:
receiving communication means required to connect objects with appropriate agents;
receiving output means for state-specific representations of objects;
receiving elements required to build outputs based on object requirements;
receiving actions required to implement events that can be emitted with an output;
receiving services required to implement operations used to move objects through their states;
receiving subject predicate object protocols means that implement filters responsible for enabling services;
receiving permissions used to connect agents to a communication means or to authorise component and the outputs via actions;
receiving templates declaring formulas implemented inside functionality-specific models used to calculate derivation rules;
receiving rule-defined constructs from the objects' rule models used to validate conditions; and
formulating findings in a formal language.

16. The computer-implemented method as claimed in claim 14 wherein the step of capturing in a platform-specific manner the first object deployment foundation ontology data and the second object deployment foundation ontology data and the component deployment foundation ontology data is comprised of the following steps:
receiving addresses of all platform items required for implementing the objects and their agents;
receiving environments specification that provide agents the object-specific operations and user interface functionality;

receiving repository schemas that implement the objects and component schemas;
receiving interfaces that embodies a PSM (Platform Specific Model) used by each object or component to communicate;
receiving application servers specifications that are used to implement the interface for a particular object;
receiving data repository items used to store the objects;
receiving security means used to protect the objects;
receiving rules engines that are used for each domain object;
receiving rules repository items used to store object rules; and
formulating findings in a formal language.

* * * * *